US012725315B2

(12) United States Patent
Ramasubramonian et al.

(10) Patent No.: US 12,725,315 B2
(45) Date of Patent: Sep. 1, 2026

(54) INTER PREDICTION IN POINT CLOUD COMPRESSION

(71) Applicant: QUALCOMM Incorporated, San Diego, CA (US)

(72) Inventors: Adarsh Krishnan Ramasubramonian, Irvine, CA (US); Geert Van der Auwera, San Diego, CA (US); Luong Pham Van, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 526 days.

(21) Appl. No.: 18/304,268

(22) Filed: Apr. 20, 2023

(65) Prior Publication Data

US 2023/0342984 A1 Oct. 26, 2023

Related U.S. Application Data

(60) Provisional application No. 63/363,550, filed on Apr. 25, 2022, provisional application No. 63/363,468, filed on Apr. 22, 2022, provisional application No. 63/363,473, filed on Apr. 22, 2022.

(51) Int. Cl.
*G06T 9/00* (2006.01)

(52) U.S. Cl.
CPC .................................... *G06T 9/001* (2013.01)

(58) Field of Classification Search
CPC ......... G06T 9/001; G06T 9/004; G06T 9/005; H04N 19/13; H04N 19/597; H04N 19/70; H04N 19/96; H04N 19/52
See application file for complete search history.

(56) References Cited

U.S. PATENT DOCUMENTS

2024/0185472 A1* 6/2024 Lasserre .................. G06T 9/40

OTHER PUBLICATIONS

"Technologies under consideration in G-PCC". MPEG Meeting; Nov. 7, 2022-Jan. 21, 2022; Online; (Motion Picture Expert Group or ISO/IEC JTC1/SC29/WG11), No. n21256 Mar. 10, 2022 (Mar. 10, 2022), https://dms.mpeg.expert/doc_end_user/documents/137_OnLine/wg11/MDS21256_WGO07_NQ0281.zip MDS21256_WG07_N00281_v1.docx (Year: 2022).*

International Search Report and Written Opinion—PCT/US2023/019391—ISAEPO—Jul. 14, 2023.

(Continued)

*Primary Examiner* — Matthew C Bella
*Assistant Examiner* — Andrew B. Jones
(74) *Attorney, Agent, or Firm* — Shumaker & Sieffert, P. A.

(57) ABSTRACT

A device for encoding a point cloud comprises a memory configured to store point cloud data for the point cloud; and one or more processors configured to: determine a residual value associated with a current point of the point cloud, the residual value associated with the current point being a radius residual or an azimuth residual; determine a context for entropy encoding the residual value based on whether the current point is coded with intra prediction or inter prediction; and entropy encode the residual value using the determined context.

26 Claims, 24 Drawing Sheets

(56) References Cited

OTHER PUBLICATIONS

ITU-T H.265: "Series H: Audiovisual and Multimedia Systems Infrastructure of Audiovisual Services —Coding of Moving Video", High Efficiency Video Coding, The International Telecommunication Union, Jun. 2019, 696 Pages.

Taquet J., et al., "[G-PCC][New]EE13.51 related: Improved Radius Residual Sign Coding andImproved Points Ordering", 134. MPEG Meeting, Apr. 26, 2021-Apr. 30, 2021, Online, (Motion Picture Expert Group or ISO/IEC JTC1/SC29/WG11), No. m56743, Apr. 21, 2021, XP030295302, 7 Pages.

"Technologies Under Consideration in G-PCC", 137. MPEG Meeting, Jan. 17, 2022-Jan. 21, 2022, Online, (Motion Picture Expert Group or ISO/IEC JTC1/SC29/WG11), N00281, No. n21256, Mar. 10, 2022, pp. 1-85, XP030302342.

* cited by examiner

INTER PREDICTION IN POINT CLOUD COMPRESSION

This application claims the benefit of U.S. Provisional Patent Application No. 63/363,550, filed Apr. 25, 2022, U.S. Provisional Patent Application No. 63/363,468, filed Apr. 22, 2022, and U.S. Provisional Patent Application No. 63/363,473, filed Apr. 22, 2022, the entire content of each of which is incorporated by reference.

TECHNICAL FIELD

This disclosure relates to point cloud encoding and decoding.

BACKGROUND

A point cloud is a collection of points in a 3-dimensional space. The points may correspond to points on objects within the 3-dimensional space. Thus, a point cloud may be used to represent the physical content of the 3-dimensional space. Point clouds may have utility in a wide variety of situations. For example, point clouds may be used in the context of autonomous vehicles for representing the positions of objects on a roadway. In another example, point clouds may be used in the context of representing the physical content of an environment for purposes of positioning virtual objects in an augmented reality (AR) or mixed reality (MR) application. Point cloud compression is a process for encoding and decoding point clouds. Encoding point clouds may reduce the amount of data required for storage and transmission of point clouds.

SUMMARY

In general, this disclosure describes techniques for inter-prediction methods for point cloud compression. A position of a point may be defined by a radius component, an azimuth component, and a laser identifier (ID) component. As part of encoding a point cloud, an encoder may determine a predictor for a point using intra prediction or inter prediction. The encoder may determine residual component values for the current point as differences between corresponding components of the position of the current point and the predictor for the current point. The encoder may perform entropy encoding on residual values, such as values indicating a radius residual sign value, or values representing radius or azimuth residuals. As part of entropy encoding the residual values, the encoder selects a context. Previously, the context selection process did not take into account whether the current point or previously coded points were inter coded. Taking whether the current point or previously coded points were inter coded may improve the context selection process, which may increase coding efficiency. A decoder may select a context for decoding the residual values in the same way.

Furthermore, in some examples, an encoder may use a prediction buffer to store information used to generate predictors. Previously, the process of updating the prediction buffer as new points were coded was not dependent on whether a previous point was inter coded. This disclosure describes techniques in which the process of updating the prediction buffer is dependent on whether previous points were inter coded. This may allow for generation of more accurate predictors, which may lead to increased coding efficiency.

In one example, this disclosure describes a device for encoding a point cloud, the device comprising: a memory configured to store point cloud data for the point cloud; and one or more processors implemented in circuitry and coupled to the memory, the one or more processors configured to: determine a sign of a radius residual of a current point of the point cloud; determine, based on whether a previous coded point is inter coded and whether the current point is inter coded, a context for entropy encoding a radius residual sign flag indicating the sign of the radius residual of the current point; and entropy encode the radius residual sign flag using the determined context.

In another example, this disclosure describes a device for decoding a point cloud, the device comprising: a memory configured to store point cloud data for the point cloud; and one or more processors implemented in circuitry and coupled to the memory, the one or more processors configured to: obtain an entropy encoded radius residual sign flag indicating a sign of a radius residual of a current point of the point cloud; determine, based on whether a previous coded point is inter coded and whether the current point is inter coded, a context for entropy decoding the radius residual sign flag; entropy decode the radius residual sign flag using the determined context; and reconstruct a position of the current point based on the radius residual sign flag.

In another example, this disclosure describes a method of encoding a point cloud, the method comprising: determining a sign of a radius residual of a current point of the point cloud; determining a context for entropy encoding a radius residual sign flag indicating the sign of the radius residual of the current point, wherein determining the context for entropy encoding the radius residual sign flag comprises determining the context for entropy encoding the radius residual sign flag based on whether a previous coded point is inter coded and whether the current point is inter coded; and entropy encoding the radius residual sign flag using the determined context.

In another example, this disclosure describes a method of decoding a point cloud, the method comprising: obtaining an entropy encoded radius residual sign flag indicating a sign of a radius residual of a current point of the point cloud; determining a context for entropy decoding the radius residual sign flag, wherein determining the context for entropy decoding the radius residual sign flag comprises determining the context for entropy decoding the radius residual sign flag based on whether a previous coded point is inter coded and whether the current point is inter coded; entropy decoding the radius residual sign flag using the determined context; and reconstructing a position of the current point based on the radius residual sign flag.

In another example, this disclosure describes a device for encoding a point cloud, the device comprising: means for determining a sign of a radius residual of a current point of the point cloud; means for determining a context for entropy encoding a radius residual sign flag indicating the sign of the radius residual of the current point, wherein determining the context for entropy encoding the radius residual sign flag comprises determining the context for entropy encoding the radius residual sign flag based on whether a previous coded point is inter coded and whether the current point is inter coded; and means for entropy encoding the radius residual sign flag using the determined context.

In another example, this disclosure describes a device for decoding a point cloud, the device comprising: means for obtaining an entropy encoded radius residual sign flag indicating a sign of a radius residual of a current point of the point cloud; means for determining a context for entropy decoding the radius residual sign flag, wherein determining the context for entropy decoding the radius residual sign flag comprises determining the context for entropy decoding the radius residual sign flag based on whether a previous coded point is inter coded and whether the current point is inter coded; means for entropy decoding the radius residual sign flag using the determined context; and means for reconstructing a position of the current point based on the radius residual sign flag.

In another example, this disclosure describes a device for encoding a point cloud, the device comprising: a memory configured to store point cloud data for the point cloud; and one or more processors implemented in circuitry and coupled to the memory, the one or more processors configured to: determine a residual value associated with a current point of the point cloud, the residual value associated with the current point being a radius residual or an azimuth residual; determine a context for entropy encoding the residual value based on whether the current point is coded with intra prediction or inter prediction; and entropy encode the residual value using the determined context.

In another example, this disclosure describes a device for decoding a point cloud, the device comprising: a memory configured to store point cloud data for the point cloud; and one or more processors configured to: obtain an entropy encoded residual value associated with a current point of the point cloud, the residual value associated with the current point being a radius residual or an azimuth residual; determine a context for entropy decoding the residual value based on whether the current point is coded with intra prediction or inter prediction; entropy decode the residual value using the determined context; and reconstruct a position of position of the current point based on the radius residual or the azimuth residual.

In another example, this disclosure describes a method of encoding a point cloud, the method comprising: determining a residual value associated with a current point of the point cloud, the residual value associated with the current point being a radius residual or an azimuth residual; determining a context for entropy encoding the residual value based on whether the current point is coded with intra prediction or inter prediction; and entropy encoding the residual value using the determined context.

In another example, this disclosure describes a method of decoding a point cloud, the method comprising: obtaining an entropy encoded residual value associated with a current point of the point cloud, the residual value associated with the current point being a radius residual or an azimuth residual; determining a context for entropy decoding the residual value based on whether the current point is coded with intra prediction or inter prediction; entropy decoding the residual value using the determined context; and reconstructing a position of position of the current point based on the radius residual or the azimuth residual.

In another example, this disclosure describes a device for decoding a point cloud, the device comprising: means for determining a residual value associated with a current point of the point cloud, the residual value associated with the current point being a radius residual or an azimuth residual; means for determining a context for entropy encoding the residual value based on whether the current point is coded with intra prediction or inter prediction; and means for entropy encoding the residual value using the determined context.

In another example, this disclosure describes a device for encoding a point cloud, the device comprising: means for determining a residual value associated with a current point of the point cloud, the residual value associated with the current point being a radius residual or an azimuth residual; means for determining a context for entropy encoding the residual value based on whether the current point is coded with intra prediction or inter prediction; and means for entropy encoding the residual value using the determined context.

In another example, this disclosure describes a device for encoding a point cloud, the device comprising: a memory configured to store point cloud data for the point cloud; and one or more processors implemented in circuitry and coupled to the memory, the one or more processors configured to: after encoding a first point of the point cloud, update a prediction buffer that contains one or more coordinate pairs, each respective coordinate pair of the one or more coordinate pairs indicating a respective radius and a respective azimuth angle, wherein the one or more processors are configured to, as part of updating the prediction buffer: based on the first point being inter predicted, set a variable to an estimated radius residual value that is equal to a difference between a reconstructed radius of the first point and a radius value currently in the prediction buffer; based on an absolute value of the variable being greater than a threshold, insert a new coordinate pair into the prediction buffer with a radius of the new coordinate pair being a reconstructed radius of the first point and an azimuth angle of the new predictor equal to a reconstructed azimuth angle of the first point; and based on the absolute value of the variable not being greater than the threshold, move a specific coordinate pair in the prediction buffer to a front of the prediction buffer and update the specific coordinate pair with the reconstructed radius of the first point and the reconstructed azimuth angle of the first point, wherein, based on the first point being inter predicted, the specific coordinate pair is a first coordinate pair in the prediction buffer; derive, based on the coordinate pairs in the prediction buffer, one or more predictors for a second point of the point cloud; determine a predictor for the second point from among the derived predictors; and determine residual values for the second point based on the determined predictor.

In another example, this disclosure describes a device for decoding a point cloud, the device comprising: a memory configured to store point cloud data for the point cloud; and one or more processors implemented in circuitry and coupled to the memory, the one or more processors configured to: after decoding a first point of the point cloud, update a prediction buffer that contains one or more coordinate pairs, each respective coordinate pair of the one or more coordinate pairs indicating a respective radius and a respective azimuth angle, wherein the one or more processors are configured to, as part of updating the prediction buffer: based on the first point being inter predicted, set a variable to an estimated radius residual value that is equal to a difference between a reconstructed radius of the first point and a radius value currently in the prediction buffer; based on an absolute value of the variable being greater than a threshold, insert a new coordinate pair into the prediction buffer with a radius of the new coordinate pair being a reconstructed radius of the first point and an azimuth angle of the new predictor equal to a reconstructed azimuth angle of the first point; and based on the absolute value of the variable not being greater than the threshold, move a specific coordinate pair in the prediction buffer to a front of the prediction buffer and update the specific coordinate pair with the reconstructed radius of the first point and the reconstructed azimuth angle of the first point, wherein, based on the first point being inter predicted, the specific coordinate pair is a first coordinate pair in the prediction buffer; derive, based on the coordinate pairs in the prediction buffer, one or more predictors for a second point of the point cloud; determine a predictor for the second point from among the derived predictors; and reconstruct a position of the second point based on the determined predictor.

In another example, this disclosure describes a method of encoding a point cloud, the method comprising: after encoding a first point of the point cloud, updating a prediction buffer that contains one or more coordinate pairs, each respective coordinate pair of the one or more coordinate pairs indicating a respective radius and a respective azimuth angle, wherein updating the prediction buffer comprises: based on the first point being inter predicted, setting a variable to an estimated radius residual value that is equal to a difference between a reconstructed radius of the first point and a radius value currently in the prediction buffer; and one of: based on an absolute value of the variable being greater than a threshold, inserting a new coordinate pair into the prediction buffer with a radius of the new coordinate pair being a reconstructed radius of the first point and an azimuth angle of the new predictor equal to a reconstructed azimuth angle of the first point; or based on the absolute value of the variable not being greater than the threshold, moving a specific coordinate pair in the prediction buffer to a front of the prediction buffer and updating the specific coordinate pair with the reconstructed radius of the first point and the reconstructed azimuth angle of the first point, wherein, based on the first point being inter predicted, the specific coordinate pair is a first coordinate pair in the prediction buffer; deriving, based on the coordinate pairs in the prediction buffer, one or more predictors for a second point of the point cloud; determining a predictor for the second point from among the derived predictors; and determining residual values for the second point based on the determined predictor.

In another example, this disclosure describes a method of decoding a point cloud, the method comprising: after decoding a first point of the point cloud, updating a prediction buffer that contains one or more coordinate pairs, each respective coordinate pair of the one or more coordinate pairs indicating a respective radius and a respective azimuth angle, wherein updating the prediction buffer comprises: based on the first point being inter predicted, setting a variable to an estimated radius residual value that is equal to a difference between a reconstructed radius of the first point and a radius value currently in the prediction buffer; and one of: based on an absolute value of the variable being greater than a threshold, inserting a new coordinate pair into the prediction buffer with a radius of the new coordinate pair being a reconstructed radius of the first point and an azimuth angle of the new predictor equal to a reconstructed azimuth angle of the first point; and based on the absolute value of the variable not being greater than the threshold, moving a specific coordinate pair in the prediction buffer to a front of the prediction buffer and updating the specific coordinate pair with the reconstructed radius of the first point and the reconstructed azimuth angle of the first point, wherein, based on the first point being inter predicted, the specific coordinate pair is a first coordinate pair in the prediction buffer; deriving, based on the coordinate pairs in the prediction buffer, one or more predictors for a second point of the point cloud; determining a predictor for the second point from among the derived predictors; and reconstructing a position of the second point based on the determined predictor.

In another example, this disclosure describes a device for encoding a point cloud, the device comprising: means for updating, after encoding a first point of the point cloud, a prediction buffer that contains one or more coordinate pairs, each respective coordinate pair of the one or more coordinate pairs indicating a respective radius and a respective azimuth angle, wherein the means for updating the prediction buffer comprises: means for setting, based on the first point being inter predicted, a variable to an estimated radius residual value that is equal to a difference between a reconstructed radius of the first point and a radius value currently in the prediction buffer; means for inserting, based on an absolute value of the variable being greater than a threshold, a new coordinate pair into the prediction buffer with a radius of the new coordinate pair being a reconstructed radius of the first point and an azimuth angle of the new predictor equal to a reconstructed azimuth angle of the first point; or means for moving, based on the absolute value of the variable not being greater than the threshold, a specific coordinate pair in the prediction buffer to a front of the prediction buffer and updating the specific coordinate pair with the reconstructed radius of the first point and the reconstructed azimuth angle of the first point, wherein, based on the first point being inter predicted, the specific coordinate pair is a first coordinate pair in the prediction buffer; means for deriving, based on the coordinate pairs in the prediction buffer, one or more predictors for a second point of the point cloud; means for determining a predictor for the second point from among the derived predictors; and means for determining residual values for the second point based on the determined predictor.

In another example, this disclosure describes a device for decoding a point cloud, the device comprising: means for updating, after decoding a first point of the point cloud, a prediction buffer that contains one or more coordinate pairs, each respective coordinate pair of the one or more coordinate pairs indicating a respective radius and a respective azimuth angle, wherein the means for updating the prediction buffer comprises: means for setting, based on the first point being inter predicted, a variable to an estimated radius residual value that is equal to a difference between a reconstructed radius of the first point and a radius value currently in the prediction buffer; means for inserting, based on an absolute value of the variable being greater than a threshold, a new coordinate pair into the prediction buffer with a radius of the new coordinate pair being a reconstructed radius of the first point and an azimuth angle of the new predictor equal to a reconstructed azimuth angle of the first point; and means for moving, based on the absolute value of the variable not being greater than the threshold, a specific coordinate pair in the prediction buffer to a front of the prediction buffer and updating the specific coordinate pair with the reconstructed radius of the first point and the reconstructed azimuth angle of the first point, wherein, based on the first point being inter predicted, the specific coordinate pair is a first coordinate pair in the prediction buffer; means for deriving, based on the coordinate pairs in the prediction buffer, one or more predictors for a second point of the point cloud; means for determining a predictor for the second point from among the derived predictors; and means for reconstructing a position of the second point based on the determined predictor.

In another example, this disclosure describes a non-transitory computer-readable storage medium having stored thereon instructions that, when executed, cause one or more processors to perform any of the methods of this disclosure.

The details of one or more examples are set forth in the accompanying drawings and the description below. Other features, objects, and advantages will be apparent from the description, drawings, and claims.

DETAILED DESCRIPTION

Figure 1:
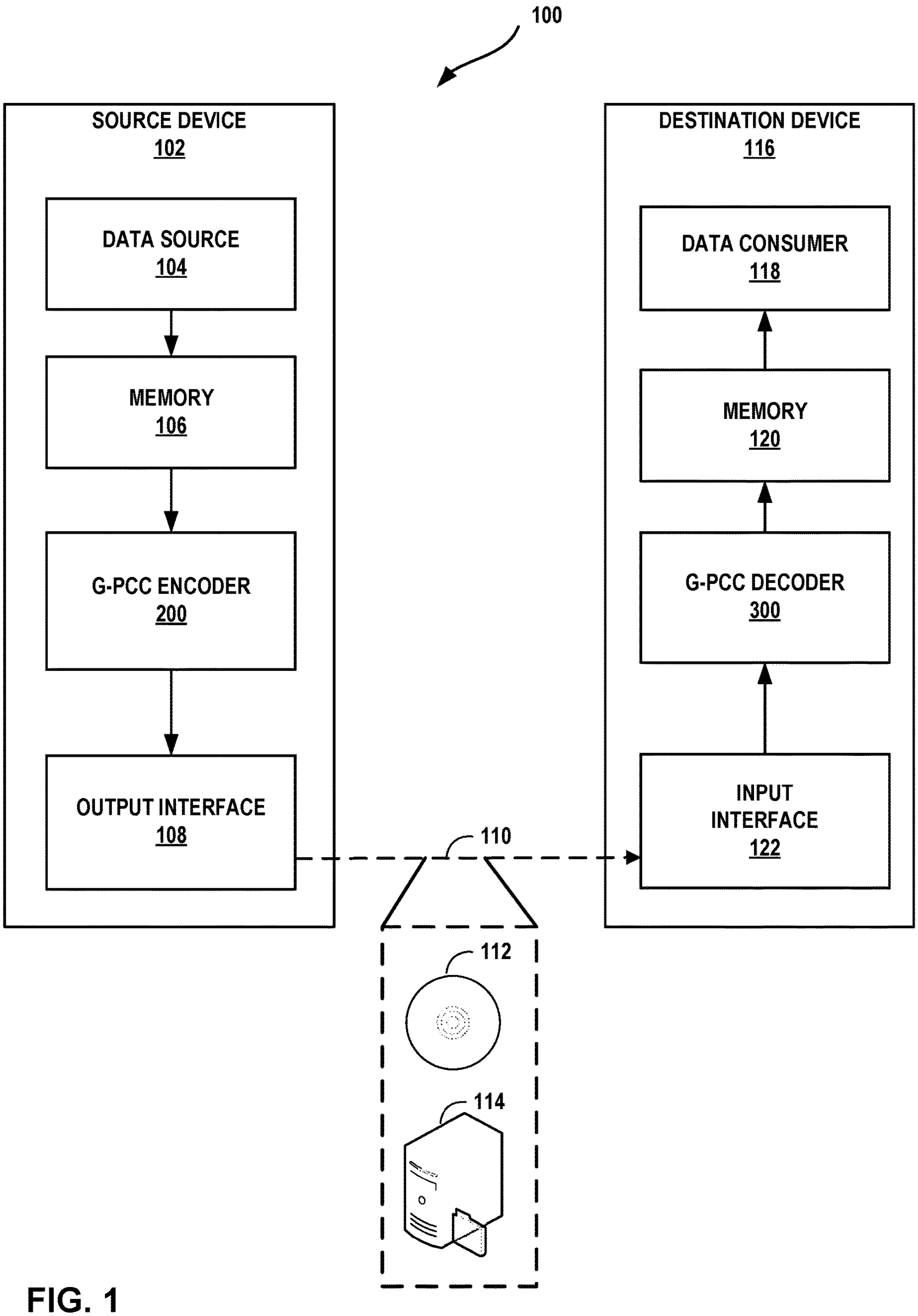
FIG. 1 is a block diagram illustrating an example encoding and decoding system that may perform the techniques of this disclosure.

In general, this disclosure describes techniques for inter-prediction methods for point cloud compression. A position of a point may be defined by a radius component, an azimuth component, and a laser identifier (ID) component. As part of encoding a point cloud, an encoder may determine a predictor for a point using intra prediction or inter prediction. The encoder may determine residual component values for the current point as differences between corresponding components of the position of the current point and the predictor for the current point. The encoder may perform entropy encoding on residual values, such as values indicating a radius residual sign value, or values representing radius or azimuth residuals. As part of entropy encoding the residual values, the encoder selects a context. Previously, the context selection process did not take into account whether the current point or previously coded points were inter coded. Taking whether the current point or previously coded points were inter coded may improve the context selection process, which may increase coding efficiency. A decoder may select a context for decoding the residual values in the same way.

Thus, in some examples, an encoder may determine a sign of a radius residual of a current point of the point cloud. The encoder may also determine, based on whether a previous coded point is inter coded and whether the current point is inter coded, a context for entropy encoding a radius residual sign flag indicating the sign of the radius residual of the current point. The encoder may entropy encode the radius residual sign flag using the determined context. Similarly, a decoder may obtain an entropy encoded radius residual sign flag indicating a sign of a radius residual of a current point of the point cloud. The decoder may determine, based on whether a previous coded point is inter coded and whether the current point is inter coded, a context for entropy decoding the radius residual sign flag. The decoder may entropy decode the radius residual sign flag using the determined context. The decoder may reconstruct a position of the current point based on the radius residual sign flag.

In some examples, an encoder may determine a residual value associated with a current point of the point cloud, the residual value associated with the current point being a radius residual or an azimuth residual. The encoder may determine a context for entropy encoding the residual value based on whether the current point is coded with intra prediction or inter prediction. Additionally, the encoder may entropy encode the residual value using the determined context. Similarly, a decoder may obtain an entropy encoded residual value associated with a current point of the point cloud, the residual value associated with the current point being a radius residual or an azimuth residual. The decoder may determine a context for entropy decoding the residual value based on whether the current point is coded with intra prediction or inter prediction. The decoder may entropy decode the residual value using the determined context. The decoder may reconstruct a position of position of the current point based on the radius residual or the azimuth residual.

Furthermore, in some examples, an encoder may use a prediction buffer to store information used to generate predictors. Previously, the process of updating the prediction buffer as new points were coded was not dependent on whether a previous point was inter coded. This disclosure describes techniques in which the process of updating the prediction buffer is dependent on whether previous points were inter coded. This may allow for storage of more accurate predictors, which may lead to increased coding efficiency.

Thus, in some examples, after encoding a first point of the point cloud, an encoder may update a prediction buffer that contains a list of one or more coordinate pairs. Each respective coordinate pair of the one or more coordinate pairs indicates a respective radius and a respective azimuth angle. As part of updating the prediction buffer, the encoder may, based on the first point being inter predicted, set a variable to an estimated radius residual value that is equal to a difference between a reconstructed radius of the first point and a radius value currently in the prediction buffer. Based on an absolute value of the variable being greater than a threshold, the encoder may insert a new coordinate pair into the prediction buffer with a radius of the new coordinate pair being a reconstructed radius of the first point and an azimuth angle of the new predictor equal to a reconstructed azimuth angle of the first point. The encoder may remove the last coordinate pair in the list of coordinates in the prediction buffer. Additionally, the encoder may move all the coordinate pairs with index 0 to N−2 to indices 1 to N−1, respectively, where N is the number of coordinate pairs in the list. Based on the absolute value of the variable not being greater than the threshold, the encoder may move a specific coordinate pair in the prediction buffer to a front of the prediction buffer and may update the specific coordinate pair with the reconstructed radius of the first point and the reconstructed azimuth angle of the first point. In instances where the first point is coded with intra prediction, the specific coordinate pair that is updated is the coordinate pair that was used for prediction of the first point. In instances where the first point is coded with inter prediction, the specific coordinate pair that is updated is the first coordinate pair in the list. The encoder may derive, based on the coordinate pairs in the prediction buffer, one or more predictors for a second point of the point cloud. The encoder may determine a predictor for the second point from among the derived predictors. Additionally, the encoder may determine residual values for the second point based on the determined predictor. The decoder may update the prediction buffer in the same or similar way.

FIG. 1 is a block diagram illustrating an example encoding and decoding system 100 that may perform the techniques of this disclosure. The techniques of this disclosure are generally directed to coding (encoding and/or decoding) point cloud data, i.e., to support point cloud compression. In general, point cloud data includes any data for processing a point cloud. The coding may be effective in compressing and/or decompressing point cloud data.

As shown in FIG. 1, system 100 includes a source device 102 and a destination device 116. Source device 102 provides encoded point cloud data to be decoded by a destination device 116. Particularly, in the example of FIG. 1, source device 102 provides the point cloud data to destination device 116 via a computer-readable medium 110. Source device 102 and destination device 116 may comprise any of a wide range of devices, including desktop computers, notebook (i.e., laptop) computers, tablet computers, set-top boxes, telephone handsets such as smartphones, televisions, cameras, display devices, digital media players, video gaming consoles, video streaming devices, terrestrial or marine vehicles, spacecraft, aircraft, robots, LIDAR devices, satellites, or the like. In some cases, source device 102 and destination device 116 may be equipped for wireless communication.

In the example of FIG. 1, source device 102 includes a data source 104, a memory 106, a G-PCC encoder 200, and an output interface 108. Destination device 116 includes an input interface 122, a G-PCC decoder 300, a memory 120, and a data consumer 118. In accordance with this disclosure, G-PCC encoder 200 of source device 102 and G-PCC decoder 300 of destination device 116 may be configured to apply the techniques of this disclosure related to inter-prediction methods for point cloud compression. Thus, source device 102 represents an example of an encoding device, while destination device 116 represents an example of a decoding device. In other examples, source device 102 and destination device 116 may include other components or arrangements. For example, source device 102 may receive data (e.g., point cloud data) from an internal or external source. Likewise, destination device 116 may interface with an external data consumer, rather than include a data consumer in the same device. This disclosure may refer to G-PCC encoder 200 simply as encoder 200 and G-PCC decoder 300 as decoder 300.

System 100 as shown in FIG. 1 is merely one example. In general, other digital encoding and/or decoding devices may perform the techniques of this disclosure related to inter-prediction methods for point cloud compression. Source device 102 and destination device 116 are merely examples of such devices in which source device 102 generates coded data for transmission to destination device 116. This disclosure refers to a "coding" device as a device that performs coding (encoding and/or decoding) of data. Thus, G-PCC encoder 200 and G-PCC decoder 300 represent examples of coding devices, in particular, an encoder and a decoder, respectively. In some examples, source device 102 and destination device 116 may operate in a substantially symmetrical manner such that each of source device 102 and destination device 116 includes encoding and decoding components. Hence, system 100 may support one-way or two-way transmission between source device 102 and destination device 116, e.g., for streaming, playback, broadcasting, telephony, navigation, and other applications.

In general, data source 104 represents a source of data (i.e., raw, unencoded point cloud data) and may provide a sequential series of "frames") of the data to G-PCC encoder 200, which encodes data for the frames. Data source 104 of source device 102 may include a point cloud capture device, such as any of a variety of cameras or sensors, e.g., a 3D scanner or a light detection and ranging (LIDAR) device, one or more video cameras, an archive containing previously captured data, and/or a data feed interface to receive data from a data content provider. Alternatively or additionally, point cloud data may be computer-generated from scanner, camera, sensor or other data. For example, data source 104 may generate computer graphics-based data as the source data, or produce a combination of live data, archived data, and computer-generated data. In each case, G-PCC encoder 200 encodes the captured, pre-captured, or computer-generated data. G-PCC encoder 200 may rearrange the frames from the received order (sometimes referred to as "display order") into a coding order for coding. G-PCC encoder 200 may generate one or more bitstreams including encoded data. Source device 102 may then output the encoded data via output interface 108 onto computer-readable medium 110 for reception and/or retrieval by, e.g., input interface 122 of destination device 116.

Memory 106 of source device 102 and memory 120 of destination device 116 may represent general purpose memories. In some examples, memory 106 and memory 120 may store raw data, e.g., raw data from data source 104 and raw, decoded data from G-PCC decoder 300. Additionally or alternatively, memory 106 and memory 120 may store software instructions executable by, e.g., G-PCC encoder 200 and G-PCC decoder 300, respectively. Although memory 106 and memory 120 are shown separately from G-PCC encoder 200 and G-PCC decoder 300 in this example, it should be understood that G-PCC encoder 200 and G-PCC decoder 300 may also include internal memories for functionally similar or equivalent purposes. Furthermore, memory 106 and memory 120 may store encoded data, e.g., output from G-PCC encoder 200 and input to G-PCC decoder 300. In some examples, portions of memory 106 and memory 120 may be allocated as one or more buffers, e.g., to store raw, decoded, and/or encoded data. For instance, memory 106 and memory 120 may store data representing a point cloud such as point cloud data.

Computer-readable medium 110 may represent any type of medium or device capable of transporting the encoded data from source device 102 to destination device 116. In one example, computer-readable medium 110 represents a communication medium to enable source device 102 to transmit encoded data directly to destination device 116 in real-time, e.g., via a radio frequency network or computer-based network. Output interface 108 may modulate a transmission signal including the encoded data, and input interface 122 may demodulate the received transmission signal, according to a communication standard, such as a wireless communication protocol. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, source device 102 may output encoded data from output interface 108 to storage device 112. Similarly, destination device 116 may access encoded data from storage device 112 via input interface 122. Storage device 112 may include any of a variety of distributed or locally accessed data storage media such as a hard drive, Blu-ray discs, DVDs, CD-ROMs, flash memory, volatile or non-volatile memory, or any other suitable digital storage media for storing encoded data.

In some examples, source device 102 may output encoded data to file server 114 or another intermediate storage device that may store the encoded data generated by source device 102. Destination device 116 may access stored data from file server 114 via streaming or download. File server 114 may be any type of server device capable of storing encoded data and transmitting that encoded data to the destination device 116. File server 114 may represent a web server (e.g., for a website), a File Transfer Protocol (FTP) server, a content delivery network device, or a network attached storage (NAS) device. Destination device 116 may access encoded data from file server 114 through any standard data connection, including an Internet connection. This may include a wireless channel (e.g., a Wi-Fi connection), a wired connection (e.g., digital subscriber line (DSL), cable modem, etc.), or a combination of both that is suitable for accessing encoded data stored on file server 114. File server 114 and input interface 122 may be configured to operate according to a streaming transmission protocol, a download transmission protocol, or a combination thereof.

Output interface 108 and input interface 122 may represent wireless transmitters/receivers, modems, wired networking components (e.g., Ethernet cards), wireless communication components that operate according to any of a variety of IEEE 802.11 standards, or other physical components. In examples where output interface 108 and input interface 122 comprise wireless components, output interface 108 and input interface 122 may be configured to transfer data, such as encoded data, according to a cellular communication standard, such as 4G, 4G-LTE (Long-Term Evolution), LTE Advanced, 5G, or the like. In some examples where output interface 108 comprises a wireless transmitter, output interface 108 and input interface 122 may be configured to transfer data, such as encoded data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to G-PCC encoder 200 and/or output interface 108, and destination device 116 may include an SoC device to perform the functionality attributed to G-PCC decoder 300 and/or input interface 122.

The techniques of this disclosure may be applied to encoding and decoding in support of any of a variety of applications, such as communication between autonomous vehicles, communication between scanners, cameras, sensors and processing devices such as local or remote servers, geographic mapping, or other applications.

Input interface 122 of destination device 116 receives an encoded bitstream from computer-readable medium 110 (e.g., a communication medium, storage device 112, file server 114, or the like). The encoded bitstream may include signaling information defined by G-PCC encoder 200, which is also used by G-PCC decoder 300, such as syntax elements having values that describe characteristics and/or processing of coded units (e.g., slices, pictures, groups of pictures, sequences, or the like). Data consumer 118 uses the decoded data. For example, data consumer 118 may use the decoded data to determine the locations of physical objects. In some examples, data consumer 118 may comprise a display to present imagery based on a point cloud.

G-PCC encoder 200 and G-PCC decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of G-PCC encoder 200 and G-PCC decoder 300 may be included in one or more encoders or decoders, either of which may be integrated as part of a combined encoder/decoder (CODEC) in a respective device. A device including G-PCC encoder 200 and/or G-PCC decoder 300 may comprise one or more integrated circuits, microprocessors, and/or other types of devices.

G-PCC encoder 200 and G-PCC decoder 300 may operate according to a coding standard, such as video point cloud compression (V-PCC) standard or a geometry point cloud compression (G-PCC) standard. This disclosure may generally refer to coding (e.g., encoding and decoding) of pictures to include the process of encoding or decoding data. An encoded bitstream generally includes a series of values for syntax elements representative of coding decisions (e.g., coding modes).

This disclosure may generally refer to "signaling" certain information, such as syntax elements. The term "signaling" may generally refer to the communication of values for syntax elements and/or other data used to decode encoded data. That is, G-PCC encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

ISO/IEC MPEG (JTC 1/SC 29/WG 11) is studying the potential need for standardization of point cloud coding technology with a compression capability that significantly exceeds that of the current approaches and will target to create the standard. The group is working together on this exploration activity in a collaborative effort known as the 3-Dimensional Graphics Team (3DG) to evaluate compression technology designs proposed by their experts in this area.

Point cloud compression activities are categorized in two different approaches. The first approach is "Video point cloud compression" (V-PCC), which segments the 3D object, and project the segments in multiple 2D planes (which are represented as "patches" in the 2D frame), which are further coded by a legacy 2D video codec such as a High Efficiency Video Coding (HEVC) (ITU-T H.265) codec. The second approach is "Geometry-based point cloud compression" (G-PCC), which directly compresses 3D geometry i.e., position of a set of points in 3D space, and associated attribute values (for each point associated with the 3D geometry). G-PCC addresses the compression of point clouds in both Category 1 (static point clouds) and Category 3 (dynamically acquired point clouds).

A point cloud contains a set of points in a 3D space, and may have attributes associated with the point. The attributes may be color information such as R, G, B or Y, Cb, Cr, or reflectance information, or other attributes. Point clouds may be captured by a variety of cameras or sensors such as LIDAR sensors and 3D scanners and may also be computer-generated. Point cloud data are used in a variety of applications including, but not limited to, construction (modeling), graphics (3D models for visualizing and animation), and the automotive industry (LIDAR sensors used to help in navigation).

The 3D space occupied by a point cloud data may be enclosed by a virtual bounding box. The position of the points in the bounding box may be represented by a certain precision; therefore, the positions of one or more points may be quantized based on the precision. At the smallest level, the bounding box is split into voxels which are the smallest unit of space represented by a unit cube. A voxel in the bounding box may be associated with zero, one, or more than one point. The bounding box may be split into multiple cube/cuboid regions, which may be called tiles. Each tile may be coded into one or more slices. The partitioning of the bounding box into slices and tiles may be based on number of points in each partition, or based on other considerations (e.g., a particular region may be coded as tiles). The slice regions may be further partitioned using splitting decisions similar to those in video codecs.

Figure 2:
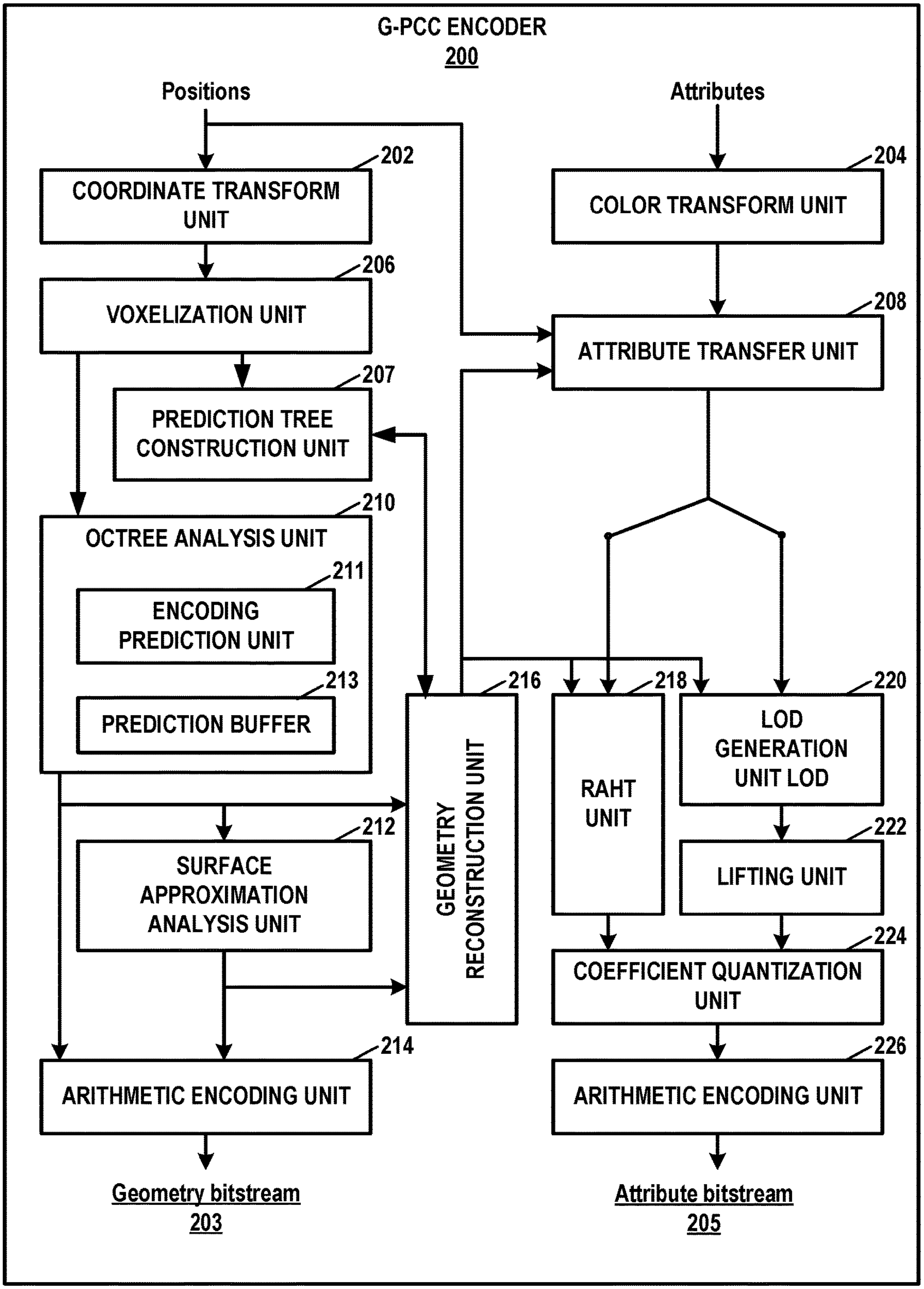
FIG. 2 is a block diagram illustrating an example Geometry Point Cloud Compression (G-PCC) encoder.
Figure 3:
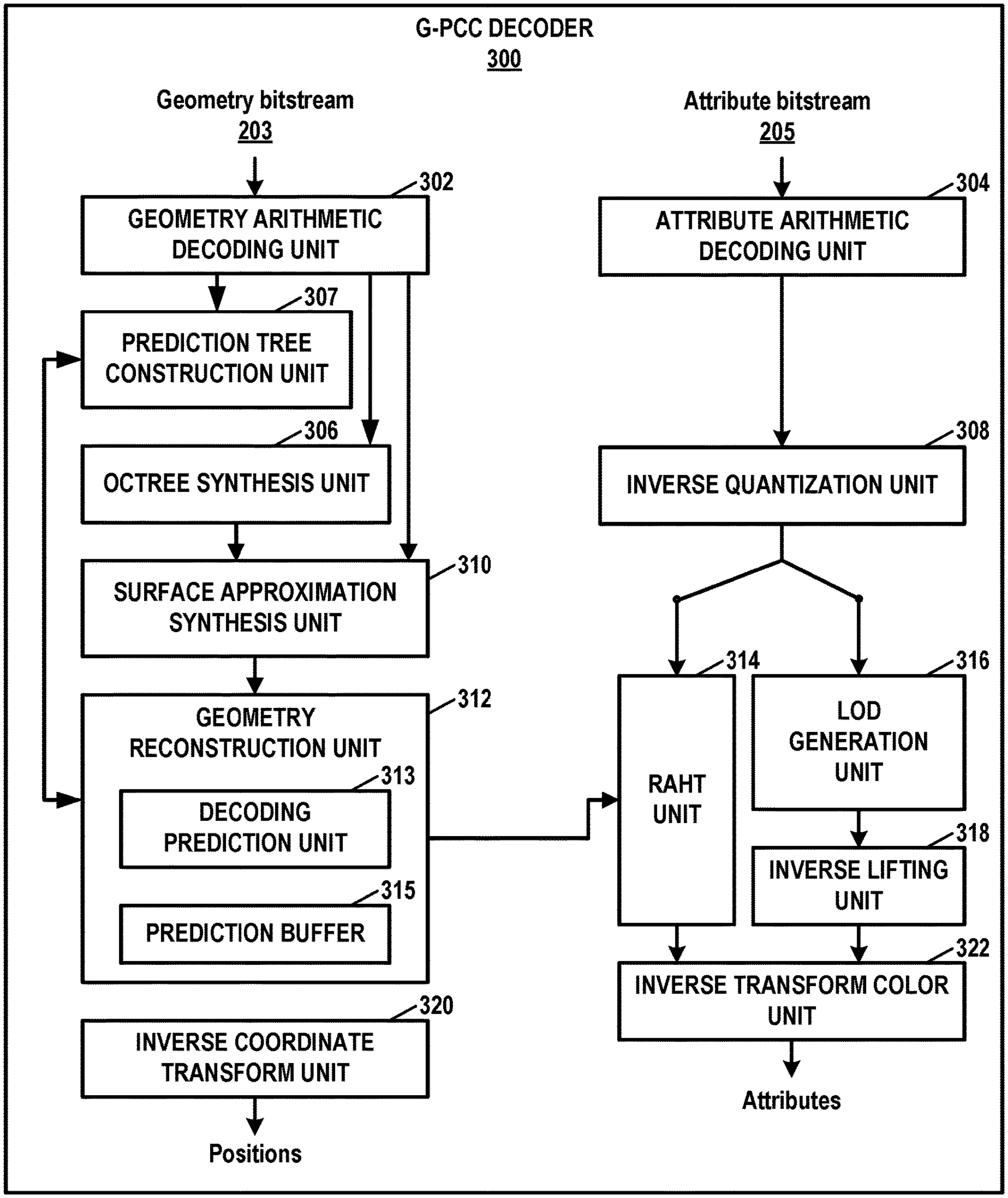
FIG. 3 is a block diagram illustrating an example G-PCC decoder.

FIG. 2 provides an overview of G-PCC encoder 200. FIG. 3 provides an overview of G-PCC decoder 300. The modules shown are logical, and do not necessarily correspond one-to-one to implemented code in the reference implementation of G-PCC codec, i.e., TMC13 test model software studied by ISO/IEC MPEG (JTC 1/SC 29/WG 11).

In both G-PCC encoder 200 and G-PCC decoder 300, point cloud positions are coded first. Attribute coding depends on the decoded geometry. In FIG. 2 and FIG. 3, surface approximation analysis unit 212, Region Adaptive Hierarchical Transform (RAHT) unit 218, surface approximation synthesis unit 310, and RAHT unit 314 are options typically used for Category 1 data. LOD generation unit 220, lifting unit 222, LOD generation unit 316, and inverse lifting unit 318 are options typically used for Category 3 data. All the other modules are common between Categories 1 and 3.

For Category 3 data, the compressed geometry is typically represented as an octree from the root all the way down to a leaf level of individual voxels. For Category 1 data, the compressed geometry is typically represented by a pruned octree (i.e., an octree from the root down to a leaf level of blocks larger than voxels) plus a model that approximates the surface within each leaf of the pruned octree. In this way, both Category 1 and 3 data share the octree coding mechanism, while Category 1 data may in addition approximate the voxels within each leaf with a surface model. The surface model used is a triangulation comprising 1-10 triangles per block, resulting in a triangle soup. The Category 1 geometry codec is therefore known as the Trisoup geometry codec, while the Category 3 geometry codec is known as the Octree geometry codec.

At each node of an octree, an occupancy is signaled (when not inferred) for one or more of its child nodes (up to eight nodes). Multiple neighborhoods are specified including (a) nodes that share a face with a current octree node, (b) nodes that share a face, edge or a vertex with the current octree node, etc. Within each neighborhood, the occupancy of a node and/or its children may be used to predict the occupancy of the current node or its children. For points that are sparsely populated in certain nodes of the octree, the codec also supports a direct coding mode where the 3D position of the point is encoded directly. A flag may be signaled to indicate that a direct mode is signaled. At the lowest level, the number of points associated with the octree node/leaf node may also be coded.

Once the geometry is coded, the attributes corresponding to the geometry points are coded. When there are multiple attribute points corresponding to one reconstructed/decoded geometry point, an attribute value may be derived that is representative of the reconstructed point.

There are three attribute coding methods in G-PCC: Region Adaptive Hierarchical Transform (RAHT) coding, interpolation-based hierarchical nearest-neighbour prediction (Predicting Transform), and interpolation-based hierarchical nearest-neighbour prediction with an update/lifting step (Lifting Transform). RAHT and Lifting are typically used for Category 1 data, while Predicting is typically used for Category 3 data. However, either method may be used for any data, and, just like with the geometry codecs in G-PCC, the attribute coding method used to code the point cloud is specified in the bitstream.

The coding of the attributes may be conducted in a level-of-detail (LOD), where with each level of detail a finer representation of the point cloud attribute may be obtained.

Each level of detail may be specified based on distance metric from the neighboring nodes or based on a sampling distance.

At G-PCC encoder 200, the residuals obtained as the output of the coding methods for the attributes are quantized. The residuals may be obtained by subtracting the attribute value from a prediction that is derived based on the points in the neighborhood of the current point and based on the attribute values of points encoded previously. The quantized residuals may be coded using context adaptive arithmetic coding.

In the example of FIG. 2, G-PCC encoder 200 may include a coordinate transform unit 202, a color transform unit 204, a voxelization unit 206, a prediction tree construction unit 207, an attribute transfer unit 208, an octree analysis unit 210, a surface approximation analysis unit 212, an arithmetic encoding unit 214, a geometry reconstruction unit 216, an RAHT unit 218, a LOD generation unit 220, a lifting unit 222, a coefficient quantization unit 224, and an arithmetic encoding unit 226. In the example of FIG. 2, octree analysis unit 210 includes an encoding prediction unit 211 and a prediction buffer 213.

As shown in the example of FIG. 2, G-PCC encoder 200 may obtain a set of positions of points in the point cloud and a set of attributes. G-PCC encoder 200 may obtain the set of positions of the points in the point cloud and the set of attributes from data source 104 (FIG. 1). The positions may include coordinates of points in a point cloud. The attributes may include information about the points in the point cloud, such as colors associated with points in the point cloud. G-PCC encoder 200 may generate a geometry bitstream 203 that includes an encoded representation of the positions of the points in the point cloud. G-PCC encoder 200 may also generate an attribute bitstream 205 that includes an encoded representation of the set of attributes.

Coordinate transform unit 202 may apply a transform to the coordinates of the points to transform the coordinates from an initial domain to a transform domain. This disclosure may refer to the transformed coordinates as transform coordinates. Color transform unit 204 may apply a transform to transform color information of the attributes to a different domain. For example, color transform unit 204 may transform color information from an RGB color space to a YCbCr color space.

Furthermore, in the example of FIG. 2, voxelization unit 206 may voxelize the transform coordinates. Voxelization of the transform coordinates may include quantization and removing some points of the point cloud. In other words, multiple points of the point cloud may be subsumed within a single "voxel," which may thereafter be treated in some respects as one point.

Prediction tree construction unit 207 may be configured to generate a prediction tree based on the voxelized transform coordinates. Prediction tree construction unit 207 may be configured to perform any of the prediction tree coding techniques described above, either in an intra-prediction mode or an inter-prediction mode. In order to perform prediction tree coding using inter-prediction, prediction tree construction unit 207 may access points from previously encoded frames from geometry reconstruction unit 216. Arithmetic encoding unit 214 may entropy encode syntax elements representing the encoded prediction tree.

Instead of performing prediction tree-based coding, G-PCC encoder 200 may perform octree-based encoding. Octree analysis unit 210 may generate an octree based on the voxelized transform coordinates. Additionally, in the example of FIG. 2, surface approximation analysis unit 212 may analyze the points to potentially determine a surface representation of sets of the points. Arithmetic encoding unit 214 may entropy encode syntax elements representing the information of the octree and/or surfaces determined by surface approximation analysis unit 212. G-PCC encoder 200 may output these syntax elements in geometry bitstream 203. Geometry bitstream 203 may also include other syntax elements, including syntax elements that are not arithmetically encoded.

Geometry reconstruction unit 216 may reconstruct transform coordinates of points in the point cloud based on the octree, data indicating the surfaces determined by surface approximation analysis unit 212, and/or other information. The number of transform coordinates reconstructed by geometry reconstruction unit 216 may be different from the original number of points of the point cloud because of voxelization and surface approximation. This disclosure may refer to the resulting points as reconstructed points. Attribute transfer unit 208 may transfer attributes of the original points of the point cloud to reconstructed points of the point cloud.

Furthermore, RAHT unit 218 may apply RAHT coding to the attributes of the reconstructed points. In some examples, under RAHT, the attributes of a block of 2×2×2 point positions are taken and transformed along one direction to obtain four low (L) and four high (H) frequency nodes. Subsequently, the four low frequency nodes (L) are transformed in a second direction to obtain two low (LL) and two high (LH) frequency nodes. The two low frequency nodes (LL) are transformed along a third direction to obtain one low (LLL) and one high (LLH) frequency node. The low frequency node LLL corresponds to DC coefficients and the high frequency nodes H, LH, and LLH correspond to AC coefficients. The transformation in each direction may be a 1-D transform with two coefficient weights. The low frequency coefficients may be taken as coefficients of the 2×2×2 block for the next higher level of RAHT transform and the AC coefficients are encoded without changes; such transformations continue until the top root node. The tree traversal for encoding is from top to bottom used to calculate the weights to be used for the coefficients; the transform order is from bottom to top. The coefficients may then be quantized and coded.

Alternatively or additionally, LOD generation unit 220 and lifting unit 222 may apply LOD processing and lifting, respectively, to the attributes of the reconstructed points. LOD generation is used to split the attributes into different refinement levels. Each refinement level provides a refinement to the attributes of the point cloud. The first refinement level provides a coarse approximation and contains few points; the subsequent refinement level typically contains more points, and so on. The refinement levels may be constructed using a distance-based metric or may also use one or more other classification criteria (e.g., subsampling from a particular order). Thus, all the reconstructed points may be included in a refinement level. Each level of detail is produced by taking a union of all points up to particular refinement level: e.g., LOD1 is obtained based on refinement level RL1, LOD2 is obtained based on RL1 and RL2, . . . LODN is obtained by union of RL1, RL2, . . . RLN. In some cases, LOD generation may be followed by a prediction scheme (e.g., predicting transform) where attributes associated with each point in the LOD are predicted from a weighted average of preceding points, and the residual is quantized and entropy coded. The lifting scheme builds on top of the predicting transform mechanism, where an update operator is used to update the coefficients and an adaptive quantization of the coefficients is performed.

RAHT unit 218 and lifting unit 222 may generate coefficients based on the attributes. Coefficient quantization unit 224 may quantize the coefficients generated by RAHT unit 218 or lifting unit 222. Arithmetic encoding unit 226 may apply arithmetic coding to syntax elements representing the quantized coefficients. G-PCC encoder 200 may output these syntax elements in attribute bitstream 205. Attribute bitstream 205 may also include other syntax elements, including non-arithmetically encoded syntax elements.

In the example of FIG. 3, G-PCC decoder 300 may include a geometry arithmetic decoding unit 302, an attribute arithmetic decoding unit 304, an octree synthesis unit 306, an inverse quantization unit 308, a surface approximation synthesis unit 310, a geometry reconstruction unit 312, a RAHT unit 314, a LoD generation unit 316, an inverse lifting unit 318, an inverse transform coordinate unit 320, and an inverse transform color unit 322. Geometry reconstruction unit 312 may include a prediction unit 313 and a prediction buffer 315.

G-PCC decoder 300 may obtain a geometry bitstream 203 and attribute bitstream 205. Geometry arithmetic decoding unit 302 of decoder 300 may apply arithmetic decoding (e.g., Context-Adaptive Binary Arithmetic Coding (CABAC), exponential-Golomb coding, or other type of arithmetic decoding) to syntax elements in geometry bitstream 203. Similarly, attribute arithmetic decoding unit 304 may apply arithmetic decoding to syntax elements in attribute bitstream 205.

Octree synthesis unit 306 may synthesize an octree based on syntax elements parsed from geometry bitstream 203. Starting with the root node of the octree, the occupancy of each of the eight children node at each octree level is signaled in the bitstream. When the signaling indicates that a child node at a particular octree level is occupied, the occupancy of children of this child node is signaled. The signaling of nodes at each octree level is signaled before proceeding to the subsequent octree level. At the final level of the octree, each node corresponds to a voxel position; when the leaf node is occupied, one or more points may be specified to be occupied at the voxel position. In some instances, some branches of the octree may terminate earlier than the final level due to quantization. In such cases, a leaf node is considered an occupied node that has no child nodes. In instances where surface approximation is used in geometry bitstream 203, surface approximation synthesis unit 310 may determine a surface model based on syntax elements parsed from geometry bitstream 203 and based on the octree.

Furthermore, geometry reconstruction unit 312 may perform a reconstruction to determine coordinates of points in a point cloud. For each position at a leaf node of the octree, geometry reconstruction unit 312 may reconstruct the node position by using a binary representation of the leaf node in the octree. At each respective leaf node, the number of points at the respective leaf node is signaled; this indicates the number of duplicate points at the same voxel position. When geometry quantization is used, the point positions are scaled for determining the reconstructed point position values.

Inverse transform coordinate unit 320 may apply an inverse transform to the reconstructed coordinates to convert the reconstructed coordinates (positions) of the points in the point cloud from a transform domain back into an initial domain. The positions of points in a point cloud may be in floating point domain but point positions in G-PCC codec are coded in the integer domain. The inverse transform may be used to convert the positions back to the original domain.

Additionally, in the example of FIG. 3, inverse quantization unit 308 may inverse quantize attribute values. The attribute values may be based on syntax elements obtained from attribute bitstream 205 (e.g., including syntax elements decoded by attribute arithmetic decoding unit 304).

Depending on how the attribute values are encoded, RAHT unit 314 may perform RAHT coding to determine, based on the inverse quantized attribute values, color values for points of the point cloud. RAHT decoding is done from the top to the bottom of the tree. At each level, the low and high frequency coefficients that are derived from the inverse quantization process are used to derive the constituent values. At the leaf node, the values derived correspond to the attribute values of the coefficients. The weight derivation process for the points is similar to the process used at G-PCC encoder 200. Alternatively, LOD generation unit 316 and inverse lifting unit 318 may determine color values for points of the point cloud using a level of detail-based technique. LOD generation unit 316 decodes each LOD giving progressively finer representations of the attribute of points. With a predicting transform, LOD generation unit 316 derives the prediction of the point from a weighted sum of points that are in prior LODs, or previously reconstructed in the same LOD. LOD generation unit 316 may add the prediction to the residual (which is obtained after inverse quantization) to obtain the reconstructed value of the attribute. When the lifting scheme is used, LOD generation unit 316 may also include an update operator to update the coefficients used to derive the attribute values. LOD generation unit 316 may also apply an inverse adaptive quantization in this case.

Furthermore, in the example of FIG. 3, inverse transform color unit 322 may apply an inverse color transform to the color values. The inverse color transform may be an inverse of a color transform applied by color transform unit 204 of encoder 200. For example, color transform unit 204 may transform color information from an RGB color space to a YCbCr color space. Accordingly, inverse transform color unit 322 may transform color information from the YCbCr color space to the RGB color space.

The various units of FIG. 2 and FIG. 3 are illustrated to assist with understanding the operations performed by encoder 200 and decoder 300. The units may be implemented as fixed-function circuits, programmable circuits, or a combination thereof. Fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Figure 4:
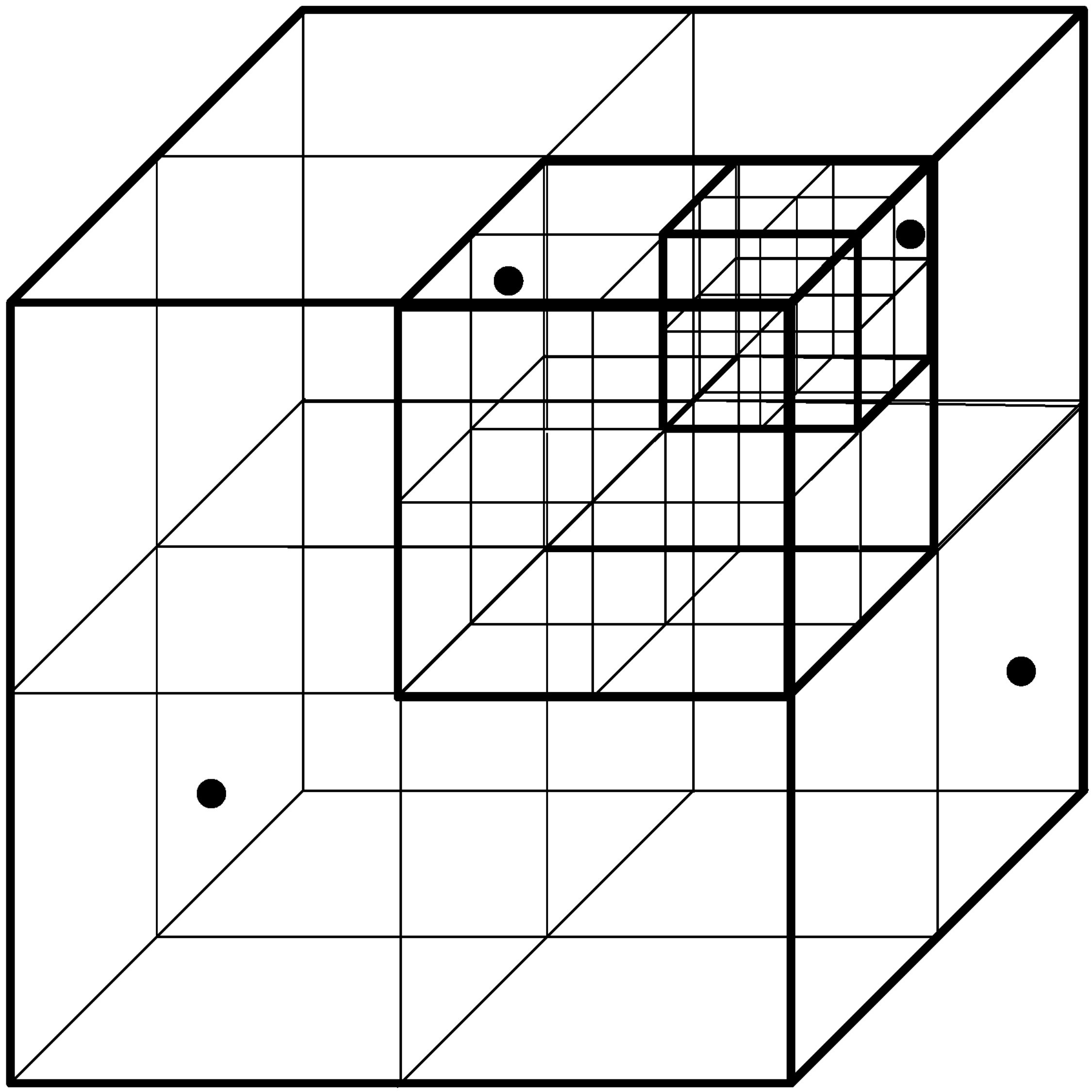
FIG. 4 is a conceptual diagram illustrating an example octree split for geometry coding.

For geometry, two different types of coding techniques exist: Octree and predictive-tree coding. In the following, we focus on the octree coding. For Category 3 data, the compressed geometry is typically represented as an octree from the root all the way down to a leaf level of individual voxels. For Category 1 data, the compressed geometry is typically represented by a pruned octree (i.e., an octree from the root down to a leaf level of blocks larger than voxels) plus a model that approximates the surface within each leaf of the pruned octree. In this way, both Category 1 and 3 data share the octree coding mechanism, while Category 1 data may in addition approximate the voxels within each leaf with a surface model (known as trisoup coding). The surface model used is a triangulation comprising 1-10 triangles per block, resulting in a triangle soup. At each node of an octree, an occupancy is signaled (when not inferred) for one or more of its child nodes (up to eight nodes). Multiple neighbourhoods are specified including (a) nodes that share a face with a current octree node, (b) nodes that share a face, edge or a vertex with the current octree node, etc. Within each neighbourhood, the occupancy of a node and/or its children may be used to predict the occupancy of the current node or its children. For points that are sparsely populated in certain nodes of the octree, the codec also supports a direct coding mode where the 3D position of the point is encoded directly. A flag may be signaled to indicate that a direct mode is signaled. At the lowest level, the number of points associated with the octree node/leaf node may also be coded. FIG. 4 is a conceptual diagram illustrating an example octree split for geometry coding.

Once the geometry is coded, the attributes corresponding to the geometry points are coded. When there are multiple attribute points corresponding to one reconstructed/decoded geometry point, an attribute value may be derived that is representative of the reconstructed point.

There are 3 attribute coding methods in G-PCC: Region Adaptive Hierarchical Transform (RAHT) coding, interpolation-based hierarchical nearest-neighbour prediction (Predicting Transform), and interpolation-based hierarchical nearest-neighbour prediction with an update/lifting step (Lifting Transform). RAHT and Lifting are typically used for Category 1 data, while Predicting is typically used for Category 3 data. However, either method may be used for any data, and, just like with the geometry codecs in G-PCC, the attribute coding method used to code the point cloud is specified in the bitstream.

The coding of the attributes may be conducted in a level-of-detail, where with each level of detail a finer representation of the point cloud attribute may be obtained. Each level of detail may be specified based on distance metric from the neighbouring nodes or based on a sampling distance.

At encoder 200, the residual obtained as the output of the coding methods for the attributes are quantized and coded using context adaptive arithmetic coding, such as CAB AC coding. To apply CAB AC encoding to a syntax element, encoder 200 may binarize the value of the syntax element to form a series of one or more bits, which are referred to as "bins." In addition, encoder 200 may identify a coding context. The coding context may identify probabilities of bins having particular values. For instance, a coding context may indicate a 0.7 probability of coding a 0-valued bin and a 0.3 probability of coding a 1-valued bin. After identifying the coding context, encoder 200 may divide an interval into a lower sub-interval and an upper sub-interval. One of the sub-intervals may be associated with the value 0 and the other sub-interval may be associated with the value 1. The widths of the sub-intervals may be proportional to the probabilities indicated for the associated values by the identified coding context. If a bin of the syntax element has the value associated with the lower sub-interval, the encoded value may be equal to the lower boundary of the lower sub-interval. If the same bin of the syntax element has the value associated with the upper sub-interval, the encoded value may be equal to the lower boundary of the upper sub-interval. To encode the next bin of the syntax element, encoder 200 may repeat these steps with the interval being the sub-interval associated with the value of the encoded bit. When encoder 200 repeats these steps for the next bin, encoder 200 may use modified probabilities based on the probabilities indicated by the identified coding context and the actual values of bins encoded.

When decoder 300 performs CABAC decoding on a value of a syntax element, decoder 300 may identify a coding context. Decoder 300 may then divide an interval into a lower sub-interval and an upper sub-interval. One of the sub-intervals may be associated with the value 0 and the other sub-interval may be associated with the value 1. The widths of the sub-intervals may be proportional to the probabilities indicated for the associated values by the identified coding context. If the encoded value is within the lower sub-interval, decoder 300 may decode a bin having the value associated with the lower sub-interval. If the encoded value is within the upper sub-interval, decoder 300 may decode a bin having the value associated with the upper sub-interval. To decode a next bin of the syntax element, decoder 300 may repeat these steps with the interval being the sub-interval that contains the encoded value. When decoder 300 repeats these steps for the next bin, decoder 300 may use modified probabilities based on the probabilities indicated by the identified coding context and the decoded bins. Decoder 300 may then de-binarize the bins to recover the value of the syntax element.

Predictive geometry coding was introduced as an alternative to the octree geometry coding. In the example of FIG. 2, encoding prediction unit 211 and/or prediction tree construction unit 207 may implement predictive geometry encoding. In the example of FIG. 3, decoding prediction unit 313 and/or prediction tree construction unit 307 may implement predictive geometry decoding.

Figure 5:
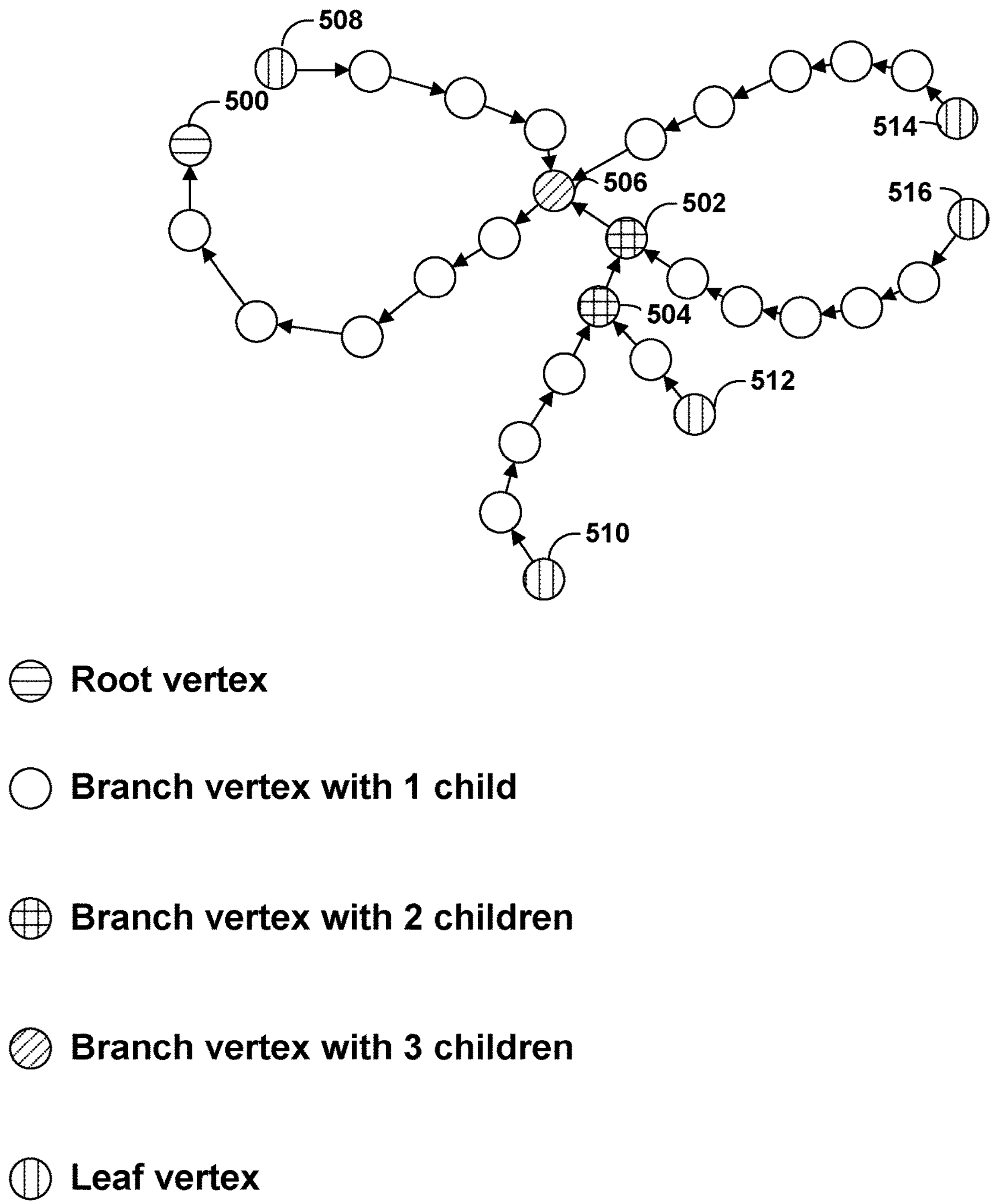
FIG. 5 is a conceptual diagram illustrating an example of a prediction tree.

When encoding or decoding points using predictive geometry coding, nodes may be arranged in a tree structure (i.e., a prediction tree) that defines a prediction structure. G-PCC encoder 200 and G-PCC decoder 300 may use various prediction strategies to predict the coordinates of each node in the tree structure with respect to its predictors. FIG. 5 is a conceptual diagram illustrating an example of a prediction tree 500. In the example of FIG. 5, prediction tree 500 is shown as a directed graph where arrows point to the prediction direction. The horizontally lined node 501 is the root node and has no predictors. Double-lined nodes (e.g., nodes 502, 504) have two children; the diagonally lined node (e.g., node 506) has 3 children; the open nodes have one child and the vertically lined nodes (e.g., nodes 508, 510, 512, 514, and 516) are leaf nodes and these have no children. Every node aside from the root node has only one parent node.

Four prediction strategies are specified for each node based on its parent (p0), grand-parent (p1) and great-grand-parent (p2):

No prediction/zero prediction (0)

Delta prediction (p0)

Linear prediction (2*p0−p1)

Parallelogram prediction (p0+p1−p2)

In the delta prediction strategy, encoding prediction unit 211 of G-PCC encoder 200 may determine a difference (delta) between the position of a current node and the position of the parent node. G-PCC encoder 200 may signal the difference in a bitstream. Decoding prediction unit 313 of G-PCC decoder 300 may use the signaled difference and the position of the parent node to determine the position of the current node. In the linear prediction strategy, encoding prediction unit 211 may determine a predictor position using a linear equation (e.g., 2*p0−p1) that takes a position of a parent node and a position of a grandparent node as parameters. Encoding prediction unit 211 may then determine a difference between the predictor position and the position of the current node. G-PCC encoder 200 may signal the difference in the bitstream. Decoding prediction unit 313 of G-PCC decoder 300 may use the predictor position and the difference to determine the position of the current node. In the parallelogram prediction strategy, encoding prediction unit 211 determines a predictor position using an equation (e.g., p0+p1−p2) that takes a position of a parent node, a position of a grandparent node, and a position of a great-grandparent node as parameters. Encoding prediction unit 211 may then determine a difference between the predictor position and the position of the current node. G-PCC encoder 200 may signal the difference in the bitstream. Decoding prediction unit 313 may use the predictor position and the difference to determine the position of the current node.

G-PCC encoder 200 may employ any algorithm to generate the prediction tree. In some examples, the algorithm may be determined based on the application/use case and several strategies may be used. For each node, the residual coordinate values may be encoded in the bitstream starting from the root node in a depth-first manner. Predictive geometry coding is useful mainly for Category 3 (LIDAR-acquired) point cloud data, e.g., for low-latency applications.

Angular mode may be used in predictive geometry coding, where the characteristics of LIDAR sensors may be utilized in coding the prediction tree more efficiently. The coordinates of the positions are converted to the (r, ϕ, i) (radius, azimuth and laser index) domain and a prediction is performed in this domain. Thus, residuals are coded in r, ϕ, i domain. Due to the errors in rounding, coding in the r, ϕ, i domain is not lossless. Hence, a second set of residuals are coded which correspond to the Cartesian coordinates. A description of the encoding and decoding strategies used for angular mode for predictive geometry coding is provided below.

Figure 6A:
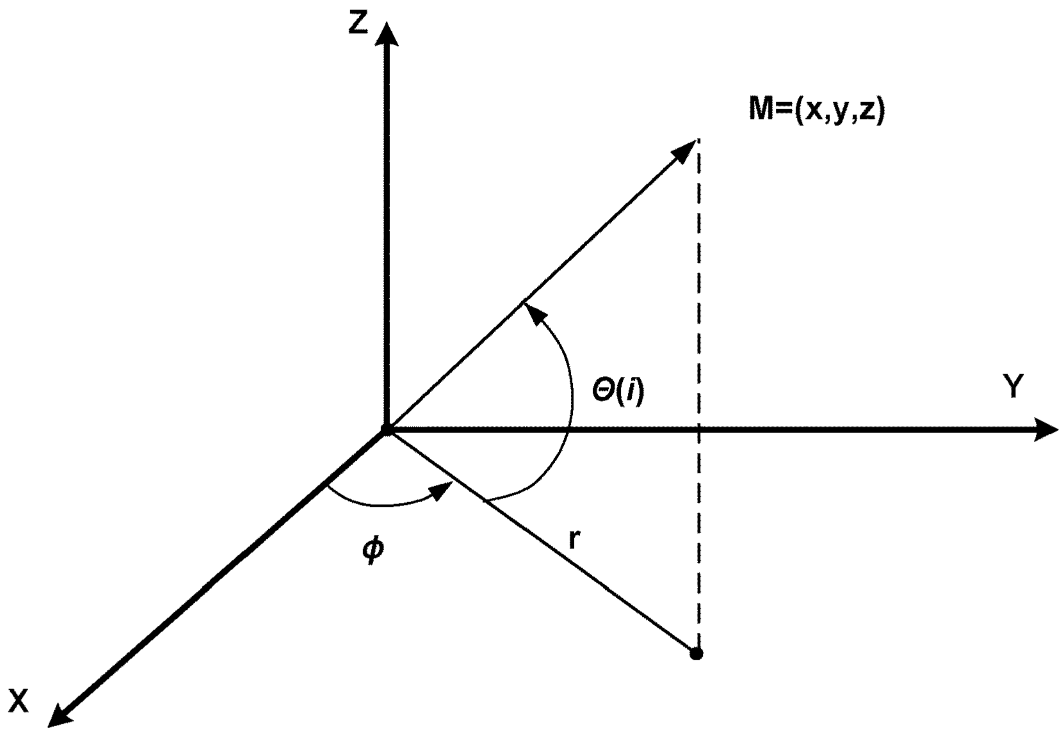
FIG. 6A and FIG. 6B are conceptual diagrams illustrating an example spinning LIDAR acquisition model.
Figure 6B:
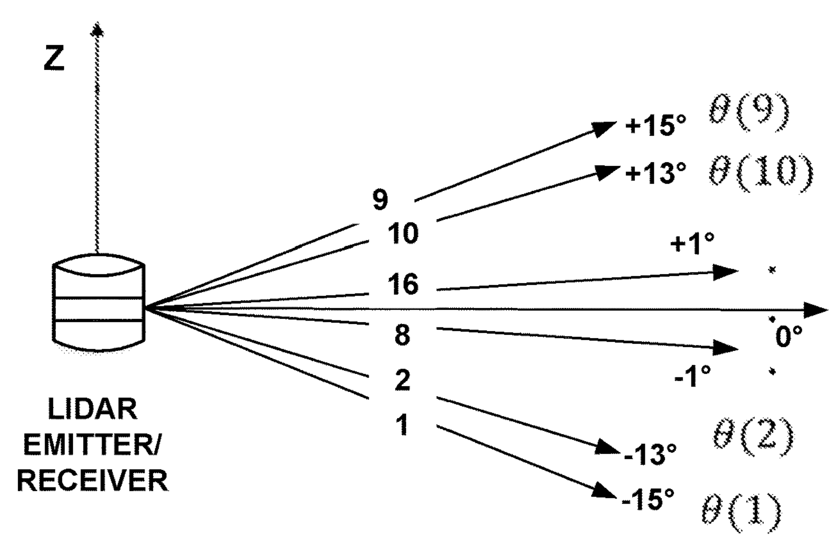

The process focuses on point clouds acquired using a spinning LIDAR model. Here, the LIDAR has N lasers (e.g., N=16, 32, 64) spinning around the Z axis according to an azimuth angle ϕ (see FIG. 6A and FIG. 6B). Each laser may have different elevation $\theta(i)_{i=1 \ldots N}$ and height $\zeta(i)_{i=1 \ldots N}$. Supposing that the laser i hits a point M, with cartesian integer coordinates (x, y, z), defined according to the coordinate system described in FIG. 6A and FIG. 6B. FIG. 6A and FIG. 6B are conceptual diagrams illustrating an example spinning LIDAR acquisition model.

This method introduces to model the position of M with three parameters (r, ϕ, i), which are computed as follows:

$$r = \sqrt{x^2 + y^2}$$

$$\phi = a\tan 2(y, x)$$

$$i = \arg\min_{j=1 \ldots N}\{z + \varsigma(j) - r \times \tan(\theta(j))\},$$

More precisely, the process uses the quantized version of (r, ϕ, i), denoted $(\tilde{r}, \tilde{\phi}, i)$, where the three integers $\tilde{r}$, $\tilde{\phi}$ and i are computed as follows:

$$\tilde{r} = \text{floor}\left(\frac{\sqrt{x^2 + y^2}}{q_r} + o_r\right) = hypot(x, y)$$

$$\tilde{\phi} = \text{sign}(a\tan 2(y, x)) \times \text{floor}\left(\frac{|a\tan 2(y, x)|}{q_\phi} + o_\phi\right)$$

$$i = \arg\min_{j=1 \ldots N}\{z + \varsigma(j) - r \times \tan(\theta(j))\}$$

where $(q_r, o_r)$ and $(q_\phi, o_\phi)$ are quantization parameters controlling the precision of $\tilde{\phi}$ and $\tilde{r}$, respectively.

sign(t) is the function that return 1 if t is positive and (−1) otherwise.

|t| is the absolute value of t.

To avoid reconstruction mismatches due to the use of floating-point operations, the values of $\zeta(i)_{i=1 \ldots N}$ and $\tan(\theta(i))_{i=1 \ldots N}$ are pre-computed and quantized as follows:

$$\tilde{z}(i) = \text{sign}(\varsigma(i)) \times \text{floor}\left(\frac{|\varsigma(i)|}{q_\varsigma} + o_\varsigma\right)$$

$$\tilde{t}(i) = \text{sign}\left(\varsigma(\tan(\theta(j))) \times \text{floor}\left(\frac{|\tan(\theta(j)|}{q_\theta} + o_\theta\right)\right)$$

where $(q_\zeta, o_\zeta)$ and $(q_\theta, o_\theta)$ are quantization parameters controlling the precision of $\tilde{\zeta}$ and $\tilde{\theta}$, respectively.

The reconstructed cartesian coordinates are obtained as follows:

$$\hat{x}=\text{round}(\tilde{r}\times q_r\times \text{app\_cos}(\tilde{\phi}\times q_\phi))$$

$$\hat{y}=\text{round}(\tilde{r}\times q_r\times \text{app\_sin}(\tilde{\phi}\times q_\phi))$$

$$\hat{z}=\text{round}(\tilde{r}\times q_r\times \tilde{t}(i)\times q_\theta-\tilde{z}(i)\times q_\zeta),$$

where app_cos(·) and app_sin(·) are approximation of cos(·) and sin(·). The calculations could be using a fixed-point representation, a look-up table and linear interpolation.

Note that $(\hat{x}, \hat{y}, \hat{z})$ may be different from (x, y, z) due to various reasons:

quantization approximations model imprecision model parameters imprecisions

Let $(r_x, r_y, r_z)$ be the reconstruction residuals defined as follows:

$$r_x=x-\hat{x}$$

$$r_y=y-\hat{y}$$

$$r_z=z-\hat{z}$$

In this process, encoder 200 may proceed as follows:

Encode the model parameters $\tilde{t}(i)$ and $\tilde{z}(i)$ and the quantization parameters $q_r$ $q_\zeta$, $q_\theta$ and $q_\phi$ Apply the geometry predictive scheme described in Text of ISO/IEC FDIS 23090-9 Geometry-based Point Cloud Compression, ISO/IEC JTC 1/SC29/WG 7 m55637, Teleconference, October 2020, to the representation $(\tilde{r}, \tilde{\phi}, i)$ A new predictor leveraging the characteristics of LIDAR could be introduced. For instance, the rotation speed of the LIDAR scanner around the z-axis is usually constant. Therefore, we could predict the current $\tilde{\phi}(j)$ as follows:

$$\tilde{\phi}(j)=\tilde{\phi}(j-1)+n(j)\times\delta_{\phi}(k)$$

Where $(\delta_{\phi}(k))_{k=1 \ldots K}$ is a set of potential speeds from the encoder may use. The index k may be explicitly written to the bitstream or may be inferred from the context based on a deterministic strategy applied by both the encoder and the decoder, and n(j) is the number of skipped points which may be explicitly written to the bitstream or may be inferred from the context based on a deterministic strategy applied by both G-PCC encoder 200 and G-PCC decoder 300. n(j) is also referred to as "phi multiplier" later. Note, n(j) is currently used only with delta predictor.

Encode with each node the reconstruction residuals ($r_x$, $r_y$, $r_z$)

Decoder 300 may proceed as follows:

Decode the model parameters $\tilde{t}(i)$ and $\tilde{z}(i)$ and the quantization parameters $q_r$, $q_\zeta$, $q_\theta$ and $q_\phi$ Decode the ($\tilde{r}$, $\tilde{\phi}$, i) parameters associated with the nodes according to the geometry predictive scheme described in [1]

Compute the reconstructed coordinates ($\hat{x}$, $\hat{y}$, $\hat{z}$) as described above.

Decode the residuals ($r_x$, $r_y$, $r_z$)

As discussed in the next section, lossy compression could be supported by quantizing the reconstruction residuals ($r_x$, $r_y$, $r_z$)

Compute the original coordinates (x, y, z) as follows:

$$x=r_x+\hat{x}$$

$$y=r_y+\hat{y}$$

$$z=r_z+\hat{z}$$

Lossy compression may be achieved by applying quantization to the reconstruction residuals ($r_x$, $r_y$, $r_z$) or by dropping points.

The quantized reconstruction residuals may be computed as follows:

$$\tilde{r}_x = \text{sign}(r_x)\times\text{floor}\left(\frac{|r_x|}{q_x}+o_x\right)$$

$$\tilde{r}_y = \text{sign}(r_y)\times\text{floor}\left(\frac{|r_y|}{q_y}+o_y\right)$$

$$\tilde{r}_z = \text{sign}(r_z)\times\text{floor}\left(\frac{|r_z|}{q_z}+o_z\right)$$

Where ($q_x$, $o_x$), ($q_y$, $o_y$) and ($q_z$, $o_z$) are quantization parameters controlling the precision of $\tilde{r}_x$, $\tilde{r}_y$ and $\tilde{r}_z$, respectively.

Trellis quantization may be used to further improve the RD (rate-distortion) performance results. The quantization parameters may change at a sequence/frame/slice/block level to achieve region adaptive quality and for rate control purposes.

Predictive geometry coding is a form of inter prediction that uses a prediction tree structure to predict the positions of the points. When angular coding is enabled, the x, y, z coordinates are transformed to radius, azimuth and laserID (r, φ, i) coordinates and residuals are signaled in these three coordinates as well as in the x, y, z dimensions. The intra prediction used for radius, azimuth and laserID may be one of four modes and the predictors are the nodes that are classified as parent, grand-parent and great-grandparent in the prediction tree with respect to the current node. The predictive geometry coding, as currently designed in G-PCC Ed.1, is an intra coding tool as it only uses points in the same frame for prediction. Additionally, using points from previously decoded frames may provide a better prediction and thus better compression performance.

Inter prediction, as initially proposed, predicted the radius of a point from a reference frame. For each point in a prediction tree, such as prediction tree 500 (FIG. 5), G-PCC encoder 200 or G-PCC decoder 300 determines whether the point is inter predicted or intra predicted. G-PCC encoder 200 may use a flag to indicate whether the point is inter predicted or intra predicted. When a point is intra predicted, G-PCC encoder 200 and G-PCC decoder 300 may use the intra prediction modes of predictive geometry coding. When inter prediction is used, the azimuth and laserID are still predicted with intra prediction, while the radius is predicted from the point in the reference frame that has the same laserID as the current point and an azimuth that is closest to the current azimuth. A further development of this process may enable inter prediction of the azimuth and laserID in addition to radius prediction. When inter prediction is applied, G-PCC encoder 200 and G-PCC decoder 300 may predict the radius, azimuth and laserID of the current point based on a point that is near the azimuth position of a previously decoded point in the reference frame. In addition, G-PCC encoder 200 and G-PCC decoder 300 may use separate sets of contexts for inter prediction and intra prediction.

Figure 7:
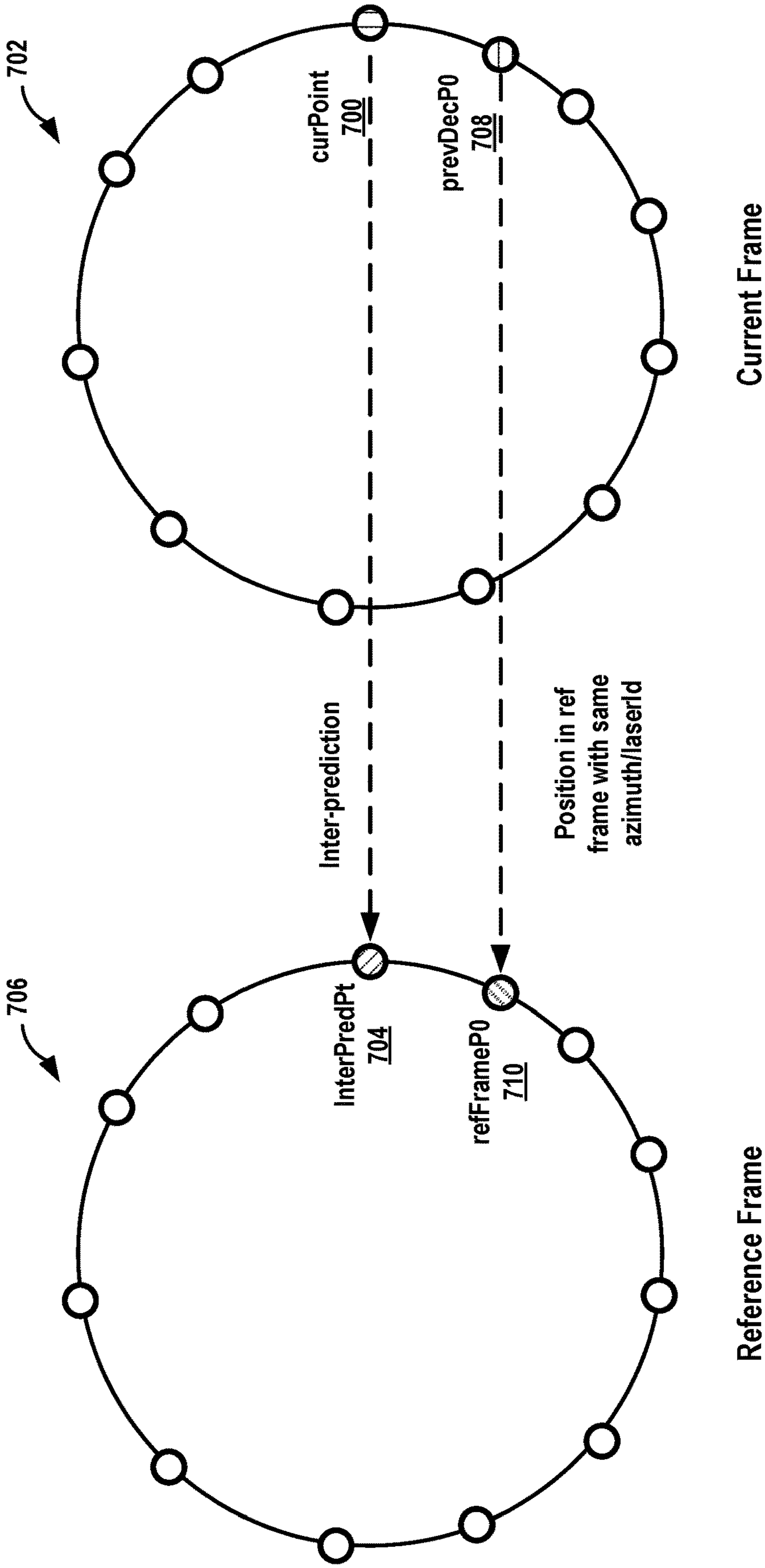
FIG. 7 is a conceptual diagram illustrating an example of inter-prediction of a current point (curPoint) from a point (interPredPt) in the reference frame.

A process for inter prediction is illustrated in FIG. 7. FIG. 7 is a conceptual diagram illustrating an example of inter prediction of a current point 700 (curPoint) in a current frame 702 from an inter prediction point 704 (interPredPt) (i.e., an inter predictor) in a reference frame 706. Each small circle corresponds to a point or other position. In the example of FIG. 7, the extension of inter prediction to azimuth, radius, and laserID may include or consist of the following steps:

For a given point, determine the previous decoded point (prevDecP0).

Determine a position in reference frame (refFrameP0) that has the same scaled azimuth and laserID as prevDecP0.

In reference point cloud frame, find the first point (interPredPt) that has azimuth (e.g., scaled azimuth) greater than that of refFrameP0. The interPredPt is also referred to as the "Next" inter predictor.

Thus, in the example of FIG. 7, G-PCC encoder 200 and G-PCC decoder 300 may identify a previous point 708 (prevDecP0) in current frame 702. Previous point 708 was encoded or decoded previous to current point 700 of current frame 702.

Additionally, G-PCC encoder 200 and G-PCC decoder 300 may identify a reference position 710 (refFrameP0). Reference position 710 is a position in reference frame 706 and has a laser identifier (laserID) and a scaled azimuth matching a laser identifier and an azimuth of previous point 708 in current frame 702. G-PCC encoder 200 and G-PCC decoder may identify inter prediction point 704. Inter prediction point 704 may be a next point in reference frame 706 having a scaled azimuth greater than the scaled azimuth of reference position 710. Inter prediction point 704 may be a predictor of the radius, azimuth, and laserID of current point 700. G-PCC encoder 200 may encode current point 700 based on the predictor for current point 700. For instance, as part of encoding current point 700, G-PCC encoder 200 may signal a difference between a position of inter prediction point 704 and a position of current point 700. As part of decoding current point 700, G-PCC decoder 300 may add the signaled difference to the position of inter prediction point 704 to determine the position of current point 700.

Figure 8:
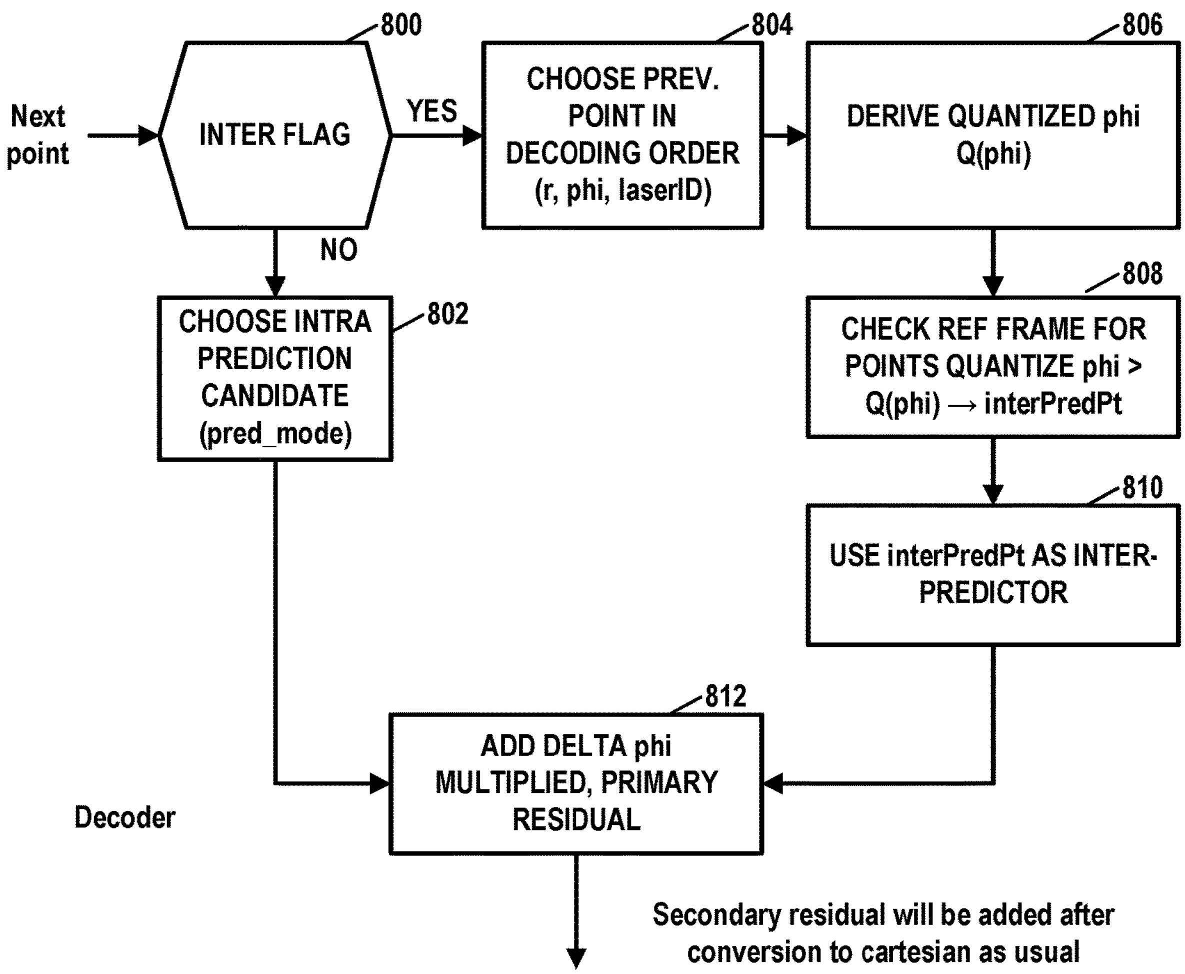
FIG. 8 is an example decoder flowchart.

FIG. 8 is a flowchart illustrating an example decoding flow associated with the "inter flag" that is signaled for every point. The inter flag signaled for a point indicates whether inter prediction is applied for the point. The flowcharts of this disclosure are provided as examples. Other examples may include morn, fewer, or different steps, or steps may be performed in different orders.

In the example of FIG. 8, G-PCC decoder 300 may determine whether an inter flag of a next point to be decoded (i.e., a current point of a current frame of point cloud data) indicates that the current point is inter predicted (800). If the inter flag of the current point does not indicate that the current point is inter predicted ("NO" branch of 800), G-PCC decoder 300 may identify an intra prediction candidate (802). For instance, G-PCC decoder 300 may determine an intra prediction strategy (e.g., no prediction, delta prediction, linear prediction, parallelogram prediction, etc.) to determine a predictor for the current point. A syntax element (pred_mode) signaled in geometry bitstream 203 may indicate the intra prediction strategy to use to determine the predictor for the current point.

On the other hand, if the inter flag for the current point indicates that the current point is inter predicted ("YES" branch of 800), G-PCC decoder 300 may identify a previous point in decoding order (e.g., previous point 708) (804). The previous point may have coordinates (r, phi, and laserID). G-PCC decoder 300 may then derive a quantized phi coordinate (i.e., azimuth coordinate) of the previous point (806). The quantized phi coordinate may be denoted as Q(phi). G-PCC decoder 300 may then check a reference frame (e.g., reference frame 706) for points (i.e., inter prediction points (e.g., interPredPt 704)) having quantized phi coordinates greater than the quantized phi coordinate of the previous point (808). G-PCC decoder 300 may use the inter prediction point as a predictor for the current point (810).

Regardless of whether G-PCC decoder 300 determines the predictor for the current point using intra prediction (e.g., as described with respect to step 802) or using inter prediction (e.g., as described with respect to steps 804-810), G-PCC decoder 300 may add a delta phi multiplier (812).

The LIDAR system may scan and sample the content at a particular azimuth frequency. G-PCC encoder 200 may signal the azimuth of a point using an azimuth residual value (resAz2). The azimuth residual is not the direct difference of the azimuth of the current point and the azimuth of the predictor for the current point (which may be determined using inter or intra prediction). Rather, G-PCC encoder 200 encodes the azimuth residual as a combination of a delta phi multiplier and a residual. For example, azimSpeed may represent the azimuth difference between successive captures of one of the rotating LIDAR sensors (note there are multiple sensors in each spinning LIDAR system). Thus, if each LIDAR sensor in the spinning LIDAR system captures 1000 points per rotation, then the azimSpeed would be (1<<azimBitDepth)/1000, effectively the azimuth difference between adjacent point captures. Here, azimBitDepth is a bitdepth used to represent the azimuth value at G-PCC encoder 200. (1<<azimBitDepth) represents one full rotation (of 360 degrees). Therefore, (1<<azimBitDepth)/1000 represents the difference between azimuth of two captures. Although LIDAR sensors may be designed to sample at constant intervals in a rotation, the difference between azimuth values of adjacent captures may not be azimSpeed, or a multiple of azimSpeed due to noise and other inaccuracies. A first azimuth residual resAz1, which is the difference in the azimuth of the current point and the predictor, is coded as a combination of delta phi multiplier (qphi) and a second azimuth residual (resAz2). qphi may be derived as follows:

```
qphi=deltaPhi>=0?(deltaPhi+(_geomAngularAzimuthSpeed>>1))/_geomAngularAzimuthSpeed

:-(-deltaPhi+(_geomAngularAzimuthSpeed>>1))/_geomAngularAzimuthSpeed;
```

The value of coded azimuth residual, resAz2, is obtained as resAz1−deltaPhi*azimSpeed. Both qphi and resAz2 are signaled in the bitstream. G-PCC decoder 300 may decode resAz2 and qphi. G-PCC decoder 300 may obtain the reconstructed azimuth residual (resAz1) as resAz2+qphi*azimSpeed.

Figure 9:
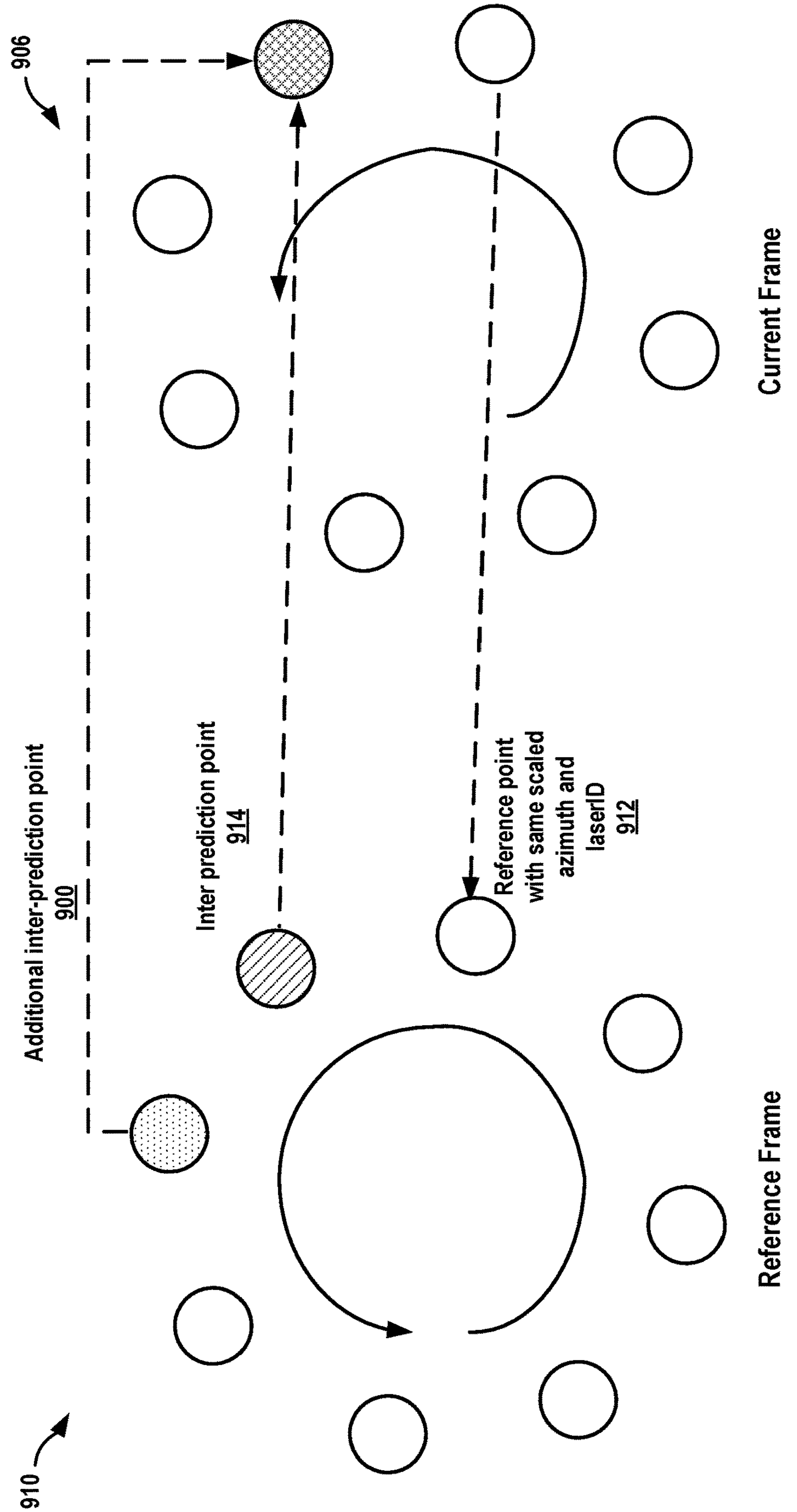
FIG. 9 is a conceptual diagram illustrating an example of an additional inter predictor point obtained from the first point that has azimuth greater than the inter predictor point.

FIG. 9 is a conceptual diagram illustrating an example additional inter predictor point 900 obtained from the first point that has azimuth greater than an inter predictor point 914. In the inter prediction method for predictive geometry described above with respect to FIG. 7, the radius, azimuth and laserID of a current point (current point 700) are predicted based on a point (inter prediction point 704) that is near the collocated azimuth position (reference position 710) in a reference frame (reference frame 706) when inter coding is applied. In the example of FIG. 9, G-PCC encoder 200 and G-PCC decoder 300 may determine additional inter predictor point 900 using the following steps:

a) for a given point (current point 904 of a current frame 906), determine a previous point 908 in current frame 906 ("prev decoded point" in FIG. 9);

b) determine a reference position 912 in a reference frame 910 that has the same scaled azimuth and laserID as the previous point 908 determined in step a) ("ref point with same scaled azimuth and laserID" in FIG. 9), c) determine a position in reference frame 910 as the first point that has an azimuth (e.g., scaled azimuth) greater than the reference position 912 determined in step b), to be used as the inter predictor point (inter prediction point 914 in FIG. 9).

An additional inter predictor point may be obtained by finding the first point that has an azimuth (e.g., scaled azimuth) greater than inter prediction point 914 determined in step c) as shown in FIG. 9 ("additional inter prediction point 900" in FIG. 9). Additional signaling may be used to indicate which of the predictors is selected if inter coding has been applied. The additional inter predictor point may also be referred to as the "NextNext" inter predictor.

A context selection algorithm may be applied for coding the inter prediction flag. For example, the inter prediction flag values of the five previously coded points may be used to select the context of the inter prediction flag in predictive geometry coding.

Figure 10:
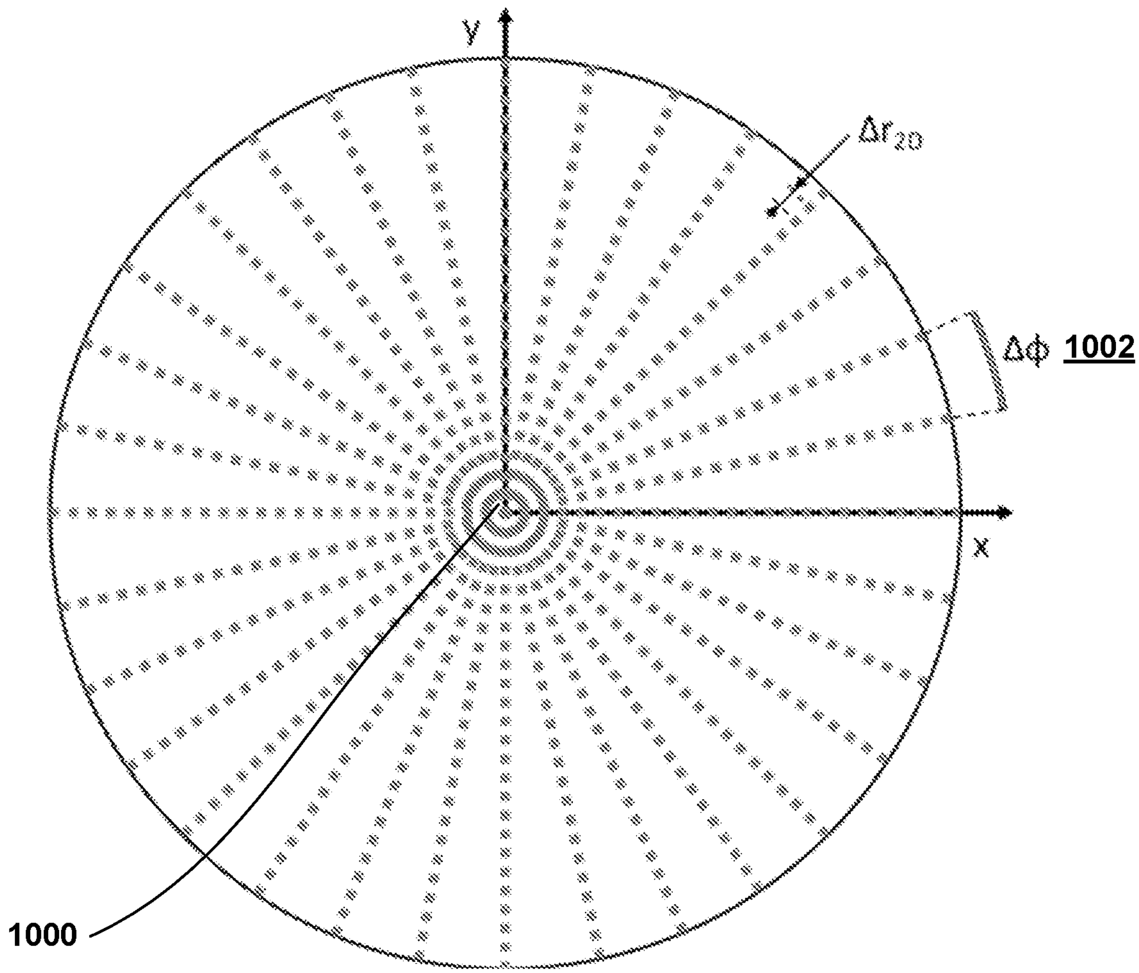
FIG. 10 is a conceptual diagram illustrating sampling of azimuthal angles and radius using uniform quantization, as in G-PCC Ed. 1.

Adaptive azimuthal angle quantization is now discussed. When using spherical coordinates in predictive geometry coding of LIDAR acquired point clouds in G-PCC Ed. 1, azimuthal angles are quantized regardless of the distance between the points and the LIDAR acquisition head. The sampling result of this quantization is roughly as illustrated in FIG. 10. FIG. 10 is a conceptual diagram illustrating sampling of azimuthal angles and radius using uniform quantization, as in G-PCC Ed. 1. FIG. 10 shows that the sampling density is high close to the origin, where a spinning sensor head 1000 is located, and becomes low in regions far from the spinning sensors head. Depending on the value $\Delta\phi$ (1002), one gets either too much precision for points $(r_1, \phi_1)$ close to the spinning sensor head or not enough precision for points $(r_2, \phi_2)$ far away from the sensor head. In the first case, for close points there is too much coded information for the residual error of azimuthal angle prediction. On the other hand, in the second case, there is not enough information coded for the residual error of azimuthal angle prediction of faraway points to have accurate precision on inverse transformed (x, y) values, thus leading to higher magnitude residual error in cartesian coordinates $(x_{res}, y_{res})$ to be coded. In both cases, the compression of the azimuthal angle $\phi$ is not optimal. In summary, the uniform quantization of $\phi$ does not lead to optimal representation of the point positions when considering the overall compression scheme of points in cartesian space.

The proposed method adaptively quantizes the azimuthal angle according to the radius, resulting in improved compression performance. To compress more efficiently, it is proposed to use an adaptive quantization step of the azimuthal angle $\phi$. Using the value of the reconstructed radius $r_{2D}$, the proposed non-uniform adaptive angular quantization step is changed to:

$$\Delta\phi(r_{2D})=\Delta\phi_{arc}/r_{2D}. \quad (1)$$

By using this non-uniform quantization step, the length of the arc resulting of the $\Delta\phi(\cdot)$ quantization step is uniform for any radius $r_1$, $r_2$ as this length is equal to $r_1\cdot\Delta\phi(r_1)=\Delta\phi_{arc}=r_2\cdot\Delta\phi(r_2)$.

Figure 11:
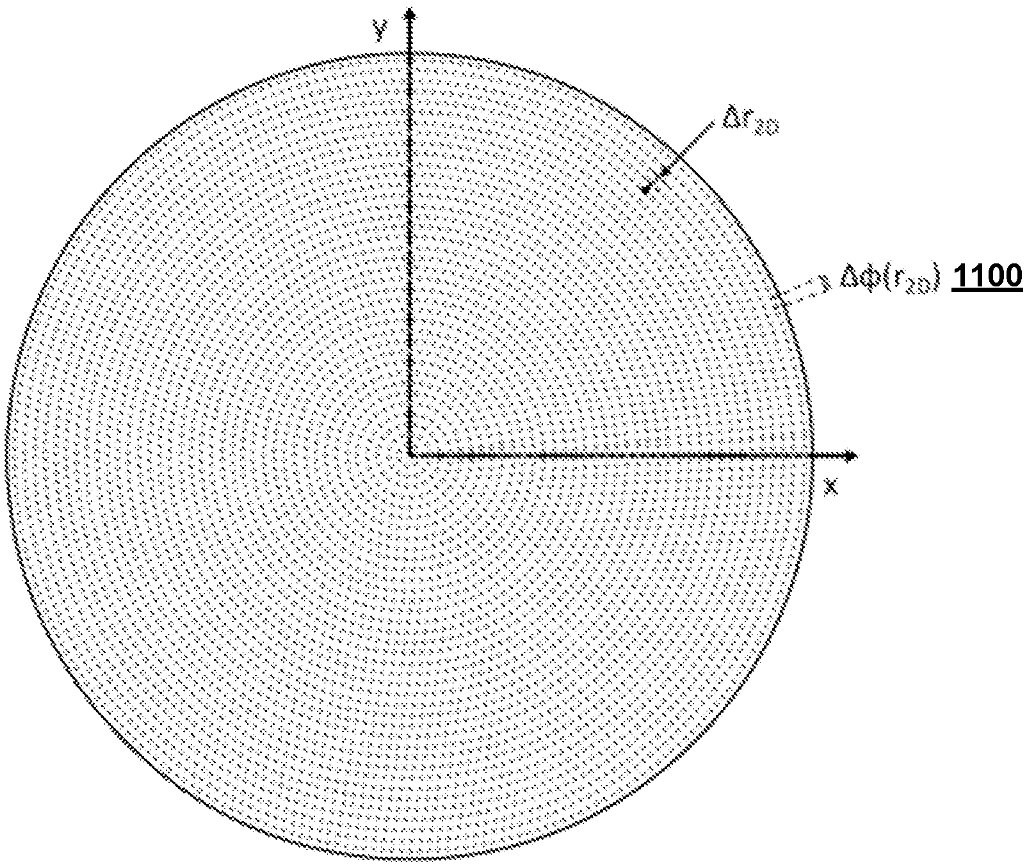
FIG. 11 is a conceptual diagram illustrating non-uniform quantization of the azimuthal angles, leading to uniform quantization arcs.
Figure 12:
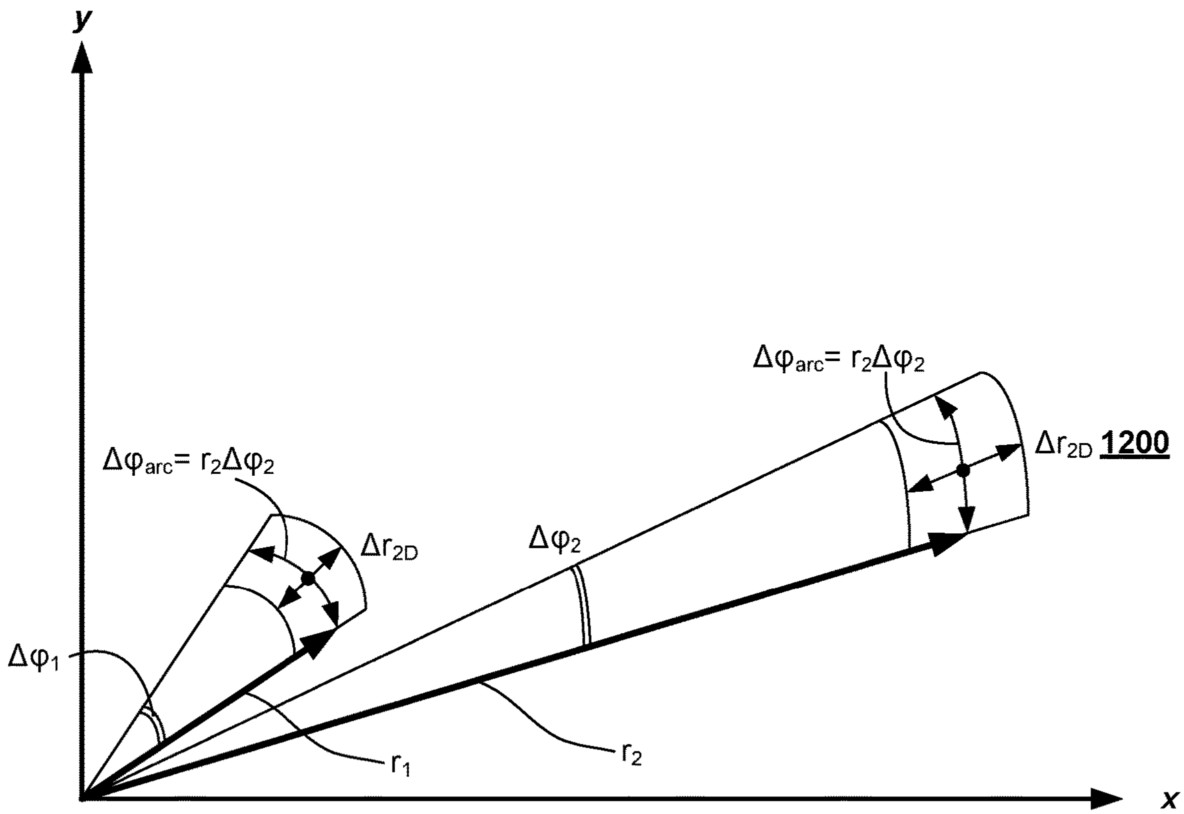
FIG. 12 is a conceptual diagram illustrating uniform quantization of circular arcs using $\Delta\phi_{arc}$ quantization step.

This non-uniform quantization step in $\phi$ domain may therefore provide a uniform quantization of circular arcs, with quantization step $\Delta\phi_{arc}$, for any radius as is illustrated in FIG. 11 and FIG. 12. FIG. 12 also shows the more uniform angular sectors implied by uniform quantization of the circular arcs, leading to more uniform maximum error introduced by the quantization of $\phi$. FIG. 11 is a conceptual diagram illustrating non-uniform quantization of the azimuthal angles, leading to uniform quantization arcs (e.g., arc 1100). FIG. 12 is a conceptual diagram illustrating uniform quantization of circular arcs (e.g., $\Delta\phi_{arc}$ 1200) using $\Delta\phi_{arc}$ quantization step.

Implementation details are described in J. Taquet, S. Lasserre, S. Gao, M.-L. Champel, [G-PCC][New] Improved Quantization of Azimuthal Angle in Predictive Geometry Coding, ISO/IEC JTC1/SC29/WG7 m55979, January 2021, with some additional modifications in J. Taquet, S. Lasserre, S. Gao, M.-L. Champel, [G-PCC][EE13.51] Report on Predictive Geometry Improvement, ISO/IEC JTC1/SC29/WG7 m56482, April 2021. The integer division in inverse quantization of the azimuth residual is approximated by using the Newton-Raphson division approximation algorithm. In addition, the internal precision for representing azimuthal angles is increased (e.g., 24-bit for lossless), which led to a modification of the implementation of integer sine and cosine functions to keep 32-bit arithmetic, but the modification does not affect the normative definition of these functions. It also led to adapting the scaling of spherical coordinates for attribute coding due to the increased precision.

The improved quantization of azimuthal angle has been made backward compatible with G-PCC Ed. 1 by adding a flag in the geometry parameter set extension to enable/disable the feature.

Coding of the azimuth angle residual is now discussed. The following process to improve the coding of the azimuthal angle residual may be implemented in addition to the adaptive azimuthal angle quantization that is described above. When using spherical coordinates in predictive geometry coding of LIDAR-acquired point clouds in G-PCC Ed.1, the prediction of the azimuthal angle of a point can be refined by adding a number 'k' (coded in bitstream) of azimuthal steps '$\varphi_{step}$' to the azimuthal angle prediction '$\varphi_{-n}$' provided by the 'n'-th predictor:

$$\varphi_{pred}=k^*\varphi_{step}+\varphi_{-n}. \quad (2)$$

The azimuthal step '$\varphi_{step}$' may basically correspond to the rotation performed by the LIDAR sensor head between two successive attempts for the acquisitions of points with a laser at a given elevation angle. It corresponds to the azimuthal angle provided by:

$$\varphi_{step}=\text{geom\_angular\_azimuth\_speed\_minus1}+1 \quad (3)$$

where 'geom_angular_azimuth_speed_minus1' is obtained from the geometry parameter set (GPS).

In G-PCC Ed.1, there is no constraint on the value of 'k'. Thus, the residual '$\varphi_{res}$' of the prediction of the azimuthal angle '$\varphi$' by predictor '$\varphi_{pred}$':

$$\varphi_{res}=\varphi-\varphi_{pred} \quad (4)$$

is unbounded.

In order to bound the residual '$\varphi_{res}$' such that it fits in the interval $[-\varphi_{step}/2; +\varphi_{step}/2]$, the value of 'k' may be determined as follows:

$$k=\text{round}((\varphi-\varphi_{-n})/\varphi_{step}) \quad (5)$$

More precisely, in the context of the adaptive quantization of azimuthal angle described above, the quantized azimuthal angle residual '$Q\varphi_{res}$' will satisfy the following equation:

$$-Q_\varphi(\varphi_{step}/2,r)=Q_\varphi(-\varphi_{step}/2,r)\le Q\varphi_{res}=Q_\varphi(\varphi_{res},r)\le Q_\varphi(\varphi_{step}/2,r) \quad (6)$$

where '$Q_\varphi(x, r)$' is the adaptive quantization of 'x' based on the coded radius 'r'.

Then, by using the value of the bound '$B=Q_\varphi(\varphi_{step}/2, r)$', the entropy coding of the quantized residual '$Q\varphi_{res}$' may be improved.

First, bound '$B=Q_\varphi(\varphi_{step}/2, r)$' is computed for each point as follows:

```
const int rec_radius_scaling=rPred+
    residual[0]<<3;//~r*2*pi

auto speed_r=int64_t(_geomAngularAzimuth
    Speed)*rec_radius_scaling;

int phiBound=divExp2RoundHalfInf(speed_r,_geo-
    m_angular_azimuth_scale_log 2+1);
```

Figure 13:
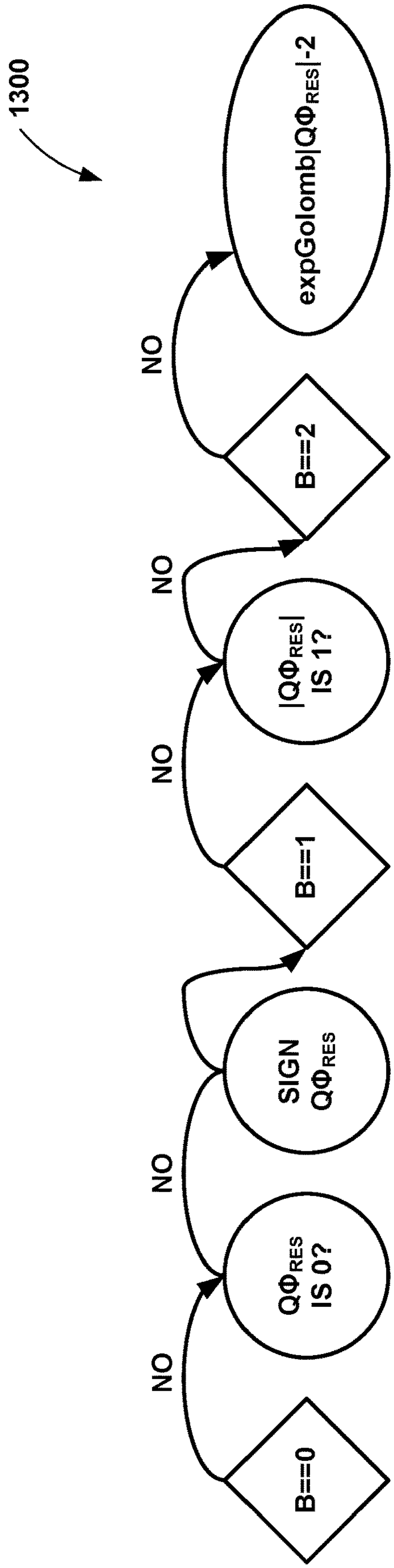
FIG. 13 is a conceptual diagram illustrating an example process of entropy encoding of quantized residual azimuthal angle using bound B.

Then, encoder 200 may perform entropy encoding as illustrated in FIG. 13. FIG. 13 is a conceptual diagram illustrating an example process 1300 of entropy encoding of quantized residual azimuthal angle using bound B. If bound 'B' equals zero, the quantized residual '$Q\varphi_{res}$' is zero, hence, no coding is needed. Otherwise, a flag is encoded to indicate if '$Q\varphi_{res}$' is equal to zero. If '$Q\varphi_{res}$' is nonzero, a sign bin is encoded. Then, if bound 'B' equals one, '$Q\varphi_{res}$' is either minus one or one, hence, no more encoding is needed. Otherwise, a flag is encoded to indicate if the absolute value of '$Q\varphi_{res}$' is equal to one. If the absolute value of '$Q\varphi_{res}$' is not equal to one, but bound 'B' equals two, '$Q\varphi_{res}$' is either minus two or two, and encoding stops. Otherwise, the remainder (i.e., '$|Q\varphi_{res}|-2$') is encoded using an expGolomb code. The number of entropy encoding contexts may be equal to 24.

A process for scaling azimuthal angle step is now discussed. In G-PCC Ed.1 a cartesian coordinates prediction ($x_{pred}$, $y_{pred}$) may be obtained using the following equation:

$$(x_{pred}, y_{pred}) = (\mathrm{round}(r_{2D\text{-}rec} * \cos(\varphi_{rec})), \mathrm{round}(r_{2D\text{-}rec} * \sin(\varphi_{rec})) \quad (7)$$

In the equation above, '$\varphi_{rec}$' is the reconstructed azimuthal angle and '$r_{2D\text{-}rec}$' is a reconstructed radius.

If implemented as an addition to the processes presented above, '$\varphi_{rec}=\varphi_{pred}+IQ_{\varphi}(Q_{\varphi}(\varphi_{res}, r), r)$', with '$Q_{\varphi}$' the adaptive quantization of azimuthal angle described in the section titled "Adaptive Azimuthal Angle Quantization.", '$IQ_{\varphi}$' the inverse quantization, and '$\varphi_{res}$' the azimuthal angle residual of the prediction.

In G-PCC Ed.1 and above processes, '$r_{2D\text{-}rec}$=r<<geom_angular_radius_inv_scale_log 2'; in

```
auto rec__radius__scaling = pred[0] + residual[0] << 3; // ~r*2*pi
auto azimuthSpeed = __geomAngularAzimuthSpeed;
if (rec__radius__scaling && rec__radius__scaling < Th0) {
  const int32__t pi = 1 << __geom__angular__azimuth__scale__log2 − 1;
  int32__t speed__r = azimuthSpeed*rec__radius__scaling;
  while (speed__r < pi) {
    speed__r <<= 1;
    azimuthSpeed <<= 1;
  }
}
```

Then, in encoder 200, the number of azimuthal steps 'qphi', and in both encoder 200 and decoder 300, the azimuthal angle predictor updated by the number of azimuthal angle steps 'pred[1]', are computed using 'azimuthSpeed' instead of '_geomAngularAzimuthSpeed= gps.geom_angular_azimuth_speed_minus1+1' as follows:

```
−qphi = residual[1] >= 0 ? (residual[1] + (__geomAngularAzimuthSpeed >> 1))
−   / __geomAngularAzimuthSpeed
−     : −(−residual[1] + (__geomAngularAzimuthSpeed >> 1))
−   / __geomAngularAzimuthSpeed;
−pred[1] += qphi * __geomAngularAzimuthSpeed;
+qphi = residual[1] >= 0 ? (residual[1] + (azimuthSpeed >> 1))
+    / azimuthSpeed
+      : −(−residual[1] + (azimuthSpeed >> 1))
+    / azimuthSpeed;
+pred[1] += qphi * azimuthSpeed;
 residual[1] = point[1] − pred[1];
```

comparison to the coded point cloud cartesian precision, the radius 'r' which is internally used in, and coded by, the codec has a precision reduced by a number of bits equal to 'geom_angular_radius_inv_scale_log 2' obtained from the geometry parameter set (this is equivalent to a quantization of the radius).

A process of enabling scaling of azimuth angle step is now discussed. If both the improved quantization of azimuthal angle as presented above and the improved azimuthal angle residual coding as presented above are implemented, the bound '$B=Q_{\varphi}(\varphi_{step}/2, r)$' (see section titled "Improved Coding of Azimuthal Angle Residual"), which is computed for each point for entropy (de)coding, is used to enable the scaling of the azimuthal angle step. If the integer bound 'B' is equal to 0 or equivalently 'B<1', then:

$$\varphi_{pred} = k * S(\varphi_{step}, r) + \varphi_{-n}, \quad (8)$$

where '$S(\varphi_{step},r)$' is a scaled azimuthal angle step.

A process for computing a scaled azimuth angle step is now discussed. In order to code an optimal number 'k' of scaled azimuthal angle steps '$S(\varphi_{step},r)$', an optimal '$S(\varphi_{step}, r)$' would become:

$$S(\zeta_{step}, r) = 2^{geom\_angular\_azimuth\_scale\_log\ 2}/(r<<3) \quad (9)$$

One issue with equation (9) is that equation (9) requires an integer division in decoder 300. Therefore, an approximation of the division in $S(\zeta_{step},r)$ is implemented. To compute the approximation, the highest power is used of the '$2^n$' factor of '$\varphi_{step}$' such that '$2^n*\varphi_{step}<2^{geom\_angular\_azimuth\_scale\_log\ 2}/(r<<3)$'.

The scaled azimuthal angle step '$2^n*\varphi_{step}$' can be obtained by iteratively scaling '$\varphi_{step}$' and '$\varphi_{step}*(r<<3)$' by '$2^n$', starting from 'n=0', and using successive bitwise shift of 1 bit operations on both '$2^n*\varphi_{step}*(r<<3)$' and '$2^n*\varphi_{step}$' while '$2^n*\varphi_{step}*(r<<3)$' is lower than $2\pi$ angle (i.e. '$2^{geom\_angular\_azimuth\_scale\_log\ 2}$') as follows:

Radius residual sign coding is now discussed. In the predictive geometry encoder, the sign of a radius residual is encoded with a single entropy coding context. Because the radius residual sign should be more or less piecewise constant when the radius is predicted from the preceding point radius (i.e., parent node in the predictive tree), the sign probability would be highly correlated with the sign value of the radius of preceding encoded point, when the parent node is used as a predictor. Moreover, this probability should increase when the successively coded points have similar azimuthal angle (i.e., the number of azimuthal steps encoded in the bitstream and added to the predictor is zero).

Therefore, the presented method uses a table of 2×2×2×2 (i.e., 16) contexts as follows:

$$ctx_{sign} = ctxTab[I_{previous}][I_{penulm}][I_{last}][s_{res,prec}] \quad (10)$$

where 'ctxTab' it the table of contexts, '$I_{previous}$' is a Boolean value indicating if the selected predictor is the parent node, '$I_{penulm}$' is a Boolean value indicating if the coded number of azimuthal steps for preceding point is equal to zero, '$I_{last}$' is a Boolean value indicating if the coded number of azimuthal steps for the current point is equal to zero, and '$s_{res,prec}$' is a Boolean value indicating the sign of the last coded radius residual.

Figure 14:
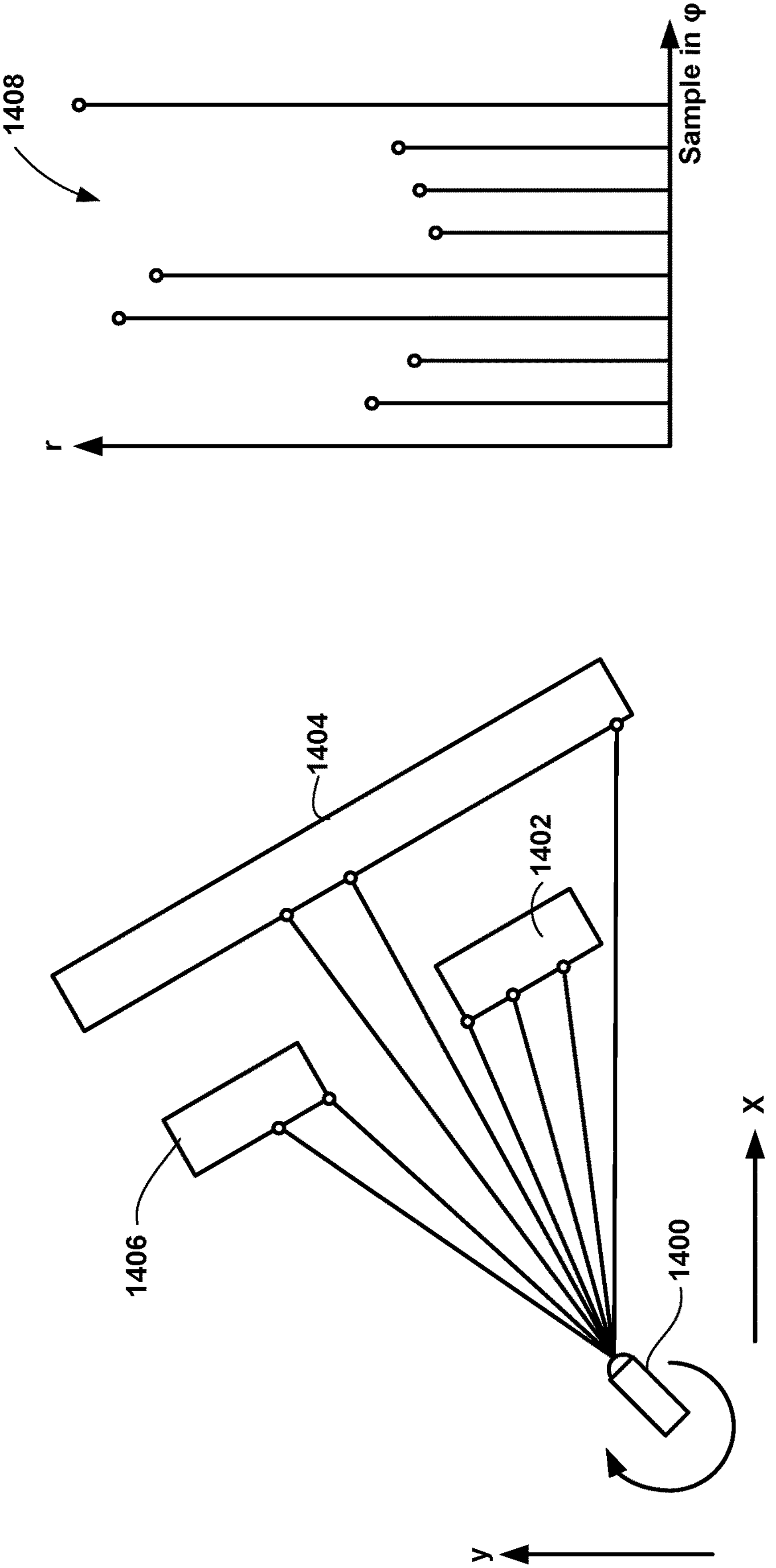
FIG. 14 is a conceptual diagram illustrating an example of a laser probing two different objects.

A predictor list is now discussed. A dynamic list of predictors is derived to perform better prediction after a laser beam has moved from a first object, with a first distance, to another object, with a different distance, has passed over it and is passing back to the first object. It may occur, for instance, when one object is in front of another one (like a car in from of a wall, for instance), or when an object has holes (walls with open doors or windows, or entrance wall for instance), e.g., as illustrated by FIG. 14. FIG. 14 is a conceptual diagram illustrating an example of a laser 1400 probing different objects 1402, 1404, and 1406. FIG. 14 also shows a histogram 1408 of distances measured using laser 1400.

Instead of using the list of G-PCC predictors, a list of N predictors is built from a prediction buffer (e.g., prediction buffer 213 of FIG. 2 or prediction buffer 315 of FIG. 3) of N pairs of one radius and one azimuthal angle ($r_n$, $\varphi_n$). The predictors derivation is detailed in the subsection entitled "Derivation of the predictors" and the buffer management is explained in subsection entitled "Management of the prediction buffer". The coding of the predictor index may be performed using a unary coding with one context per predictor index.

The derivation of a predictor is performed as follows:

If the point being predicted is the first point of the tree (i.e., there is no parent node), the predictor $PR_0$ is set equal to ($r_{min}$, 0, 0), the other predictors $PR_{n>0}$ are set equal to (0, 0, 0).

If the point has a parent point, a. the predictor $PR_0$ is set equal to ($r_0$, $\varphi_0$, $\theta_0$), where $\theta_0$ is the laser index θ value of the parent point p0 coded in the parent node, and where ($r_0$, $\varphi_0$ is the first pair in the buffer (as will be understood from the buffer management, it is also equal to respectively the radius r, and the azimuthal angle φ of the parent point p0 coded in the parent node);

b. the predictors $PR_{n>0}$ are set equal to ($r_n$, $\varphi_n$+k*$\varphi_{step}$, $\theta_0$), where $\theta_0$ is the laser index θ value of the parent point p0 coded in the parent node, and where ($r_n$, $\varphi_n$) is the n-th pair in the buffer, and k equals 0 if $|\varphi_0-\varphi_n|<\varphi_{step}$, else k equals the integer division $(\varphi_0-\varphi_n)/\varphi_{step}$.

Since it is better to avoid integer division in decoder 300, $(\varphi_0-\varphi_n)/\varphi_{step}$ may be approximated using the divApprox function of G-PCC: k=divApprox($\varphi_0-\varphi_n$, $\varphi_{step}$, 0).

The buffer used for the derivation of predictors may be managed as follows. Each pair of the buffer is first initialized to (0, 0). After the (de)coding of a point, encoder 200 or decoder 300 may update the buffer as follows:

If the absolute value of (de)coded radius residual $r_{res}$ is higher than a threshold Th, encoder 200 or decoder 300 may determine that the laser has probed a new object. Encoder 200 or decoder 300 may then insert a new element ($r_0$, $\varphi_0$) at the front of the buffer, with $r_0$ and $\varphi_0$ denoting the reconstructed radius and the reconstructed azimuthal angle of the (de)coded point, respectively. Encoder 200 or decoder 300 may discard the last element of the buffer. Encoder 200 or decoder 300 may discard the last element of the buffer by letting the buffer element ($r_n$, $\varphi_n$) be equal to ($r_{n-1}$, $\varphi_{n-1}$) for n=3 to 1. Encoder 200 or decoder 300 may then set the first buffer element values from the decoded point.

If the absolute value of (de)coded $r_{res}$ is not higher than the threshold Th, encoder 200 or decoder 300 may determine that the laser has probed an object present in the buffer. Encoder 200 or decoder 300 may then move the element of the buffer with index predIdx (which corresponds to the index of the predictor that has been used for the prediction) to the front of the buffer. Encoder 200 and decoder 300 may update the buffer to include ($r_0$, $\varphi_0$), i.e., the reconstructed radius and the reconstructed azimuthal angle of the (de) coded point. Encoder 200 and decoder 300 may perform this by letting the buffer elements ($r_n$, $\varphi_n$) be equal to ($r_{n-1}$, $\varphi_{n-1}$) for n=predIdx to 1, then, setting the first buffer element values from the decoded point.

The threshold Th may be equal to gps.predgeom_radius_threshold_for_pred_list and has been fixed in the encoder to 2048>>ps.geom_angular_radius_inv_scale_log 2. gps.predgeom_radius_threshold_for_pred_list is the syntax element that indicates the threshold value Th. s.geom_angular_radius_inv_scale_log 2 is a precision value (i.e., number of bits) that is used in the some intermediate derivations (particularly relating to spherical to cartesian conversion, or vice versa) for the radius component.

Processes of encoding and decoding the magnitude of radius residual is now discussed. These processes may improve the magnitude encoding of radius residual in G-PCC's predictive tree geometry coding for LIDAR-acquired point cloud compression.

Figure 15:
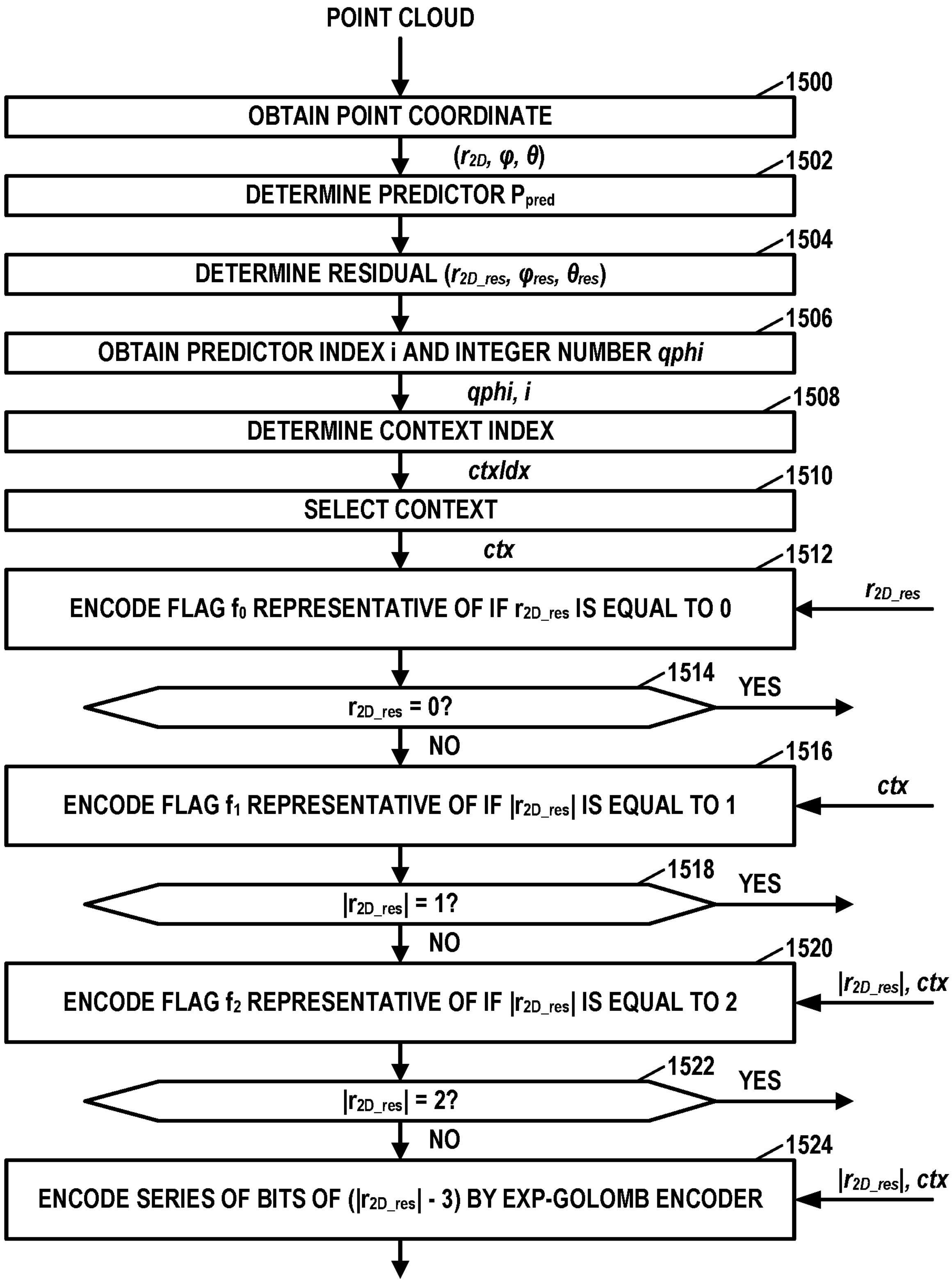
FIG. 15 is a flowchart illustrating an example encoding method of magnitude of radius residual.

FIG. 15 is a flowchart illustrating an example encoding method of magnitude of radius residual. In the example of FIG. 15, encoder 200 uses a context-adaptive entropy encoder to encode bits of magnitude of radius residual and may determine a context according to the context determination process described elsewhere in this disclosure.

As shown in FIG. 15, encoder 200 may obtain a point having coordinates ($r_{2D}$, φ, θ) (1500). Encoder 200 may then determine a predictor $P_{pred}$ (1502). Encoder 200 may use the coordinates of the point and coordinates of the predictor $P_{pred}$ to determine a residual (1504). The residual may be specified by values ($r_{2D\_res}$, $\varphi_{res}$, $\theta_{res}$). For instance, encoder 200 may subtract corresponding coordinate values of the point and the predictor to determine the residual. Additionally, encoder 200 may obtain a predictor index i and an integer number qphi (1506). For example, encoder 200 may select predictor index i based on a review of one or more possible values of i to determine which provides the best performance. The integer number qphi is a quantized value of the azimuth residual. Encoder 200 may then determine a context index ctxIdx (1508). Encoder 200 may select a context ctx based on the context index ctxIdx (1510). An example process for determining context index ctxIdx, and context ctx are provided below.

After obtaining the radius residual, encoder 200 may determine a value of a flag $f_0$, a binary entropy encoder (e.g., arithmetic encoding unit 214 of encoder 200) may encode the value of flag $f_0$ based on context ctx, and encoder 200 may signal the encoded value of flag $f_0$ in geometry bitstream 203) (1512). The value of flag $f_0$ is representative of whether the radius residual $r_{2D\_res}$ is equal to 0.

Encoder 200 may then determine whether the radius residual $r_{2D\_res}$ is equal to 0 (1514). If the radius residual $r_{2D\_res}$ is equal to 0 ("YES" branch of 1514), the encoding of radius residual $r_{2D\_res}$ is finished because $r_{2D\_res}$=0 is encoded. Otherwise, if the radius residual $r_{2D\_res}$ is not equal to 0 ("NO" branch of 1514), encoder 200 may determine a value of a flag $f_1$, arithmetic encoding unit 214 of encoder 200 may perform entropy encoding on the value of flag $f_1$ based on the context ctx, and encoder 200 may include the entropy encoded value of flag $f_1$ in geometry bitstream 203 (1516). Flag $f_1$ is representative of whether the absolute value $|r_{2D\_res}|$ is equal to 1.

Encoder 200 may then determine if the absolute value $|r_{2D\_res}|$ is equal to 1 (1518). If the absolute value $|r_{2D\_res}|$ is equal to 1 ("YES" branch of 1518), encoder 200 has finished encoding of magnitude of radius residual $r_{2D\_res}$. Otherwise, if the absolute value $|r_{2D\_res}|$ is not equal to 1 ("NO" branch of 1518), encoder 200 determines the value of a flag $f_2$, arithmetic encoding unit 214 of encoder 200 performs binary entropy encoding on the value of flag $f_2$ based on the context ctx, and encoder 200 signals the entropy-encoded value of flag $f_2$ is geometry bitstream 203 (1520). The flag $f_2$ is representative of whether the absolute value $|r_{2D\_res}|$ is equal to 2 or not.

Encoder 200 may then determine if the absolute value $|r_{2D\_res}|$ is equal to 2 (1522). If the absolute value $|r_{2D\_res}|$ is equal to 2 ("YES" branch of 1522), encoder 200 has finished encoding the magnitude of radius residual $r_{2D\_res}$. Otherwise, if the absolute value $|r_{2D\_res}|$ is not equal to 2 ("NO" branch of 1522), encoder 200 may use exp-Golomb coding to encode the absolute value ($|r_{2D\_res}|-3$) based on the selected context ctx (1524).

Figure 16:
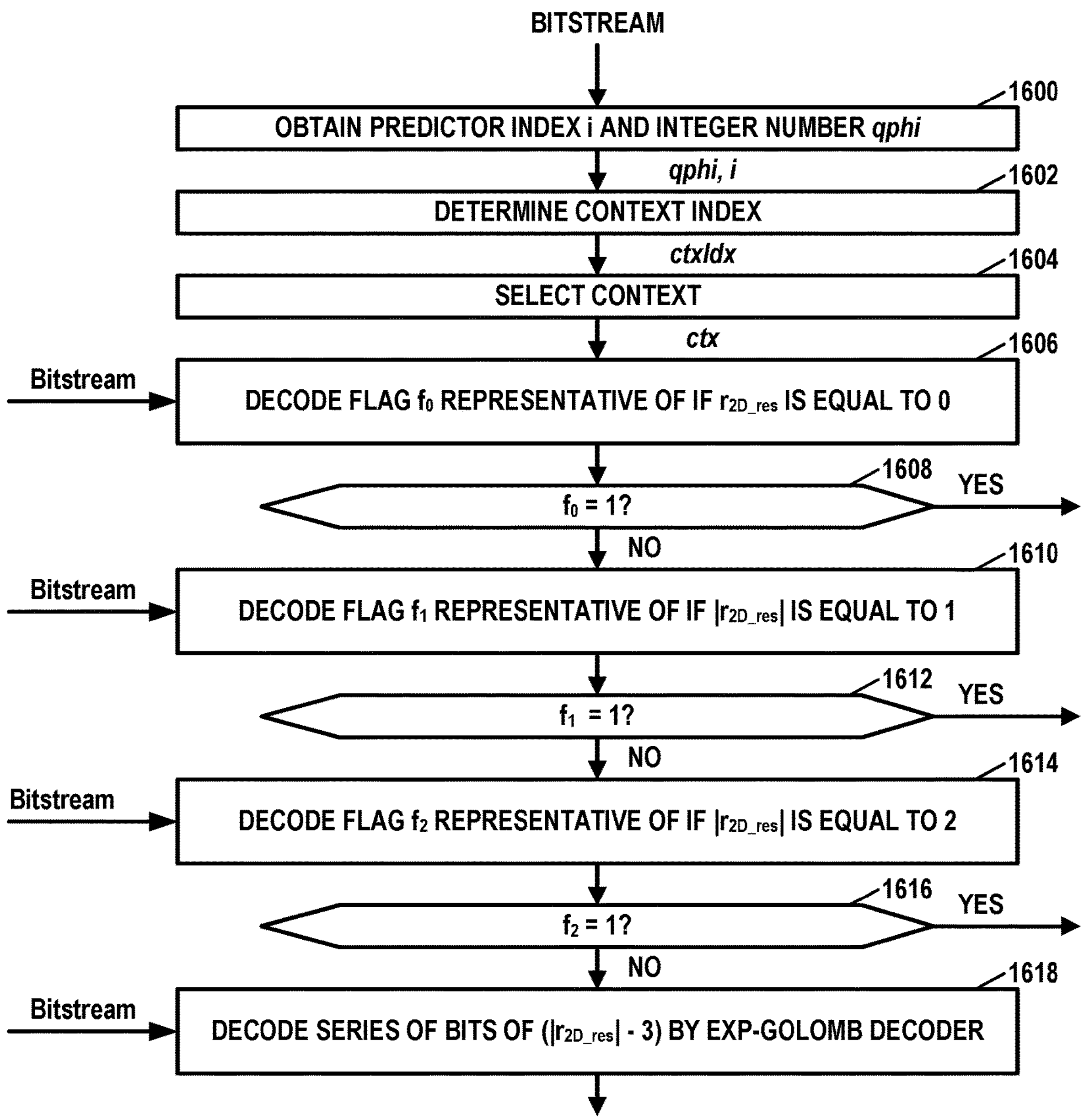
FIG. 16 is a flowchart illustrating an example decoding method of magnitude of radius residual.

The overview of proposed decoding method of magnitude of radius residual is shown in FIG. 16. FIG. 16 is a flowchart illustrating an example decoding method of magnitude of radius residual. In the example of FIG. 16, decoder 300 may receive a bitstream (e.g., geometry bitstream 203). Decoder 300 may obtain from the bitstream a predictor index i and an integer number qphi for a point (1600). Decoder 300 may then determine a context index ctxIdx (1602). Decoder 300 may select a context ctx based on the context index ctxIdx (1604). An example process for determining context index ctxIdx, and context ctx are provided below.

Decoder 300 may decode a value of a flag $f_0$ from the bitstream (1606). Decoder 300 may use the context ctx to decode the value of flag $f_0$. The flag $f_0$ is representative of whether a residual $r_{2D\_res}$ is equal to 0. Decoder 300 may then determine whether flag $f_0$ is equal to 1 (1608). If the value of flag $f_0$ is equal to 1 ("YES" branch of 1608), decoder 300 has finished decoding residual $r_{2D\_res}$. Otherwise, if the value of flag $f_0$ is not equal to 1 ("NO" branch of 1608), decoder 300 may decode a value of a flag $f_0$ from the bitstream (1610). Decoder 300 may use the context ctx to decode the value of flag $f_1$. The flag $f_1$ is representative of whether the residual $r_{2D\_res}$ is equal to 1. Decoder 300 may then determine whether flag $f_1$ is equal to 1 (1612). If the value of flag $f_1$ is equal to 1 ("YES" branch of 1612), decoder 300 has finished decoding residual $r_{2D\_res}$.

Otherwise, if the value of flag $f_1$ is not equal to 1 ("NO" branch of 1612), decoder 300 may decode a value of a flag $f_2$ from the bitstream (1614). Decoder 300 may use the context ctx to decode the value of flag $f_2$. The flag $f_2$ is representative of whether a residual $r_{2D\_res}$ is equal to 2. If the value of flag $f_2$ is equal to 1 ("YES" branch of 1616), decoder 300 has finished decoding residual $r_{2D\_res}$. Otherwise, if the value of flag $f_2$ is not equal to 1 ("NO" branch of 1616), an exp-Golomb decoder of decoder 300 may decode a series of bits from the bitstream (1618). The series of bits indicates an absolute value of $|res_{2D\_res}|-3$).

As mentioned above, encoder 200 and decoder 300 determine a context index ctxIdx and a context ctx. A process of determining the context ctx is now discussed. To encode each bit of radius residual magnitude (e.g., $r_{2D\_res}$), encoder 200 and decoder 300 determine a context index ctxIdx by using a predictor index i and the integer number qphi of elementary azimuthal step according to equation below, $$ctxIdx = \begin{cases} 0, & \text{if } i \neq 0 \text{ and } qphi = 0 \\ 1, & \text{if } i \neq 0 \text{ and } qphi \neq 0 \\ 2, & \text{if } i = 0 \text{ and } qphi = 0 \\ 3, & \text{if } i = 0 \text{ and } qphi \neq 0 \end{cases} \quad (11)$$

and then select a context ctx in context table ctxTable_T to entropy encode the bits of magnitude of radius residual according to ctxIdx.

$$ctx=ctxTable\_T[ctxIdx] \quad (12)$$

The processes for predictive geometry coding discussed above only apply to intra coded pictures. These processes do not consider inter coded points. For example, decisions to choose the contexts of coding residual radius and azimuth are sub-optimal because the statistics of variables are different for inter and intra coded points. This can result in a loss of coding efficiency. Techniques of this disclosure may address these problems and accordingly may lead to an increase in coding efficiency.

In accordance with a first technique of this disclosure, encoder 200 and decoder 300 may perform a context selection method for the radius residual sign that is based on the inter prediction flag and whether the previous predicted point is coded using inter prediction. For example, a radius residual sign flag may be signaled to indicate whether the radius residual (e.g., $r_{2D\_res}$) is positive or negative. Encoder 200 and decoder 300 may perform entropy encoding or entropy decoding on the radius residual sign flag based on a context. Encoder 200 and decoder 300 may determine the context for encoding or decoding the radius residual sign flag may be updated as follows (<C> . . . </C> tags indicating the changes) from G-PCC Ed. 1:

$$ctx_{sign}=ctxTab<C>[I_{prevInter}][I_{currInter}]</C>[I_{previous}][I_{penulm}][I_{last}][s_{res,prec}] \quad (13)$$

In the equation above, 'ctxTab' is a table of contexts, '$I_{prevInter}$' is a Boolean value indicating whether the previous coded point (e.g., preDecP 708 of FIG. 7) is inter coded, '$I_{currInter}$' is a Boolean value indicating whether the current point (e.g., curPoint 700) is inter coded, '$I_{previous}$' is a Boolean value indicating if the selected predictor is the parent node, '$I_{penulm}$' is a Boolean value indicating if the coded number of azimuthal steps for preceding point is equal to zero, '$I_{last}$' is a Boolean value indicating if the coded number of azimuthal steps for the current point is equal to zero, and '$s_{res,prec}$' is a Boolean value indicating the sign of the last coded radius residual.

In another example, encoder 200 and decoder 300 may determine the context for the residual sign as follows:

$$<C>intraCtxIdx=I_{previous}<<3+I_{penulm}<<2+I_{last}<<1+s_{res,prec}$$

$$isInter=I_{prevInter}*I_{currInter}$$

$$ctx_{sign}=ctxTab[I_{prevInter}][I_{currInter}][isInter?0:intraCtxIdx],</C> \quad (14)$$

isInter may also be derived as <C>min($I_{prevInter}+I_{currInter}$, 1)</C>.

In another example, encoder 200 and decoder 300 may determine the context for residual sign as follows:

$$<C>intraCtxIdx=I_{previous}<<3+I_{penulm}<<2+I_{last}<<1+s_{res,prec}$$

$$interCtxIdx=I_{prevInter}<<1+I_{currInter}$$

$$isInter=I_{currInter}$$

$$ctx_{sign}=ctxTab[interCtxIdx][isInter?0:intraCtxIdx],</C> \quad (15)$$

In another example, encoder 200 and decoder 300 may determine the context for residual sign as follows:

$$<C>intraCtxIdx=I_{previous}<<3+I_{penulm}<<2+I_{last}<<1+s_{res,prec}$$

$$isInter=I_{currInter}$$

$$ctx_{sign}=ctxTab[isInter?2:I_{prevInter}][isInter?0:intraCtxIdx],</C> \quad (16)$$

Figure 17:
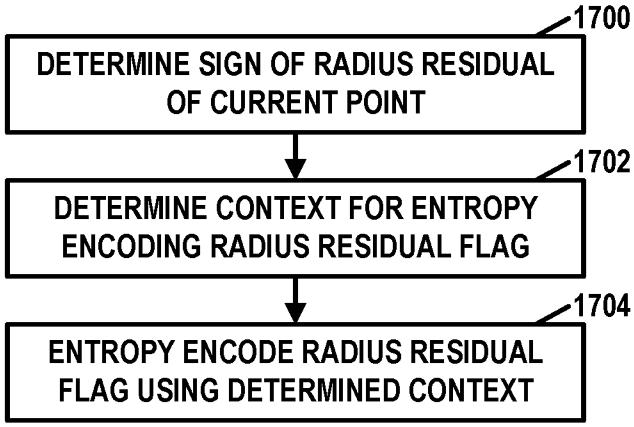
FIG. 17 is a flowchart illustrating an example operation of an encoder in which the encoder selects a context for entropy encoding a radius residual sign based on whether a previous predicted point is encoded using inter prediction, according to one or more techniques of this disclosure.

FIG. 17 is a flowchart illustrating an example operation of encoder 200 in which encoder 200 selects a context for entropy encoding a radius residual sign based on whether a previous predicted point is encoded using inter prediction, according to one or more techniques of this disclosure. In the example of FIG. 17, encoder 200 (e.g., prediction tree construction unit 207 or encoding prediction unit 211 of encoder 200) may determine a sign of a radius residual of a current point of the point cloud (1700). For example, encoder 200 may determine a predictor for the current point. Encoder 200 may determine the predictor in accordance with any of the examples provided elsewhere in this disclosure. The predictor may indicate a predicted radius, azimuth, and laser ID for the current point. The radius residual of the current point may be a difference between the actual radius of the current point and the predicted radius. The sign of the radius residual indicates whether the radius residual is positive or negative.

Additionally, encoder 200 may determine a context for entropy encoding a radius residual sign flag indicating the sign of the radius residual of the current point (1702). Encoder 200 may determine the context for entropy encoding the radius residual sign flag based on whether a previous coded point is inter coded and whether the current point is inter coded. For instance, encoder 200 may determine the context as described in any of equations (13), (14), (15), or (16) above.

Thus, in some examples, as part of determining the context for entropy encoding the radius residual sign flag, encoder 200 may look up the context based on whether a previous point is inter coded, whether the current point is inter coded, whether a predictor for the current point is a parent node of the current point, whether a coded number of azimuthal steps for the previous point is equal to zero, whether a coded number of azimuthal steps for the current point is equal to zero, and a sign of a last-coded radius residual. For instance, encoder 200 may look up the context in a six-dimensional table (ctxTab) as described in equation (13). In this example, a value for a first dimension of the table indicates whether a previous point is inter coded, a value for a second dimension of the table indicates whether the current point is inter coded, a value for a third dimension of the table indicates whether a predictor for the current point is a parent node of the current point, a value for a fourth dimension of the table indicates whether a coded number of azimuthal steps for the previous point is equal to zero, a value for a fifth dimension of the table indicates whether a coded number of azimuthal steps for the current point is equal to zero, and a value for a sixth dimension of the table indicates a sign of a last-coded radius residual.

In some examples, such as the example related to equations (14), as part of determining the context for entropy encoding the radius residual sign flag, encoder 200 may determine a context index based on whether a selected predictor for the current point is a parent node of the current point, whether a coded number of azimuthal steps for a preceding point is equal to zero, whether a coded number of azimuthal steps for the current point is equal to zero, and a sign of a last-coded radius residual. Encoder 200 may determine a value of a variable (e.g., isInter). As part of determining the value of the variable, encoder 200 may determine the value of the variable is equal to a Boolean value indicating whether a previous point is inter coded multiplied by a Boolean value indicating whether the current point is inter coded, or determine the value of the variable is equal to a minimum of 1 and a value equal to the Boolean value indicating whether the previous point is inter coded plus the Boolean value indicating whether the current point is inter coded. Encoder 200 may look up the context in a three-dimensional table, wherein a value for a first dimension of the table indicates whether a previous point is inter coded, a value for a second dimension of the table indicates whether the current point is inter coded, and a value for a third dimension of the table is equal to 0 if the value of the variable is true and equal to the context index otherwise.

In some examples, such as the example related to equations (15), as part of determining the context for entropy encoding the radius residual sign flag, encoder 200 may determine an intra context index based on whether a selected predictor for the current point is a parent node of the current point, whether a coded number of azimuthal steps for a preceding point is equal to zero, whether a coded number of azimuthal steps for the current point is equal to zero, and a sign of a last-coded radius residual. Encoder 200 may determine an inter context index based on whether a previous point is inter coded and whether the current point is inter coded. Encoder 200 may look up the context in a two-dimensional table, wherein a value for a first dimension of the table is the inter context index and a value for a second dimension of the table is equal to 0 if the current point is inter coded and equal to the intra context index otherwise.

In some examples, such as the example related to equations (16), as part of determining the context for entropy encoding the radius residual sign flag, encoder 200 may determine an intra context index based on whether a selected predictor for the current point is a parent node of the current point, whether a coded number of azimuthal steps for a preceding point is equal to zero, whether a coded number of azimuthal steps for the current point is equal to zero, and a sign of a last-coded radius residual. Encoder 200 may look up the context in a two-dimensional table. A value for a first dimension of the table is equal to 2 if the current point is inter coded and otherwise equal to a Boolean value indicating whether a previous point is inter predicted. A value for a second dimension of the table is equal to 0 if the current point is inter coded and otherwise equal to the intra context index.

Encoder 200 (e.g., arithmetic encoding unit 214 of encoder 200) may entropy encode the radius residual sign flag using the determined context (1704). For example, encoder 200 may perform CABAC encoding on the radius residual sign flag using the determined context.

Figure 18:
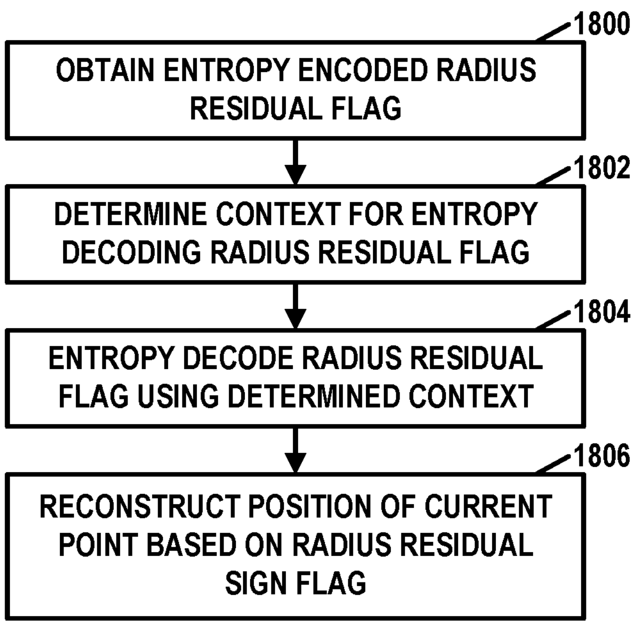
FIG. 18 is a flowchart illustrating an example operation of a decoder in which the decoder selects a context for entropy decoding a radius residual sign based on whether a previous predicted point is encoded using inter prediction, according to one or more techniques of this disclosure.

FIG. 18 is a flowchart illustrating an example operation of decoder 300 in which decoder 300 selects a context for entropy decoding a radius residual sign based on whether a previous predicted point is encoded using inter prediction, according to one or more techniques of this disclosure.

In the example of FIG. 18, decoder 300 may obtain an entropy encoded radius residual sign flag indicating a sign of a radius residual of a current point of the point cloud (1800). Decoder 300 (e.g., geometry arithmetic decoding unit 302 of decoder 300) may determine a context for entropy decoding the radius residual sign flag (1802). Decoder 300 may determine the context for entropy decoding the radius residual sign flag based on whether a previous coded point is inter coded and whether the current point is inter coded. For instance, decoder 300 may determine the context as described in any of equations (13), (14), or (15), above.

Decoder 300 may entropy decode the radius residual sign flag using the determined context (1804). For example, decoder 300 may use CABAC decoding or another entropy decoding process to entropy decode the radius residual sign flag. Decoder 300 may reconstruct a position of position of the current point based on the radius residual sign flag (1806). For example, decoder 300 may determine a predictor for the current point, e.g., a described in any of the examples provided elsewhere in this disclosure. Additionally, decoder 300 may determine a radius residual value, azimuth residual value, and laser ID residual value from the bitstream. In this example, decoder 300 may set the sign of the radius residual value based on the decoded radius residual sign flag. In this example, decoder 300 may add coordinate values (e.g., radius, azimuth, laser ID) of the predictor to corresponding residual values (e.g., radius residual value, azimuth residual value, laser ID residual value) to reconstruct the position of the current point.

In accordance with a second technique of this disclosure, encoder 200 and decoder 300 may perform the context selection of one or more syntax elements of radius and azimuth residual based on whether the point is coded with intra prediction of inter prediction. When the point is coded with intra prediction, one set of contexts are used, and when the point is coded with inter prediction, a different set of contexts may be used. This applies to one or more bins of the syntax elements associated with radius and azimuth residuals. In some cases, when the context selection may also be determined by whether the previous point is inter coded. For instance, encoder 200 or decoder 300 may determine, based on whether the previous coded point is inter coded and/or whether the current point is inter coded, a context for entropy encoding one or more syntax element associated with an azimuth residual (e.g., syntax elements associated with quantized residual/number of azimuth steps qphi) indicating a magnitude of the azimuth residual of the current point. Encoder 200 or decoder 300 may entropy encode or decode the azimuth residual using the determined second context.

For example, encoder 200 and decoder 300 may determine the context derivation of bits of radius residual magnitude as follows (with changes from G-PCC Ed.) indicated with <C> . . . </C> tags). In this example, whether the current point is inter coded may additionally be used to determine the contexts of coded bins. For instance, to encode each bit of a radius residual magnitude, encoder 200 and decoder 300 may determine context index ctxIdx using predictor index i and the integer number qphi of elementary azimuthal steps according to equation below, $$ctxIdx = \begin{cases} 0, & \text{if } i \neq 0 \text{ and } qphi = 0 \\ 1, & \text{if } i \neq 0 \text{ and } qphi \neq 0 \\ 2, & \text{if } i = 0 \text{ and } qphi = 0 \\ 3, & \text{if } i = 0 \text{ and } qphi \neq 0 \end{cases} \quad (17)$$

Encoder 200 and decoder 300 may then select a context ctx in context table ctxTable_T to entropy encode or entropy decode the bits of magnitude of radius residual according to ctxIdx.

$$ctx=ctxTable_T\text{<C>}[interCtx]\text{</C>}[ctxIdx] \quad (18)$$

<C> Where interCtx is a Boolean variable indicating whether the current point is coded with inter prediction. </C>

In another example, encoder 200 and decoder 300 may determine the context derivation of bits of azimuth residual magnitude as follows (with changes from G-PCC Ed.1 indicated with <C> . . . </C> tags). In this example, encoder 200 and decoder 300 additionally use a value indicating whether current point is inter coded and whether previous point is inter coded to determine the contexts of coded bins.

```
if (boundPhi == 0)
    return;
  <C> int interCtxIdx = interFlag ? 1 : 0;</C>
  int ctxL = predIdx ? 1 : 0;
  // encode isZero
  _aec->encode(resPhi == 0 ? 1 : 0, _ctxResPhiIsZero<C>[interCtxIdx]</C>[ctxL]);[1]
  if (!resPhi)
    return;
  // encode sign
  _aec->encode(                                                  [2]
    resPhi >= 0 ? 1 : 0,
    _ctxResPhiSign<C>[(_resPhiOldSign == 2) ? 0</C> : ctxL]
      [<C>interCtxIdx ? 3 :</C> _resPhiOldSign]);
  _resPhiOldSign = <C>interFlag ? 2 :</C> (resPhi >= 0 ? 1 : 0);
  resPhi = std::abs(resPhi) - 1;
  if (boundPhi == 1)
    return;
  // encode isOne
  _aec->encode(resPhi == 0 ? 1 : 0, _ctxResPhiIsOne[<C>interCtxIdx</C>][ctxL]);[3]
  if (!resPhi)
    return;
  if (boundPhi == 2)
    return;
  // encode residual by expGolomb k=1
  _aec->encodeExpGolomb(                                         [4]
    resPhi - 1, 1, _ctxResPhiExpGolombPre[<C>interCtxIdx</C>][boundPhi - 3 > 6],
    _ctxResPhiExpGolombSuf[<C>interCtxIdx</C>][boundPhi - 3 > 6]);
```

In the above equations, resPhi is the azimuth residual that is to be coded, boundPhi is a bound variable derived from resPhi, and ctxL is used to choose the context based on whether the predictor is the parent node. The azimuth residual is encoded as (a) resPhi=0 flag in line [1], (b) resPhi sign flag in line [2], (c) abs(resPhi (==1 in line [3] and (d) abs(resPhi−1) using exponential-Golomb coding. <C> The context selection in lines [1], [3] and [4] are updated by including the interCtxIdx, which is a Boolean variable indicating whether the current point is coded using inter prediction. The context for the sign flag of resPhi is updated using interCtxIdx and _resPhiOldSign, which is an integer variable that takes three values:

- 0 when previous coded point is intra coded and resPhi of previous coded point is less than 0
- 1 when previous point is intra coded and resPhi of previous coded point is greater than or equal to 0

2 when the previous point is inter coded </C>

Thus, in the pseudo code above, the entropy encoding function (i.e., encode( )) takes two parameters as input. The first parameter of the entropy encoding function is the value to be encoded. The second parameter of the entropy encoding function is the context to use for encoding the value. An azimuth residual may be encoded as a set of syntax elements. A first syntax element may be signaled if the absolute value of the azimuth residual can be greater than 0. The first syntax element indicates whether the azimuth residual is equal to zero (i.e., isZero). A second syntax element is signaled if the absolute value of the azimuth residual can be greater than 0 (i.e., boundPhi !=0). The second syntax element is a sign flag that indicates a sign value of the azimuth residual. The sign value indicates whether the azimuth residual is positive or negative. A third syntax element (i.e., isOne) is signaled if the absolute value of the azimuth residual can be greater than 1 (i.e., boundPhi !=1). The third syntax element indicates whether the azimuth residual is equal to 1. A fourth syntax element (i.e., residual) is signaled if the absolute value of the azimuth residual can be greater than 2 (i.e., boundPhi !=2). The fourth syntax element indicates the azimuth residual minus 1 (i.e., resPhi−1).

In the pseudocode above, when determining the context for entropy encoding the isZero syntax element, encoder 200 may look up the context in a two-dimensional table (_ctxResPhiIsZero) where interCtxIdx is the value for the first dimension of the table and ctxL is the value for the second dimension of the table. As noted above, interCtxIdx indicates whether the current point is inter predicted and ctxL indicates whether the current point is a parent node.

When determining the context for entropy encoding the sign flag, encoder 200 may look up the context in a two-dimensional table (_ctxResPhiSign). A value for the first dimension of the table is set equal to 0 if _resPhiOldSign is equal to 2 and set equal to ctxL otherwise. A value for the second dimension of the table is set equal to 3 if interCtxIdx is true (i.e., the current point is coded using inter prediction) and set to _resPhiOldSign otherwise. Encoder 200 may update the value of _resPhiOldSign and resPhi after entropy encoding the sign flag.

When determining the context for entropy encoding the isOne syntax element, encoder 200 may look up the context in a two-dimensional table (_ctxResPhiIsOne). A value for the first dimension of the table is interCtxIx and a value for the second dimension of the table is ctxL.

In the pseudocode above, encoder 200 uses exponential-Golomb encoding to entropy encode the residual. The encodeExpGolomb( ) function performs exponential-Golomb coding. The encodeExpGolomb( ) function takes four parameters: a value to be encoded, a second value specifying the order of the exponential-Golomb code, a context for a prefix of an exponential-Golomb code, and a context for a suffix of the exponential-Golomb code. When using exponential-Golomb encoding to entropy encode the residual, encoder 200 may convert the residual (i.e., resPhi−1) into a code having a prefix and a suffix. Encoder 200 may use different contexts for encoding the prefix and the suffix. Encoder 200 may determine the context for the prefix by looking up the context in a first two-dimensional table (_ctxResPhiExpGolombPre). Encoder 200 may determine the context for the suffix by looking up the context in a second two-dimensional table (_ctxResPhiExpGolombSuf). For both the first and second tables, the value for the first dimension is equal to interCtxIdx (i.e., a value indicating whether the current point is encoded using inter prediction). For both the first and second tables, the value for the second dimension is equal to a Boolean value that is true is boundPhi−3 is greater than 6 (i.e., if the maximum value the azimuth residual can have, minus 3, is greater than 6).

In another example, the sign of azimuth residual is coded as follows:

```
_aec->encode(                                                    [2]
  resPhi >= 0 ? 1 : 0,
  _ctxResPhiSign[<C>interCtxIdx ? 2 :</C> ctxL]
    [<C>interCtxIdx ? 3 :</C> _resPhiOldSign]);
  _resPhiOldSign = <C>interFlag ? 2 :</C> (resPhi >= 0 ? 1 : 0);
```

In other words, the entropy encoding function (i.e., encode( )) takes two parameters as input. The first parameter of the entropy encoding function is the value to be encoded. The second parameter of the entropy encoding function is the context to use for encoding the value. In the pseudocode above, the value to be encoded (i.e., the sign of the azimuth residual) is set equal to 1 if the azimuth residual (resPhi) is greater than or equal to 0 and set equal to 0 if the azimuth residual is not greater than or equal to 0. Furthermore, encoder 200 may look up the context in a two-dimensional table named _ctxResPhiSign. A value for the first dimension of the table is set equal to 2 if interCtxIdx is true and is set equal to ctxL otherwise. As noted above, interCtxIdx is a Boolean variable indicating whether the current point is coded using inter prediction and ctxL indicates whether the current point is a parent node. A value of the second dimension of the table is set equal to 3 if interCtxIdx is true and is set equal to _resPhiOldSign otherwise. The value _resPhiOldSign is defined above. After determining the context, encoder 200 may update _resPhiOldSign to be 2 if interFlag is true or set _resPhiOldSign equal to 1 or 0 depending on whether resPhi is greater than or equal to 0.

In another example, the sign of azimuth residual is coded as follows:

```
_aec->encode(                                                    [2]
  resPhi >= 0 ? 1 : 0,
  _ctxResPhiSign[<C>interCtxIdx ? 2 :</C> ctxL]
    [_resPhiOldSign]);
_resPhiOldSign = <C>interFlag ? 2 :</C> (resPhi >= 0 ? 1 : 0);
```

This example is similar to the previous example except that encoder 200 simply sets the value for the second dimension of the _ctxResPhiSign table to _resPhiOldSign.

Figure 19:
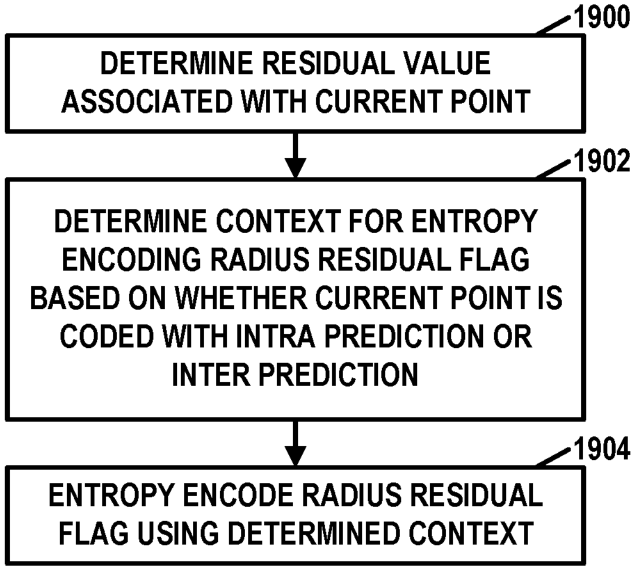
FIG. 19 is a flowchart illustrating an example operation of an encoder in which the encoder determines a context of entropy encoding a residual value according to one or more techniques of this disclosure.

FIG. 19 is a flowchart illustrating an example operation of encoder 200 in which encoder 200 determines a context of entropy encoding a residual value according to one or more techniques of this disclosure. In the example of FIG. 19, encoder 200 (e.g., prediction tree construction unit 207 of encoder 200 or encoding prediction unit 211 of encoder 200) may determine a residual value associated with a current point of the point cloud (1900). The residual value associated with the current point may be a radius residual or an azimuth residual. Encoder 200 may determine a predictor for the current point in accordance with any of the examples provided elsewhere in this disclosure. For instance, encoder 200 may determine the residual value by subtracting a coordinate component of predictor from a corresponding coordinate component of the position of the current point. For instance, encoder 200 may determine a radius residual by subtracting a radius component of the predictor from the radius component of the position of the current point. Encoder 200 may determine an azimuth residual by subtracting an azimuth component of the predictor from the azimuth component of the position of the current point.

Additionally, encoder 200 (e.g., arithmetic encoding unit 214 of encoder 200) may determine a context for entropy encoding the residual value based on whether the current point is encoded with intra prediction or inter prediction (1902). Thus, when the current point is encoded with intra prediction, encoder 200 may use one set of contexts, and when the current point is encoded with inter prediction, encoder 200 may use a different set of contexts. In some examples, encoder 200 may further determine context based on whether a previous point (e.g., a point that was encoded immediately prior to the current point or another point that was encoded prior to the current point) was inter coded. In other words, encoder 200 may determine the context for entropy encoding the residual value based on whether the current point is encoded with intra prediction or inter prediction and based on whether a previous point was encoded with intra prediction or inter prediction.

In some examples where the residual value is a radius residual value, encoder 200 may determine the context by selecting the context from a table, e.g., as shown in equation (18). In some examples where the residual value is an azimuth residual value, encoder 200 may actually determine one or more context for entropy encoding the residual value. For example, encoder 200 may determine a context for entropy encoding a first value indicating whether the absolute value of the azimuth residual is greater than 0, a context for entropy encoding a second value indicating a sign of the azimuth residual, a context for entropy encoding a third value indicating whether the absolute value of the azimuth residual is greater than 1, and/or one or more contexts for entropy encoding a fourth value indicating the absolute value of the azimuth residual minus 1. Encoder 200 may determine the contexts for entropy encoding the first, second, third, and/or fourth values by selecting the contexts from tables based on whether the current point is inter coded (and in some examples further based on whether a previous point is inter coded).

Encoder 200 (e.g., arithmetic encoding unit 214 of encoder 200) may entropy encode the residual value using the determined context (1904). For example, encoder 200 may apply CABAC encoding or exponential-Golomb encoding to the residual value. For instance, in some examples where the residual value is an azimuth residual value, encoder 200 may entropy encode a first value indicating whether an absolute value of the azimuth residual is greater than 0 using the determined context for the first value, a context for entropy encoding a second value indicating a sign of the azimuth residual using the determined context for the second value, a context for entropy encoding a third value indicating whether the absolute value of the azimuth residual is greater than 1 using the context for the third value, and/or one or more contexts for entropy encoding a fourth value indicating the absolute value of the azimuth residual minus 1 using the determined one or more contexts for the fourth value.

Figure 20:
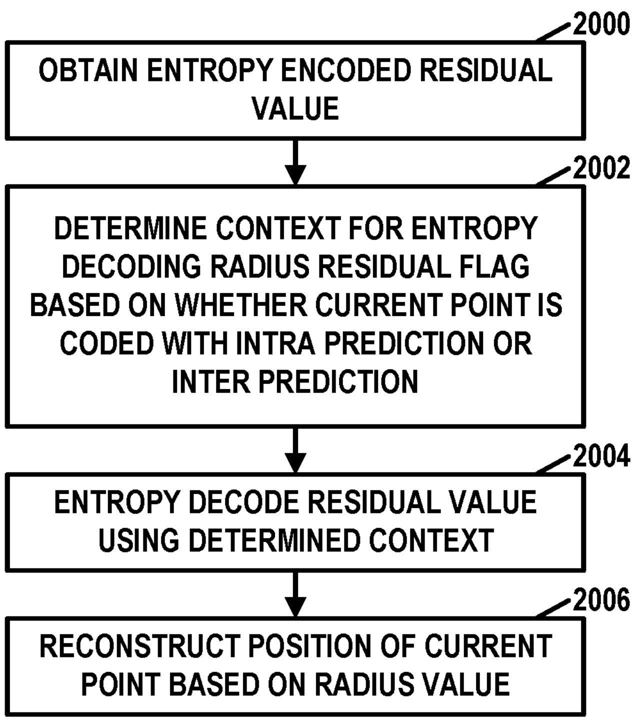
FIG. 20 is a flowchart illustrating an example operation of a decoder in which the decoder determines a context for entropy decoding a residual value according to one or more techniques of this disclosure.

FIG. 20 is a flowchart illustrating an example operation of decoder 300 in which decoder 300 determines a context for entropy decoding a residual value according to one or more techniques of this disclosure. In the example of FIG. 20, decoder 300 may obtain an entropy encoded residual value associated with a current point of the point cloud (2000). The residual value associated with the current point being a radius residual or an azimuth residual. In some examples, the entropy encoded residual value may be an entropy-encoded value indicating whether an absolute value of the azimuth residual is greater than 0, an entropy-encoded value indicating a sign of the azimuth residual, an entropy-encoded value indicating whether the absolute value of the azimuth residual is greater than 1, or an entropy-encoded value indicating the absolute value of the azimuth residual minus 1.

Decoder 300 may determine a context for entropy decoding the residual value based on whether the current point is coded with intra prediction or inter prediction (2002). Decoder 300 may determine the context in the same way as encoder 200, as described above.

Additionally, decoder 300 may entropy decode the residual value using the determined context (2004). For example, decoder 300 may perform CABAC decoding or exponential-Golomb decoding on the residual value. Decoder 300 may reconstruct a position of position of the current point based on the radius residual or the azimuth residual (2006). For example, decoder 300 may determine a predictor for the current point, e.g., a described in any of the examples provided elsewhere in this disclosure. In this example, decoder 300 may add coordinate values (e.g., radius, azimuth, laser ID) of the predictor to corresponding residual values (e.g., radius residual value, azimuth residual value, laser ID residual value) to determine the position of the current point.

In accordance with a third technique of this disclosure, the management of the prediction buffer (e.g., prediction buffer 213 of FIG. 2 or prediction buffer 215 of FIG. 5) may be updated such that an estimated residual is used to compare with the threshold Th for inter predicted points (instead of (de)coded radius residual). For intra predicted points, the absolute value of the (de)coded radius residual is used to manage the prediction buffer as described above. In some examples, when the current point is coded with inter prediction, encoder 200 and decoder 300 update the prediction buffer such that the new element is always inserted in the front of the buffer, and the last element in the buffer is discarded irrespective of the threshold value.

In one example, the management of the prediction buffer is modified as follows, with changes marked with <C> . . . </C> tags and deletions marked with <D> . . . </D> tags:

The buffer used for the predictors' derivation is managed as follows. Each pair of the buffer is first initialized to (0, 0). After the (de)coding of a point, the buffer is updated as follows:

<C> If the point is inter predicted, the variable $r_x$ is set equal to estimated radius residual value $r_{est}$ that is equal to the difference between reconstructed radius of the point and one of the radius values currently in the buffer (e.g., radius of the first entry in the list). Otherwise (point is coded with intra prediction), $r_x$ is set equal to (de)coded radius residual value $r_{res}$. When point is coded with inter prediction, the value of predIdx is set equal to 0. </C>

If the absolute value of <D>(de)coded estimated radius residual </D><C>$r_x$</C><D></D> is higher than a threshold Th, it is considered that the laser has probed a new object. Then a new element $(r_0, \varphi_0)$ is inserted in front of the buffer, with $r_0$ and $\varphi_0$ the reconstructed radius and the reconstructed azimuthal angle of the (de)coded point. The last element of the buffer is discarded. This is performed by letting the buffer element $(r_n, \varphi_n)$ be equal to $(r_{n-}, \varphi_{n-1})$ for n=3 to 1. Then, setting the first buffer element values from the decoded point.

If the absolute value of <D>(de)coded</D><C>$r_x$</C><D></D> is not higher than the threshold Th, it is considered that the laser has probed an object present in the buffer. Then, the element of the buffer with index predIdx, corresponding to the index of the predictor that has been used for the prediction, is moved to the front of the list and is updated with ($r_0$, $\varphi_0$) the reconstructed radius and the reconstructed azimuthal angle of the (de)coded point. This is performed by letting the buffer elements ($r_n$, $\varphi_n$) be equal to ($r_{n-1}$, $\varphi_{n-1}$) for n=predIdx to 1, then, setting the first buffer element values from the decoded point.

Th is equal to ps.predgeom_radius_threshold_for_pred_list and has been fixed in the encoder to 2048>>ps.geom_angular_radius_inv_scale_log 2.

In another example, a different value of Th may be chosen when the coded point is inter coded compared to when the point is intra coded.

In another example, when the point is inter coded, the last entry in the list is removed. ($r_0$, $\varphi_0$) is inserted in end of the buffer where $r_0$ and $\varphi_0$ are the reconstructed radius and the reconstructed azimuthal angle of the (de)coded point.

Figure 21:
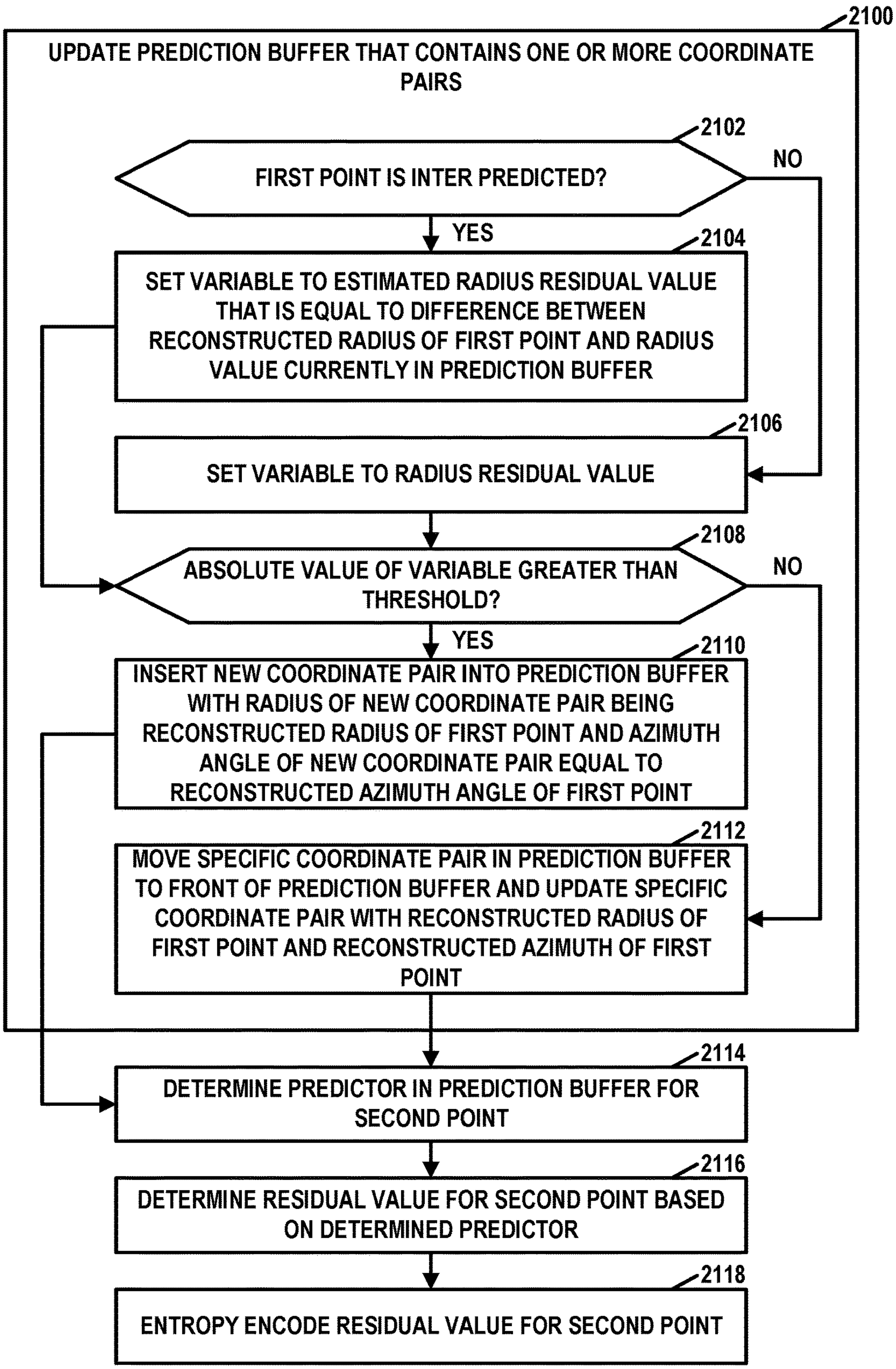
FIG. 21 is a flowchart illustrating an example operation of an encoder in which the encoder updates a prediction buffer according to one or more techniques of this disclosure.

FIG. 21 is a flowchart illustrating an example operation of encoder 200 in which encoder 200 updates prediction buffer 213 according to one or more techniques of this disclosure. In the example of FIG. 21, after encoding a first point of the point cloud, encoder 200 (e.g., encoding prediction unit 211 of encoder 200) may update prediction buffer 213 that contains one or more predictors (2100). Each respective predictor of the one or more predictors indicates a respective radius and a respective azimuth angle.

As part of updating prediction buffer 213, encoder 200 may determine whether the first point is inter predicted (2102). If the first point is inter predicted ("YES" branch of 2102), encoder 200 may set a variable to an estimated radius residual value that is equal to a difference between a reconstructed radius of the first point and a radius value currently in prediction buffer 213 (2104). If the first point was not inter predicted ("NO" branch of 2102), e.g., if the first point is intra predicted, encoder 200 may set the variable to a decoded radius residual value (2106).

Additionally, as part of updating prediction buffer 213, encoder 200 may determine whether an absolute value of the variable is greater than a threshold (2108). In some examples, encoder 200 may determine the threshold based on whether the first point is inter predicted or intra predicted. For instance, the threshold may be greater when the first point is intra predicted than when the first point is inter predicted.

If the absolute value of the variable is greater than the threshold ("YES" branch of 2108), encoder 200 may insert a new predictor into prediction buffer 213 with a radius of the new predictor being a reconstructed radius of the first point and an azimuth angle of the new predictor equal to a reconstructed azimuth angle of the first point (2110). Encoder 200 may remove the last coordinate pair in the list of coordinate in the prediction buffer. Additionally, encoder 200 may move all the coordinate pairs with index 0 to N−2 to indices 1 to N−1, respectively, where N is the number of coordinate pairs in the list.

On the other hand, if the absolute value of the variable is not greater than the threshold ("NO" branch of 2108), encoder 200 may move a specific predictor in prediction buffer 213 to a front of prediction buffer 213 and may update the specific predictor with the reconstructed radius of the first point and the reconstructed azimuth angle of the first point (2112). The specific predictor was the predictor used for prediction of the first point. In instances where the first point is coded with intra prediction, the specific coordinate pair that is updated is the coordinate pair that was used for prediction of the first point. In instances where the first point is coded with inter prediction, the specific coordinate pair that is updated is the first coordinate pair in the list in the prediction buffer.

In some examples, as part of updating prediction buffer 213, decoder 300 may remove a last-occurring predictor in prediction buffer 213 based on the first point being inter predicted and may insert the new predictor at the end of prediction buffer 213. In other words, when the point is inter coded, the last entry in the list is removed and (r0, φ0) is inserted in end of prediction buffer 213, where r0 and φ0 are the reconstructed radius and the reconstructed azimuthal angle of the decoded point.

In some examples, when the second point is coded with inter prediction, encoder 200 may update prediction buffer 213 such that a new coordinate pair (i.e., element) is always inserted in the front of prediction buffer 213, and encoder 200 discards the last element in prediction buffer 213 irrespective of the threshold value.

After updating prediction buffer 213, encoder 200 may derive, based on the coordinate pairs in prediction buffer 213, one or more predictors for a second point of the point cloud (2114). For example, assuming that the second point is not the first point of a tree (i.e., the second point has a parent point), decoder 300 may set a first predictor equal to ($r_0$, $\varphi_0$, $\theta_0$), where $\theta_0$ is the laser index θ value of the parent point $p_0$ coded in the parent node, and where ($r_0$, $\varphi_0$) is the first pair in prediction buffer 213. Decoder 300 may set predictors $PR_{n>0}$ equal to ($r_n$, $\varphi_n+k*\varphi_{step}$, $\theta_0$), where $\theta_0$ is the laser index θ value of the parent point p0 coded in the parent node, and where ($r_n$, $\varphi_n$) is the n-th pair in prediction buffer 213, and k equals 0 if $|\varphi_0-\varphi_n|<\varphi_{step}$, else k equals the integer division $(\varphi_0-\varphi_n)/\varphi_{step}$. In some examples, $(\varphi_0-\varphi_n)/\varphi_{step}$ may be approximated using the divApprox function of G-PCC: k=divApprox($\varphi_0-\varphi_n$, $\varphi_{step}$, 0).

Encoder 200 may then determine a predictor for the second point from among the derived predictors (2116). For example, encoder 200 may test each of the predictors to determine which of the predictors results in the smallest residual value, or a residual value that may be coded with less bits compared to the others. Thus, encoder 200 may determine residual values for the second point based on the determined predictor (2118). To determine the residual value for the second point, encoder 200 may subtract r, φ, or θ coordinates of the second point from corresponding r, φ, or θ values of the determined predictor.

Encoder 200 may entropy encode the residual values for the second point (2120). For example, encoder 200 may use CABAC encoding or exponential-Golomb coding to entropy encode the residual values for the second point. In some examples, encoder 200 may determine a context to use for entropy encoding the residual values as described in the techniques described elsewhere in this disclosure. For instance, encoder 200 may determine the context based on whether the second point is coded with intra predictor or inter prediction. Furthermore, in some examples, encoder 200 may determine a radius residual sign flag, determine a context for entropy encoding the radius residual sign flag as described elsewhere in this disclosure, and entropy encode the radius residual sign flag using the determined context.

Figure 22:
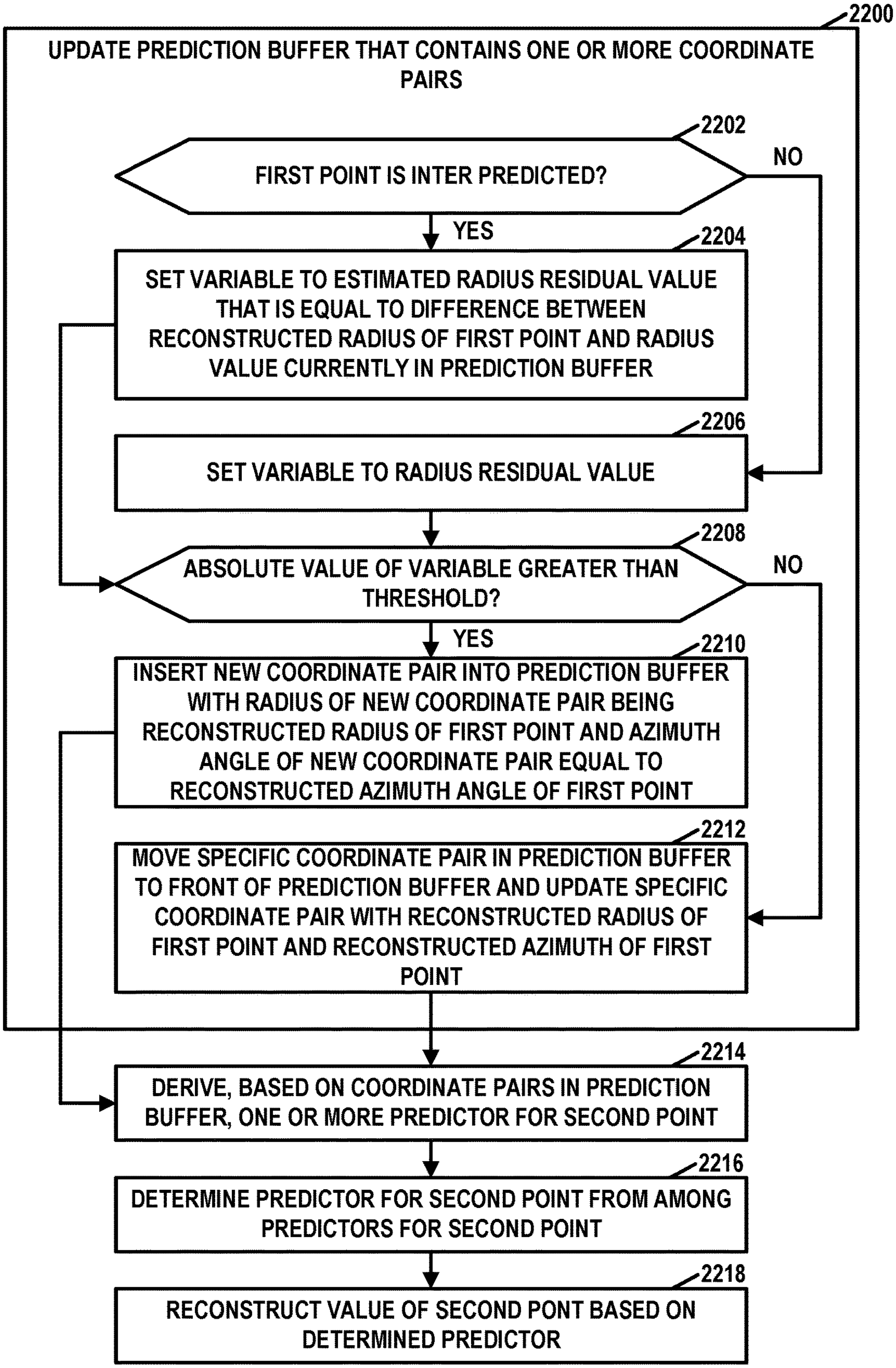
FIG. 22 is a flowchart illustrating an example operation of a decoder in which the decoder updates a prediction buffer according to one or more techniques of this disclosure.

FIG. 22 is a flowchart illustrating an example operation of decoder 300 in which decoder 300 updates prediction buffer 315 according to one or more techniques of this disclosure. In the example of FIG. 22, after decoding a first point of the point cloud, decoder 300 may update prediction buffer 315 that contains one or more coordinate pairs (2200). Each respective coordinate pair of the one or more coordinate pairs may indicate a respective radius and a respective azimuth angle.

As part of updating prediction buffer 315, decoder 300 may determine whether the first point was inter predicted (2202). If the first point was inter predicted ("YES" branch of 2202), decoder 300 may set a variable to an estimated radius residual value that is equal to a difference between a reconstructed radius of the first point and a radius value currently in prediction buffer 315 (2204). If the first point was not inter predicted ("NO" branch of 2202), encoder 200 may set the variable to a decoded radius residual value (2206).

Decoder 300 may then determine whether an absolute value of the variable is greater than a threshold (2208). In some examples, decoder 300 may determine the threshold based on whether the first point is inter predicted or intra predicted.

If the absolute value of the variable is greater than the threshold ("YES" branch of 2208), decoder 300 may insert a new coordinate pair into prediction buffer 315 with a radius of the new coordinate pair being a reconstructed radius of the first point and an azimuth angle of the new coordinate pair equal to a reconstructed azimuth angle of the first point (2210). Decoder 300 may remove the last coordinate pair in the list of coordinate in the prediction buffer. Additionally, decoder 300 may move all the coordinate pairs with index 0 to N−2 to indices 1 to N−1, respectively, where N is the number of coordinate pairs in the list.

If the absolute value of the variable is not greater than the threshold ("NO" branch of 2208), decoder 300 may move a specific coordinate pair in prediction buffer 315 to a front of prediction buffer 315 and may update the specific coordinate pair with the reconstructed radius of the first point and the reconstructed azimuth angle of the first point (2212). The specific coordinate pair may be a coordinate pair used for prediction of the first point. In instances where the first point is coded with intra prediction, the specific coordinate pair that is updated is the coordinate pair that was used for prediction of the first point. In instances where the first point is coded with inter prediction, the specific coordinate pair that is updated is the first coordinate pair in the list in the prediction buffer.

In other examples, decoder 300 may update prediction buffer 315 in other ways. For instance, in some examples, as part of updating prediction buffer 315, decoder 300 may remove a last-occurring coordinate pair in prediction buffer 315 based on the first point being inter predicted and may insert the new coordinate pair at the end of prediction buffer 315. In other words, when the point is inter coded, the last entry in the list is removed and (r0, φ0) is inserted in end of prediction buffer 315, where r0 and φ0 are the reconstructed radius and the reconstructed azimuthal angle of the decoded point.

In some examples, when the second point is coded with inter prediction, decoder 300 may update prediction buffer 315 such that a new coordinate pair (i.e., element) is always inserted in the front of prediction buffer 315, and decoder 300 discards the last element in prediction buffer 315 irrespective of the threshold value.

After updating prediction buffer 315, decoder 300 may derive, based on the coordinate pairs in prediction buffer 315, predictors for a second point of the point cloud (2214). For example, assuming that the second point is not the first point of a tree (i.e., the second point has a parent point), decoder 300 may set a first predictor equal to ($r_0$, $\varphi_0$, $\theta_0$), where $\theta_0$ is the laser index θ value of the parent point $p_0$ coded in the parent node, and where ($r_0$, $\varphi_0$) is the first pair in prediction buffer 315. Decoder 300 may set predictors $PR_{n>0}$ equal to ($r_n$, $\varphi_n+k*\varphi_{step}$, $\theta_0$), where $\theta_0$ is the laser index θ value of the parent point p0 coded in the parent node, and where ($r_n$, $\varphi_n$) is the n-th pair in prediction buffer 315, and k equals 0 if $|\varphi_0-\varphi_n|<\varphi_{step}$, else k equals the integer division $(\varphi_0-\varphi_n)/\varphi_{step}$. In some examples, $(\varphi_0-\varphi_n)/\varphi_{step}$ may be approximated using the divApprox function of G-PCC: $k=\text{divApprox}(\varphi_0-\varphi_n, \varphi_{step}, 0)$.

Decoder 300 may determine a predictor for the second point from among the derived predictors (2216). For example, decoder 300 may obtain a syntax element from the bitstream that specifies an index of the predictor for the second point.

Decoder 300 may reconstruct a position of the second point based on the determined predictor (2218). For example, decoder 300 may obtain residual values for one or more of a r, φ, or θ coordinate of the second point. In this example, decoder 300 may reconstruct a position of the second point by adding the residual r, φ, or θ coordinates to corresponding r, φ, or θ coordinate of the determined predictor.

In some examples, decoder 300 may use CABAC decoding to entropy decode the residual values for the second point. In some examples, decoder 300 may determine a context to use for entropy decoding the residual values as described in the techniques described elsewhere in this disclosure. For instance, decoder 300 may determine the context based on whether the second point is coded with intra predictor or inter prediction. Furthermore, in some examples, decoder 300 determine a context for entropy decoding a radius residual sign flag as described elsewhere in this disclosure, perform entropy decoding on the radius residual sign flag using the determined context, and apply the radius residual sign flag as part of determining the radius residual of the second point.

Figure 23:
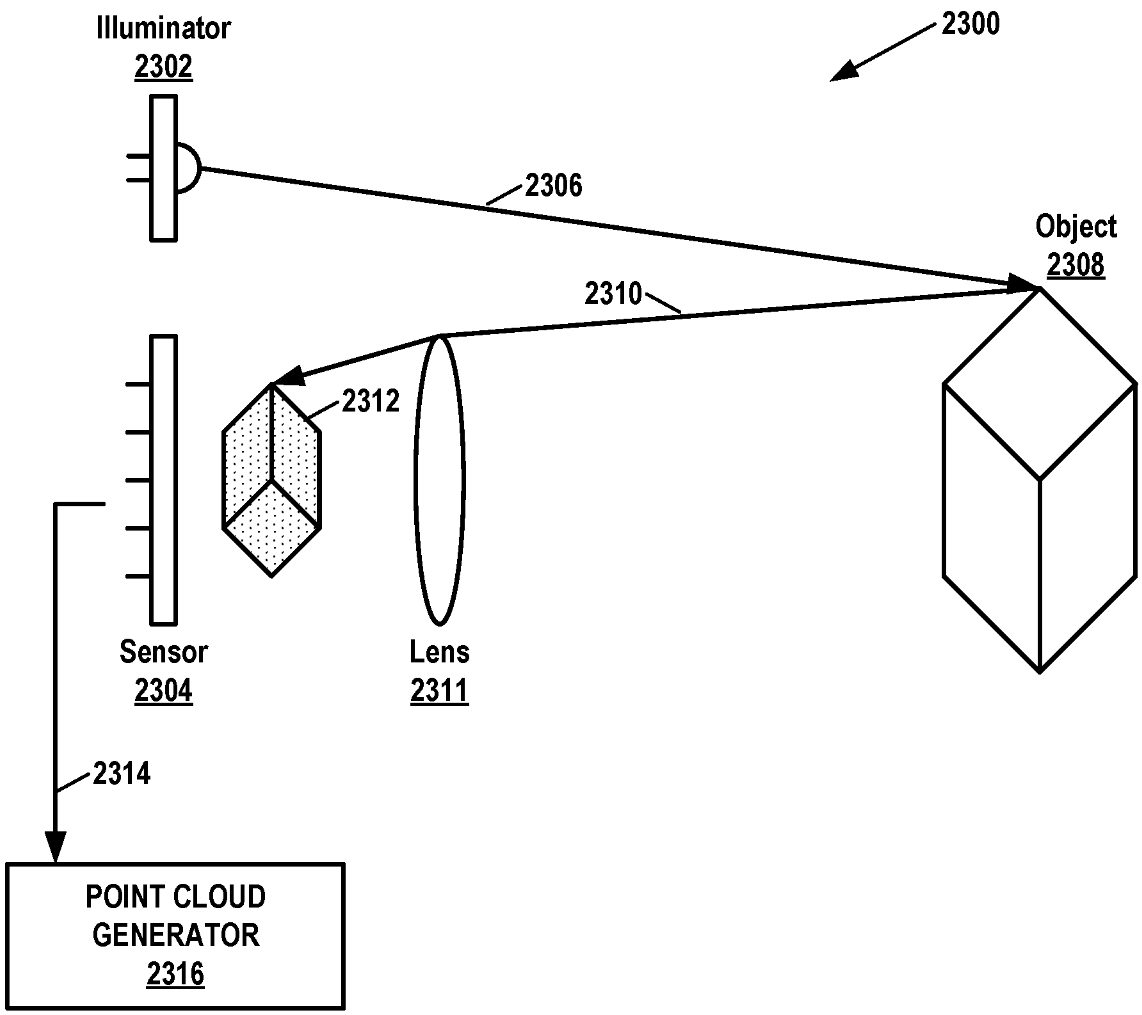
FIG. 23 is a conceptual diagram illustrating an example range-finding system that may be used with one or more techniques of this disclosure.

FIG. 23 is a conceptual diagram illustrating an example range-finding system 2300 that may be used with one or more techniques of this disclosure. In the example of FIG. 23, range-finding system 2300 includes an illuminator 2302 and a sensor 2304. Illuminator 2302 may emit light 2306. In some examples, illuminator 2302 may emit light 2306 as one or more laser beams. Light 2306 may be in one or more wavelengths, such as an infrared wavelength or a visible light wavelength. In other examples, light 2306 is not coherent, laser light. When light 2306 encounters an object, such as object 2308, light 2306 creates returning light 2310. Returning light 2310 may include backscattered and/or reflected light. Returning light 2310 may pass through a lens 2311 that directs returning light 2310 to create an image 2312 of object 2308 on sensor 2304. Sensor 2304 generates signals 2314 based on image 2312. Image 2312 may comprise a set of points (e.g., as represented by dots in image 2312 of FIG. 23).

In some examples, illuminator 2302 and sensor 2304 may be mounted on a spinning structure so that illuminator 2302 and sensor 2304 capture a 360-degree view of an environment (e.g., a spinning LIDAR sensor). In other examples, range-finding system 2300 may include one or more optical components (e.g., mirrors, collimators, diffraction gratings, etc.) that enable illuminator 2302 and sensor 2304 to detect ranges of objects within a specific range (e.g., up to 360-degrees). Although the example of FIG. 23 only shows a single illuminator 2302 and sensor 2304, range-finding system 2300 may include multiple sets of illuminators and sensors.

In some examples, illuminator 2302 generates a structured light pattern. In such examples, range-finding system 2300 may include multiple sensors 2304 upon which respective images of the structured light pattern are formed. Range-finding system 2300 may use disparities between the images of the structured light pattern to determine a distance to an object 2308 from which the structured light pattern backscatters. Structured light-based range-finding systems may have a high level of accuracy (e.g., accuracy in the sub-millimeter range), when object 2308 is relatively close to sensor 2304 (e.g., 0.2 meters to 2 meters). This high level of accuracy may be useful in facial recognition applications, such as unlocking mobile devices (e.g., mobile phones, tablet computers, etc.) and for security applications.

In some examples, range-finding system 2300 is a time of flight (ToF)-based system. In some examples where range-finding system 2300 is a ToF-based system, illuminator 2302 generates pulses of light. In other words, illuminator 2302 may modulate the amplitude of emitted light 2306. In such examples, sensor 2304 detects returning light 2310 from the pulses of light 2306 generated by illuminator 2302. Range-finding system 2300 may then determine a distance to object 2308 from which light 2306 backscatters based on a delay between when light 2306 was emitted and detected and the known speed of light in air). In some examples, rather than (or in addition to) modulating the amplitude of the emitted light 2306, illuminator 2302 may modulate the phase of the emitted light 2306. In such examples, sensor 2304 may detect the phase of returning light 2310 from object 2308 and determine distances to points on object 2308 using the speed of light and based on time differences between when illuminator 2302 generated light 2306 at a specific phase and when sensor 2304 detected returning light 2310 at the specific phase.

In other examples, a point cloud may be generated without using illuminator 2302. For instance, in some examples, sensors 2304 of range-finding system 2300 may include two or more optical cameras. In such examples, range-finding system 2300 may use the optical cameras to capture stereo images of the environment, including object 2308. Range-finding system 2300 may include a point cloud generator 2316 that may calculate the disparities between locations in the stereo images. Range-finding system 2300 may then use the disparities to determine distances to the locations shown in the stereo images. From these distances, point cloud generator 2316 may generate a point cloud.

Sensors 2304 may also detect other attributes of object 2308, such as color and reflectance information. In the example of FIG. 23, a point cloud generator 2316 may generate a point cloud based on signals 2114 generated by sensor 2304. Range-finding system 2300 and/or point cloud generator 2316 may form part of data source 104 (FIG. 1). Hence, a point cloud generated by range-finding system 2300 may be encoded and/or decoded according to any of the techniques of this disclosure. Inter prediction and residual prediction, as described in this disclosure may reduce the size of the encoded data.

Figure 24:
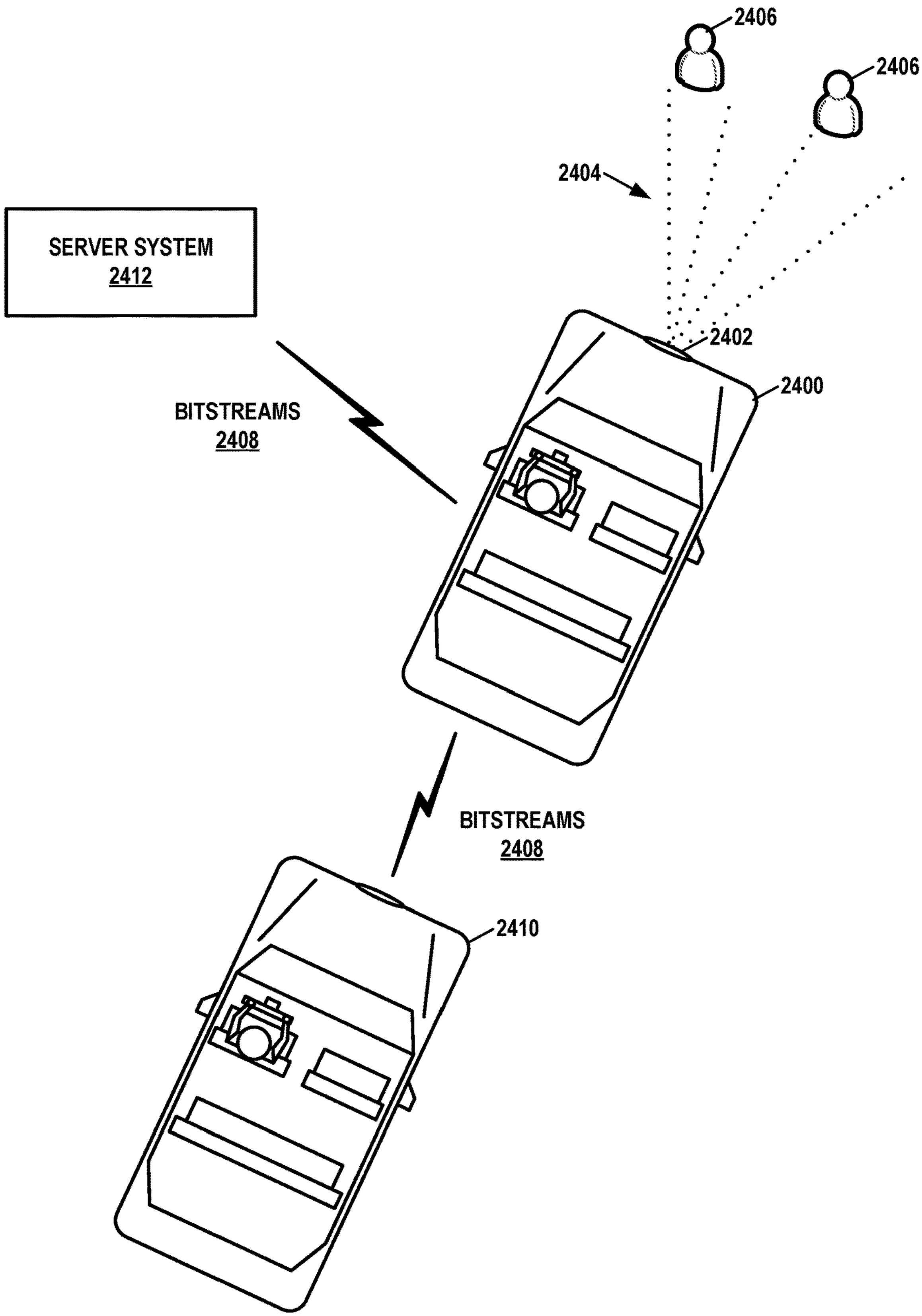
FIG. 24 is a conceptual diagram illustrating an example vehicle-based scenario in which one or more techniques of this disclosure may be used.

FIG. 24 is a conceptual diagram illustrating an example vehicle-based scenario in which one or more techniques of this disclosure may be used. In the example of FIG. 24, a vehicle 2400 includes a range-finding system 2402. Range-finding system 2402 may be implemented in the manner discussed with respect to FIG. 23. Although not shown in the example of FIG. 24, vehicle 2400 may also include a data source, such as data source 104 (FIG. 1), and a G-PCC encoder, such as G-PCC encoder 200 (FIG. 1). In the example of FIG. 24, range-finding system 2402 emits laser beams 2404 that reflect off pedestrians 2406 or other objects in a roadway. The data source of vehicle 2400 may generate a point cloud based on signals generated by range-finding system 2402. The G-PCC encoder of vehicle 2400 may encode the point cloud to generate bitstreams 2408, such as geometry bitstream 203 (FIG. 2) and attribute bitstream 205 (FIG. 2). Inter prediction and residual prediction, as described in this disclosure may reduce the size of the geometry bitstream. Bitstreams 2408 may include many fewer bits than the unencoded point cloud obtained by the G-PCC encoder.

An output interface of vehicle 2400 (e.g., output interface 108 (FIG. 1) may transmit bitstreams 2408 to one or more other devices. Bitstreams 2408 may include many fewer bits than the unencoded point cloud obtained by the G-PCC encoder. Thus, vehicle 2400 may be able to transmit bitstreams 2408 to other devices more quickly than the unencoded point cloud data. Additionally, bitstreams 2408 may require less data storage capacity on a device.

In the example of FIG. 24, vehicle 2400 may transmit bitstreams 2408 to another vehicle 2410. Vehicle 2410 may include a G-PCC decoder, such as G-PCC decoder 300 (FIG. 1). The G-PCC decoder of vehicle 2410 may decode bitstreams 2408 to reconstruct the point cloud. Vehicle 2410 may use the reconstructed point cloud for various purposes. For instance, vehicle 2410 may determine based on the reconstructed point cloud that pedestrians 2406 are in the roadway ahead of vehicle 2400 and therefore start slowing down, e.g., even before a driver of vehicle 2410 realizes that pedestrians 2406 are in the roadway. Thus, in some examples, vehicle 2410 may perform an autonomous navigation operation based on the reconstructed point cloud.

Additionally or alternatively, vehicle 2400 may transmit bitstreams 2408 to a server system 2412. Server system 2412 may use bitstreams 2408 for various purposes. For example, server system 2412 may store bitstreams 2408 for subsequent reconstruction of the point clouds. In this example, server system 2412 may use the point clouds along with other data (e.g., vehicle telemetry data generated by vehicle 2400) to train an autonomous driving system. In other example, server system 2412 may store bitstreams 2408 for subsequent reconstruction for forensic crash investigations.

Figure 25:
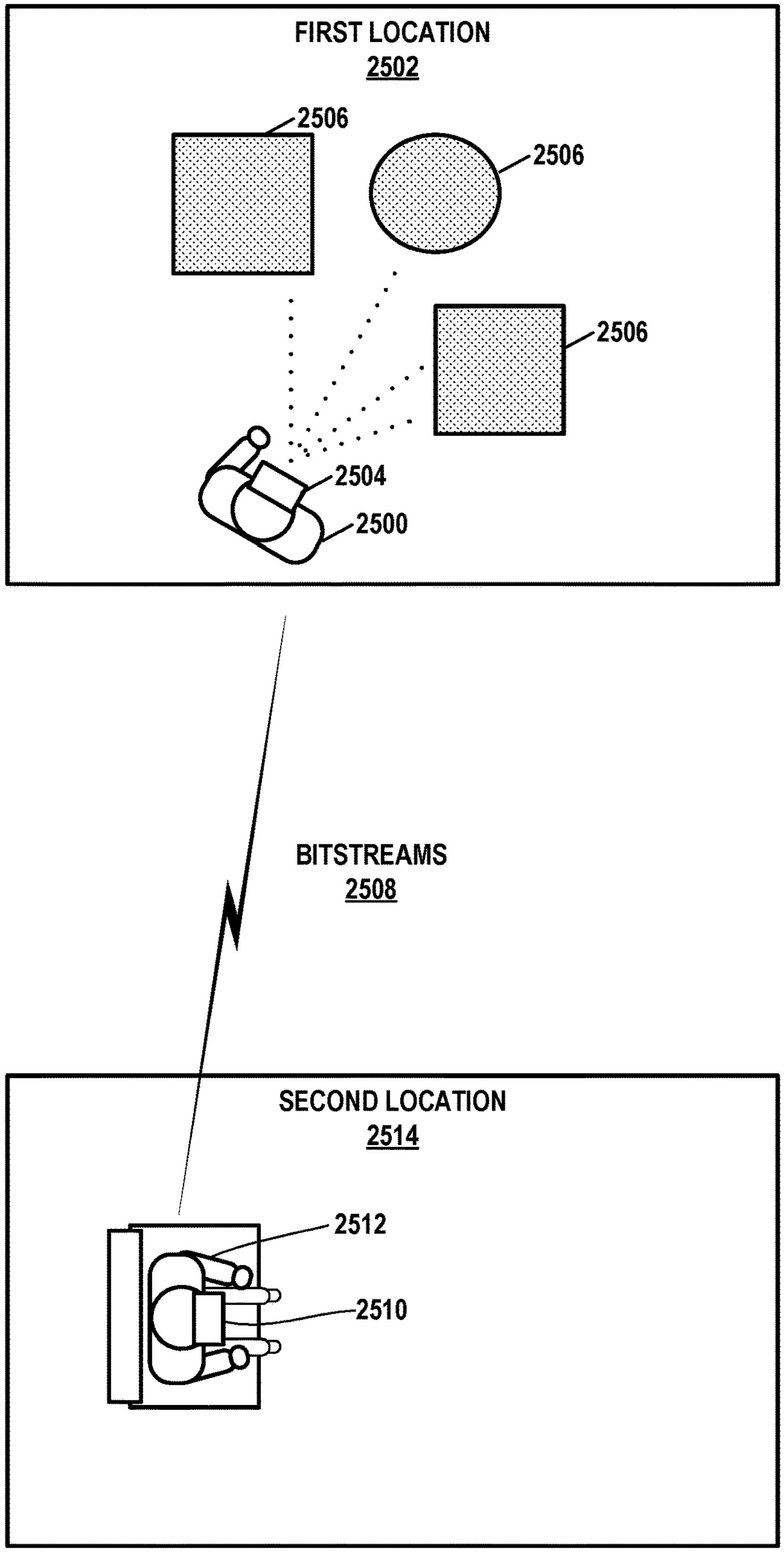
FIG. 25 is a conceptual diagram illustrating an example extended reality system in which one or more techniques of this disclosure may be used.

FIG. 25 is a conceptual diagram illustrating an example extended reality system in which one or more techniques of this disclosure may be used. Extended reality (XR) is a term used to cover a range of technologies that includes augmented reality (AR), mixed reality (MR), and virtual reality (VR). In the example of FIG. 25, a user 2500 is located in a first location 2502. User 2500 wears an XR headset 2504. As an alternative to XR headset 2504, user 2500 may use a mobile device (e.g., mobile phone, tablet computer, etc.). XR headset 2504 includes a depth detection sensor, such as a range-finding system, that detects positions of points on objects 2506 at location 2502. A data source of XR headset 2504 may use the signals generated by the depth detection sensor to generate a point cloud representation of objects 2506 at location 2502. XR headset 2504 may include a G-PCC encoder (e.g., G-PCC encoder 200 of FIG. 1) that is configured to encode the point cloud to generate bitstreams 2508. Inter prediction and residual prediction, as described in this disclosure may reduce the size of bitstream 2508.

XR headset 2504 may transmit bitstreams 2508 (e.g., via a network such as the Internet) to an XR headset 2510 worn by a user 2512 at a second location 2514. XR headset 2510 may decode bitstreams 2508 to reconstruct the point cloud. XR headset 2510 may use the point cloud to generate an XR visualization (e.g., an AR, MR, VR visualization) representing objects 2506 at location 2502. Thus, in some examples, such as when XR headset 2510 generates an VR visualization, user 2512 may have a 3D immersive experience of location 2502. In some examples, XR headset 2510 may determine a position of a virtual object based on the reconstructed point cloud. For instance, XR headset 2510 may determine, based on the reconstructed point cloud, that an environment (e.g., location 2502) includes a flat surface and then determine that a virtual object (e.g., a cartoon character) is to be positioned on the flat surface. XR headset 2510 may generate an XR visualization in which the virtual object is at the determined position. For instance, XR headset 2510 may show the cartoon character sitting on the flat surface.

Figure 26:
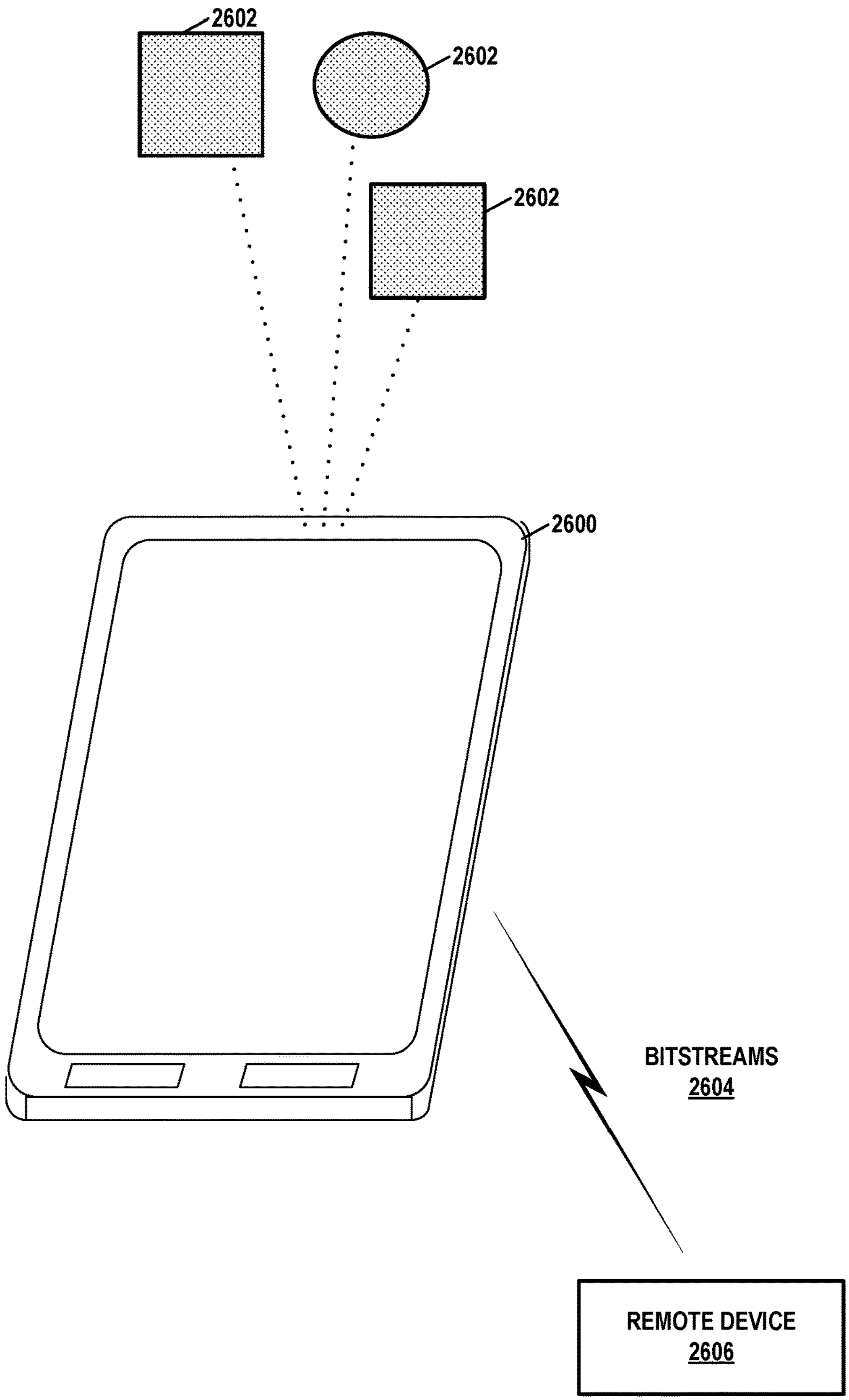
FIG. 26 is a conceptual diagram illustrating an example mobile device system in which one or more techniques of this disclosure may be used.

FIG. 26 is a conceptual diagram illustrating an example mobile device system in which one or more techniques of this disclosure may be used. In the example of FIG. 26, a mobile device 2600 (e.g., a wireless communication device), such as a mobile phone or tablet computer, includes a range-finding system, such as a LIDAR system, that detects positions of points on objects 2602 in an environment of mobile device 2600. A data source of mobile device 2600 may use the signals generated by the depth detection sensor to generate a point cloud representation of objects 2602. Mobile device 2600 may include a G-PCC encoder (e.g., G-PCC encoder 200 of FIG. 1) that is configured to encode the point cloud to generate bitstreams 2604. In the example of FIG. 26, mobile device 2600 may transmit bitstreams to a remote device 2606, such as a server system or other mobile device. Inter prediction and residual prediction, as described in this disclosure may reduce the size of bitstreams 2604. Remote device 2606 may decode bitstreams 2604 to reconstruct the point cloud. Remote device 2606 may use the point cloud for various purposes. For example, remote device 2606 may use the point cloud to generate a map of environment of mobile device 2600. For instance, remote device 2606 may generate a map of an interior of a building based on the reconstructed point cloud. In another example, remote device 2606 may generate imagery (e.g., computer graphics) based on the point cloud. For instance, remote device 2606 may use points of the point cloud as vertices of polygons and use color attributes of the points as the basis for shading the polygons. In some examples, remote device 2606 may use the reconstructed point cloud for facial recognition or other security applications.

Examples in the various aspects of this disclosure may be used individually or in any combination.

The following is a non-limiting list of clauses in accordance with one or more techniques of this disclosure.

Clause 1A: A method of encoding a point cloud includes determining a sign of a radius residual of a current point of the point cloud; determining a context for entropy encoding a radius residual sign flag indicating the sign of the radius residual of the current point, wherein determining the context for entropy encoding the radius residual sign flag comprises determining the context for entropy encoding the radius residual sign flag based on whether a previous coded point is inter coded and whether the current point is inter coded; and entropy encoding the radius residual sign flag using the determined context.

Clause 2A: A method of decoding a point cloud includes obtaining an entropy encoded radius residual sign flag indicating a sign of a radius residual of a current point of the point cloud; determining a context for entropy decoding the radius residual sign flag, wherein determining the context for entropy encoding the radius residual sign flag comprises determining the context for entropy encoding the radius residual sign flag based on whether a previous coded point is inter coded and whether the current point is inter coded; entropy decoding the radius residual sign flag using the determined context; and reconstructing a position of position of the current point based on the radius residual sign flag.

Clause 3A: A method of encoding a point cloud includes determining a residual value associated with a current point of the point cloud, the residual value associated with the current point being a radius residual or an azimuth residual; determining a context for entropy encoding the residual value based on whether the current point is coded with intra prediction or inter prediction; and entropy encoding the residual value using the determined context.

Clause 4A: A method of decoding a point cloud includes obtaining an entropy encoded residual value associated with a current point of the point cloud, the residual value associated with the current point being a radius residual or an azimuth residual; determining a context for entropy encoding the residual value based on whether the current point is coded with intra prediction or inter prediction; entropy decoding the residual value using the determined context; and reconstructing a position of position of the current point based on the radius residual or the azimuth residual.

Clause 5A: A method of encoding a point cloud includes after encoding a first point of the point cloud, updating a prediction buffer that contains one or more predictors, each respective predictor of the one or more predictors indicating a respective radius and a respective azimuth angle, wherein updating the prediction buffer comprises: based on the first point being inter predicted, setting a variable to an estimated radius residual value that is equal to a difference between a reconstructed radius of the first point and a radius value currently in the prediction buffer; and one of: based on an absolute value of the variable being greater than a threshold, inserting a new predictor into the prediction buffer with a radius of the new predictor being a reconstructed radius of the first point and an azimuth angle of the new predictor equal to a reconstructed azimuth angle of the first point; or based on the absolute value of the variable not being greater than the threshold, moving a specific predictor in the prediction buffer to a front of the prediction buffer and updating the specific predictor with the reconstructed radius of the first point and the reconstructed azimuth angle of the first point, wherein the specific predictor was used for prediction of the first point; determining a predictor in the prediction buffer for a second point of the point cloud; determining a residual value for the second point based on the determined predictor; and entropy encoding the residual value for the second point.

Clause 6A: The method of clause 5A, further includes after encoding a third point of the point cloud: based on the third point being intra predicted, setting the variable to a decoded radius residual value of the third point; and one of: based on an absolute value of the variable being greater than the threshold, inserting a second new predictor into the prediction buffer with a radius of the second new predictor being a reconstructed radius of the third point and an azimuth angle of the new predictor equal to a reconstructed azimuth angle of the third point; or based on the absolute value of the variable not being greater than the threshold, updating a second specific predictor with the reconstructed radius of the third point and the reconstructed azimuth angle of the third point, wherein the second specific predictor is a first-occurring predictor in the predictor buffer.

Clause 7A: The method of any of clauses 5A-6A, further comprising determining the threshold based on whether the first point is inter predicted or inter predicted.

Clause 8A: The method of any of clauses 5A-7A, wherein updating the prediction buffer further comprises: removing a last-occurring predictor in the prediction buffer based on the first point being inter predicted; and inserting the new predictor at an end of the prediction buffer.

Clause 9A: A method of decoding a point cloud includes after decoding a first point of the point cloud, updating a prediction buffer that contains one or more predictors, each respective predictor of the one or more predictors indicating a respective radius and a respective azimuth angle, wherein updating the prediction buffer comprises: based on the first point being inter predicted, setting a variable to an estimated radius residual value that is equal to a difference between a reconstructed radius of the first point and a radius value currently in the prediction buffer; and one of: based on an absolute value of the variable being greater than a threshold, inserting a new predictor into the prediction buffer with a radius of the new predictor being a reconstructed radius of the first point and an azimuth angle of the new predictor equal to a reconstructed azimuth angle of the first point; or based on the absolute value of the variable not being greater than the threshold, moving a specific predictor in the prediction buffer to a front of the prediction buffer and updating the specific predictor with the reconstructed radius of the first point and the reconstructed azimuth angle of the first point, wherein the specific predictor was used for prediction of the first point; determining a predictor in the prediction buffer for a second point of the point cloud; and reconstructing a value of the second point based on the determined predictor.

Clause 10A: The method of clause 9A, further includes after decoding a third point of the point cloud: based on the third point being intra predicted, setting the variable to a decoded radius residual value of the third point; and one of: based on an absolute value of the variable being greater than the threshold, inserting a second new predictor into the prediction buffer with a radius of the second new predictor being a reconstructed radius of the third point and an azimuth angle of the new predictor equal to a reconstructed azimuth angle of the third point; or based on the absolute value of the variable not being greater than the threshold, updating a second specific predictor with the reconstructed radius of the third point and the reconstructed azimuth angle of the third point, wherein the second specific predictor is a first-occurring predictor in the predictor buffer.

Clause 11A: The method of any of clauses 9A-10A, further comprising determining the threshold based on whether the first point is inter predicted or inter predicted.

Clause 12A: The method of any of clauses 9A-11A, wherein updating the prediction buffer further comprises: removing a last-occurring predictor in the prediction buffer based on the first point being inter predicted; and inserting the new predictor at an end of the prediction buffer.

Clause 13A: A method of encoding or decoding a point cloud in accordance with any of the techniques of this disclosure.

Clause 14A: A device for encoding or decoding a point cloud, the device comprising one or more means for performing the method of any of clauses 1A-13A.

Clause 15A: The device of clause 14A, wherein the one or more means comprise one or more processors implemented in circuitry.

Clause 16A: The device of any of clauses 14A or 15A, further comprising a memory to store the data representing the point cloud.

Clause 17A: The device of any of clauses 14A-16A, wherein the device comprises a decoder.

Clause 18A: The device of any of clauses 14A-17A, wherein the device comprises an encoder.

Clause 19A: The device of any of clauses 14A-18A, further comprising a device to generate the point cloud.

Clause 20A: The device of any of clauses 14A-19A, further comprising a display to present imagery based on the point cloud.

Clause 21A: A computer-readable storage medium having stored thereon instructions that, when executed, cause one or more processors to perform the method of any of clauses 1A-13A.

Clause 1B. A device for encoding a point cloud, the device comprising: a memory configured to store point cloud data for the point cloud; and one or more processors implemented in circuitry and coupled to the memory, the one or more processors configured to: determine a sign of a radius residual of a current point of the point cloud; determine, based on whether a previous coded point is inter coded and whether the current point is inter coded, a context for entropy encoding a radius residual sign flag indicating the sign of the radius residual of the current point; and entropy encode the radius residual sign flag using the determined context.

Clause 2B. The device of clause 1B, wherein the one or more processors are configured to, as part of determining the context for entropy encoding the radius residual sign flag, look up the context based on whether a previous point is inter coded, whether the current point is inter coded, whether a predictor for the current point is a parent node of the current point, whether a coded number of azimuthal steps for the previous point is equal to zero, whether a coded number of azimuthal steps for the current point is equal to zero, and a sign of a last-coded radius residual.

Clause 3B. The device of any clauses 1B-2B, wherein the one or more processors are configured to, as part of determining the context for entropy encoding the radius residual sign flag: determine a context index based on whether a selected predictor for the current point is a parent node of the current point, whether a coded number of azimuthal steps for a preceding point is equal to zero, whether a coded number of azimuthal steps for the current point is equal to zero, and a sign of a last-coded radius residual; determine a value of a variable, wherein the one or more processors are configured to, as part of determining the value of the variable: determine the value of the variable is equal to a Boolean value indicating whether a previous point is inter coded multiplied by a Boolean value indicating whether the current point is inter coded, or determine the value of the variable is equal to a minimum of 1 and a value equal to the Boolean value indicating whether the previous point is inter coded plus the Boolean value indicating whether the current point is inter coded; and look up the context in a three-dimensional table, wherein a value for a first dimension of the table indicates whether a previous point is inter coded, a value for a second dimension of the table indicates whether the current point is inter coded, and a value for a third dimension of the table is equal to 0 if the value of the variable is true and equal to the context index otherwise.

Clause 4B. The device of any of clauses 1B-3B, wherein the one or more processors are configured to, as part of determining the context for entropy encoding the radius residual sign flag: determine an intra context index based on whether a selected predictor for the current point is a parent node of the current point, whether a coded number of azimuthal steps for a preceding point is equal to zero, whether a coded number of azimuthal steps for the current point is equal to zero, and a sign of a last-coded radius residual; determine an inter context index based on whether a previous point is inter coded and whether the current point is inter coded; and look up the context in a two-dimensional table, wherein a value for a first dimension of the table is the inter context index and a value for a second dimension of the table is equal to 0 if the current point is inter coded and equal to the intra context index otherwise.

Clause 5B. The device of any of clauses 1B-3B, wherein the one or more processors are configured to, as part of determining the context for entropy encoding the radius residual sign flag: determine an intra context index based on whether a selected predictor for the current point is a parent node of the current point, whether a coded number of azimuthal steps for a preceding point is equal to zero, whether a coded number of azimuthal steps for the current point is equal to zero, and a sign of a last-coded radius residual; and look up the context in a two-dimensional table, wherein: a value for a first dimension of the table is equal to 2 if the current point is inter coded and otherwise equal to a Boolean value indicating whether a previous point is inter predicted, and a value for a second dimension of the table is equal to 0 if the current point is inter coded and otherwise equal to the intra context index.

Clause 6B. The device of any of clauses 1B-5B, further comprising a device to generate the point cloud.

Clause 7B. The device of any of clauses 1B-6N, wherein the one or more processors are further configured to: determine, based on whether the previous coded point is inter coded and/or whether the current point is inter coded, a second context for entropy encoding one or more syntax elements associated with an azimuth residual indicating a magnitude of the azimuth residual of the current point; and entropy encode the azimuth residual using the determined second context.

Clause 8B. A device for decoding a point cloud, the device comprising: a memory configured to store point cloud data for the point cloud; and one or more processors implemented in circuitry and coupled to the memory, the one or more processors configured to: obtain an entropy encoded radius residual sign flag indicating a sign of a radius residual of a current point of the point cloud; determine, based on whether a previous coded point is inter coded and whether the current point is inter coded, a context for entropy decoding the radius residual sign flag; entropy decode the radius residual sign flag using the determined context; and reconstruct a position of the current point based on the radius residual sign flag.

Clause 9B. The device of clause 8B, wherein the one or more processors are configured to, as part of determining the context for entropy decoding the radius residual sign flag, look up the context based on whether a previous point is inter coded, whether the current point is inter coded, whether a predictor for the current point is a parent node of the current point, whether a coded number of azimuthal steps for the previous point is equal to zero, whether a coded number of azimuthal steps for the current point is equal to zero, and a sign of a last-coded radius residual.

Clause 10B. The device of any of clauses 8B-9B, wherein the one or more processors are configured to, as part of determining the context for entropy decoding the radius residual sign flag: determine a context index based on whether a selected predictor for the current point is a parent node of the current point, whether a coded number of azimuthal steps for a preceding point is equal to zero, whether a coded number of azimuthal steps for the current point is equal to zero, and a sign of a last-coded radius residual; determine a value of a variable, wherein the one or more processors are configured to, as part of determining the value of the variable: determine the value of the variable is equal to a Boolean value indicating whether a previous point is inter coded multiplied by a Boolean value indicating whether the current point is inter coded, or determine the value of the variable is equal to a minimum of 1 and a value equal to the Boolean value indicating whether the previous point is inter coded plus the Boolean value indicating whether the current point is inter coded; and look up the context in a three-dimensional table, wherein a value for a first dimension of the table indicates whether a previous point is inter coded, a value for a second dimension of the table indicates whether the current point is inter coded, and a value for a third dimension of the table is equal to 0 if the value of the variable is true and equal to the context index otherwise.

Clause 11B. The device of any of clauses 8B-10B, wherein the one or more processors are configured to, as part of determining the context for entropy decoding the radius residual sign flag: determine an intra context index based on whether a selected predictor for the current point is a parent node of the current point, whether a coded number of azimuthal steps for a preceding point is equal to zero, whether a coded number of azimuthal steps for the current point is equal to zero, and a sign of a last-coded radius residual; determine an inter context index based on whether a previous point is inter coded and whether the current point is inter coded; and look up the context in a two-dimensional table, wherein a value for a first dimension of the table is the inter context index and a value for a second dimension of the table is equal to 0 if the current point is inter coded and equal to the intra context index otherwise.

Clause 12B. The device of any of clauses 8B-10B, wherein the one or more processors are configured to, as part of determining the context for entropy decoding the radius residual sign flag: determine an intra context index based on whether a selected predictor for the current point is a parent node of the current point, whether a coded number of azimuthal steps for a preceding point is equal to zero, whether a coded number of azimuthal steps for the current point is equal to zero, and a sign of a last-coded radius residual; and look up the context in a two-dimensional table, wherein: a value for a first dimension of the table is equal to 2 if the current point is inter coded and otherwise equal to a Boolean value indicating whether a previous point is inter predicted, and a value for a second dimension of the table is equal to 0 if the current point is inter coded and otherwise equal to the intra context index.

Clause 13B. The device of any of clauses 8B-12B, further comprising a display to present imagery based on the point cloud.

Clause 14B. The device of any of clauses 8B-13B, further comprising: determine, based on whether the previous coded point is inter coded and/or whether the current point is inter coded, a second context for entropy encoding one or more syntax elements associated with an azimuth residual indicating a magnitude of the azimuth residual of the current point; and entropy decode the azimuth residual using the determined second context.

Clause 15B. A method of encoding a point cloud, the method comprising: determining a sign of a radius residual of a current point of the point cloud; determining a context for entropy encoding a radius residual sign flag indicating the sign of the radius residual of the current point, wherein determining the context for entropy encoding the radius residual sign flag comprises determining the context for entropy encoding the radius residual sign flag based on whether a previous coded point is inter coded and whether the current point is inter coded; and entropy encoding the radius residual sign flag using the determined context.

Clause 16B. The method of clause 15B, wherein determining the context for entropy encoding the radius residual sign flag comprises looking up the context based on whether a previous point is inter coded, whether the current point is inter coded, whether a predictor for the current point is a parent node of the current point, whether a coded number of azimuthal steps for the previous point is equal to zero, whether a coded number of azimuthal steps for the current point is equal to zero, and a sign of a last-coded radius residual.

Clause 17B. The method of any of clauses 15B-16B, wherein determining the context for entropy encoding the radius residual sign flag comprises: determining a context index based on whether a selected predictor for the current point is a parent node of the current point, whether a coded number of azimuthal steps for a preceding point is equal to zero, whether a coded number of azimuthal steps for the current point is equal to zero, and a sign of a last-coded radius residual; determining a value of a variable, wherein determining the value of the variable comprises one of: determining the value of the variable is equal to a Boolean value indicating whether a previous point is inter coded multiplied by a Boolean value indicating whether the current point is inter coded, or determining the value of the variable is equal to a minimum of 1 and a value equal to the Boolean value indicating whether the previous point is inter coded plus the Boolean value indicating whether the current point is inter coded; and looking up the context in a three-dimensional table, wherein a value for a first dimension of the table indicates whether a previous point is inter coded, a value for a second dimension of the table indicates whether the current point is inter coded, and a value for a third dimension of the table is equal to 0 if the value of the variable is true and equal to the context index otherwise.

Clause 18B. The method of any of clauses 15B-17B, wherein determining the context for entropy encoding the radius residual sign flag comprises: determining an intra context index based on whether a selected predictor for the current point is a parent node of the current point, whether a coded number of azimuthal steps for a preceding point is equal to zero, whether a coded number of azimuthal steps for the current point is equal to zero, and a sign of a last-coded radius residual; determining an inter context index based on whether a previous point is inter coded and whether the current point is inter coded; and looking up the context in a two-dimensional table, wherein a value for a first dimension of the table is the inter context index and a value for a second dimension of the table is equal to 0 if the current point is inter coded and equal to the intra context index otherwise.

Clause 19B. The method of any of clauses 15B-17B, wherein determining the context for entropy encoding the radius residual sign flag comprises: determining an intra context index based on whether a selected predictor for the current point is a parent node of the current point, whether a coded number of azimuthal steps for a preceding point is equal to zero, whether a coded number of azimuthal steps for the current point is equal to zero, and a sign of a last-coded radius residual; and looking up the context in a two-dimensional table, wherein: a value for a first dimension of the table is equal to 2 if the current point is inter coded and otherwise equal to a Boolean value indicating whether a previous point is inter predicted, and a value for a second dimension of the table is equal to 0 if the current point is inter coded and otherwise equal to the intra context index.

Clause 20B. The method of any of clauses 15B-19B, further comprising: determining, based on whether the previous coded point is inter coded and/or whether the current point is inter coded, a second context for entropy encoding one or more syntax elements associated with an azimuth residual indicating a magnitude of the azimuth residual of the current point; and entropy encoding the azimuth residual using the determined second context.

Clause 21B. A method of decoding a point cloud, the method comprising: obtaining an entropy encoded radius residual sign flag indicating a sign of a radius residual of a current point of the point cloud; determining a context for entropy decoding the radius residual sign flag, wherein determining the context for entropy decoding the radius residual sign flag comprises determining the context for entropy decoding the radius residual sign flag based on whether a previous coded point is inter coded and whether the current point is inter coded; entropy decoding the radius residual sign flag using the determined context; and reconstructing a position of the current point based on the radius residual sign flag.

Clause 22B. The method of clause 21B, wherein determining the context for entropy decoding the radius residual sign flag comprises looking up the context based on whether a previous point is inter coded, whether the current point is inter coded, whether a predictor for the current point is a parent node of the current point, whether a coded number of azimuthal steps for the previous point is equal to zero, whether a coded number of azimuthal steps for the current point is equal to zero, and a sign of a last-coded radius residual.

Clause 23B. The method of any of clauses 21B-22B, wherein determining the context for entropy decoding the radius residual sign flag comprises: determining a context index based on whether a selected predictor for the current point is a parent node of the current point, whether a coded number of azimuthal steps for a preceding point is equal to zero, whether a coded number of azimuthal steps for the current point is equal to zero, and a sign of a last-coded radius residual; determining a value of a variable, wherein determining the value of the variable comprises one of: determining the value of the variable is equal to a Boolean value indicating whether a previous point is inter coded multiplied by a Boolean value indicating whether the current point is inter coded, or determining the value of the variable is equal to a minimum of 1 and a value equal to the Boolean value indicating whether the previous point is inter coded plus the Boolean value indicating whether the current point is inter coded; and looking up the context in a three-dimensional table, wherein a value for a first dimension of the table indicates whether a previous point is inter coded, a value for a second dimension of the table indicates whether the current point is inter coded, and a value for a third dimension of the table is equal to 0 if the value of the variable is true and equal to the context index otherwise.

Clause 24B. The method of any of clauses 21B-23B, wherein determining the context for entropy decoding the radius residual sign flag comprises: determining an intra context index based on whether a selected predictor for the current point is a parent node of the current point, whether a coded number of azimuthal steps for a preceding point is equal to zero, whether a coded number of azimuthal steps for the current point is equal to zero, and a sign of a last-coded radius residual; determining an inter context index based on whether a previous point is inter coded and whether the current point is inter coded; and looking up the context in a two-dimensional table, wherein a value for a first dimension of the table is the inter context index and a value for a second dimension of the table is equal to 0 if the current point is inter coded and equal to the intra context index otherwise.

Clause 25B. The method of any of clauses 21B-23B, wherein determining the context for entropy decoding the radius residual sign flag comprises: determining an intra context index based on whether a selected predictor for the current point is a parent node of the current point, whether a coded number of azimuthal steps for a preceding point is equal to zero, whether a coded number of azimuthal steps for the current point is equal to zero, and a sign of a last-coded radius residual; and looking up the context in a two-dimensional table, wherein: a value for a first dimension of the table is equal to 2 if the current point is inter coded and otherwise equal to a Boolean value indicating whether a previous point is inter predicted, and a value for a second dimension of the table is equal to 0 if the current point is inter coded and otherwise equal to the intra context index.

Clause 26B. The device of any of clauses 21B-25B, further comprising: determine, based on whether the previous coded point is inter coded and/or whether the current point is inter coded, a second context for entropy encoding one or more syntax elements associated with an azimuth residual indicating a magnitude of the azimuth residual of the current point; and entropy decode the azimuth residual using the determined second context.

Clause 27B. A device for encoding a point cloud, the device comprising: means for determining a sign of a radius residual of a current point of the point cloud; means for determining a context for entropy encoding a radius residual sign flag indicating the sign of the radius residual of the current point, wherein determining the context for entropy encoding the radius residual sign flag comprises determining the context for entropy encoding the radius residual sign flag based on whether a previous coded point is inter coded and whether the current point is inter coded; and means for entropy encoding the radius residual sign flag using the determined context.

Clause 28B. A device for decoding a point cloud, the device comprising: means for obtaining an entropy encoded radius residual sign flag indicating a sign of a radius residual of a current point of the point cloud; means for determining a context for entropy decoding the radius residual sign flag, wherein determining the context for entropy decoding the radius residual sign flag comprises determining the context for entropy decoding the radius residual sign flag based on whether a previous coded point is inter coded and whether the current point is inter coded; means for entropy decoding the radius residual sign flag using the determined context; and means for reconstructing a position of the current point based on the radius residual sign flag.

Clause 1C. A device for encoding a point cloud, the device comprising: a memory configured to store point cloud data for the point cloud; and one or more processors implemented in circuitry and coupled to the memory, the one or more processors configured to: determine a residual value associated with a current point of the point cloud, the residual value associated with the current point being a radius residual or an azimuth residual; determine a context for entropy encoding the residual value based on whether the current point is coded with intra prediction or inter prediction; and entropy encode the residual value using the determined context.

Clause 2C. The device of clause 1, wherein the one or more processors are configured to, as part of determining the context: determine the context for entropy encoding the residual value based on whether the current point is encoded with intra prediction or inter prediction and based on whether a previous point was encoded with intra prediction or inter prediction.

Clause 3C. The device of any of clauses 1B-2C, wherein the context for entropy encoding the residual value is one of: a context for entropy encoding a first value indicating whether an absolute value of the azimuth residual is greater than 0, a context for entropy encoding a second value indicating a sign of the azimuth residual, a context for entropy encoding a third value indicating whether the absolute value of the azimuth residual is greater than 1, or a context for entropy encoding a fourth value indicating the absolute value of the azimuth residual minus 1.

Clause 4C. The device of any of clauses 1C-3C, wherein the context for entropy encoding the residual value is a context for entropy encoding a second value indicating a sign of the azimuth residual and the one or more processors are configured to, as part of determining the context: set a value for a first dimension of a look-up table as equal to 2 if a Boolean variable indicating whether the current point is coded using inter prediction is true and setting the value for the first dimension to a Boolean variable indicating whether the current point is a parent node; set a value for a second dimension of the look-up table equal to 3 if the Boolean variable indicating whether the current point is coded using inter prediction is true and otherwise to a value that has different values depending whether a previous point is intra coded and an azimuth residual of the previous point is less than 0, whether the previous point is intra coded and the azimuth residual of the previous point is greater than or equal to 0, or whether the previous point is inter coded; and look up the context in the look-up table based on the value for the first dimension and the value for the second dimension.

Clause 5C. The device of any of clauses 1C-4C, wherein the context for entropy encoding the residual value is a context for entropy encoding a second value indicating a sign of the azimuth residual and the one or more processors are configured to, as part of determining the context: set a value for a first dimension of a look-up table as equal to 2 if a Boolean variable indicating whether the current point is coded using inter prediction is true and setting the value for the first dimension to a Boolean variable indicating whether the current point is a parent node; set a value for a second dimension of the look-up table equal to a value that has different values depending whether a previous point is intra coded and an azimuth residual of the previous point is less than 0, whether the previous point is intra coded and the azimuth residual of the previous point is greater than or equal to 0, or whether the previous point is inter coded; and look up the context in the look-up table based on the value for the first dimension and the value for the second dimension.

Clause 6C. The device of any of clauses 1C-6C, further comprising a device to generate the point cloud.

Clause 7C. A device for decoding a point cloud, the device comprising: a memory configured to store point cloud data for the point cloud; and one or more processors configured to: obtain an entropy encoded residual value associated with a current point of the point cloud, the residual value associated with the current point being a radius residual or an azimuth residual; determine a context for entropy decoding the residual value based on whether the current point is coded with intra prediction or inter prediction; entropy decode the residual value using the determined context; and reconstruct a position of position of the current point based on the radius residual or the azimuth residual.

Clause 8C. The device of clause 7C, wherein the one or more processors are configured to, as part of determining the context: determine the context for entropy decoding the residual value based on whether the current point is encoded with intra prediction or inter prediction and based on whether a previous point was encoded with intra prediction or inter prediction.

Clause 9C. The device of any of clauses 7C-8C, wherein the context for entropy decoding the residual value is one of: a context for entropy decoding a first value indicating whether an absolute value of the azimuth residual is greater than 0, a context for entropy decoding a second value indicating a sign of the azimuth residual, a context for entropy decoding a third value indicating whether the absolute value of the azimuth residual is greater than 1, or a context for entropy decoding a fourth value indicating the absolute value of the azimuth residual minus 1.

Clause 10C. The device of any of clauses 7C-9C, wherein the context for entropy decoding the residual value is a context for entropy decoding a second value indicating a sign of the azimuth residual and the one or more processors are configured to, as part of determining the context comprises: set a value for a first dimension of a look-up table as equal to 2 if a Boolean variable indicating whether the current point is coded using inter prediction is true and setting the value for the first dimension to a Boolean variable indicating whether the current point is a parent node; set a value for a second dimension of the look-up table equal to 3 if the Boolean variable indicating whether the current point is coded using inter prediction is true and otherwise to a value that has different values depending whether a previous point is intra coded and an azimuth residual of the previous point is less than 0, whether the previous point is intra coded and the azimuth residual of the previous point is greater than or equal to 0, or whether the previous point is inter coded; and look up the context in the look-up table based on the value for the first dimension and the value for the second dimension.

Clause 11C. The device of any of clauses 7C-10C, wherein the context for entropy decoding the residual value is a context for entropy decoding a second value indicating a sign of the azimuth residual and the one or more processors are configured to, as part of determining the context: set a value for a first dimension of a look-up table as equal to 2 if a Boolean variable indicating whether the current point is coded using inter prediction is true and setting the value for the first dimension to a Boolean variable indicating whether the current point is a parent node; set a value for a second dimension of the look-up table equal to a value that has different values depending whether a previous point is intra coded and an azimuth residual of the previous point is less than 0, whether the previous point is intra coded and the azimuth residual of the previous point is greater than or equal to 0, or whether the previous point is inter coded; and look up the context in the look-up table based on the value for the first dimension and the value for the second dimension.

Clause 12C. The device of any of clauses 7C-11C, further comprising a display to present imagery based on the point cloud.

Clause 13C. A method of encoding a point cloud, the method comprising: determining a residual value associated with a current point of the point cloud, the residual value associated with the current point being a radius residual or an azimuth residual; determining a context for entropy encoding the residual value based on whether the current point is coded with intra prediction or inter prediction; and entropy encoding the residual value using the determined context.

Clause 14C. The method of clause 13C, wherein determining the context comprises: determining the context for entropy encoding the residual value based on whether the current point is encoded with intra prediction or inter prediction and based on whether a previous point was encoded with intra prediction or inter prediction.

Clause 15C. The method of any of clauses 13C-14C, wherein the context for entropy encoding the residual value is one of: a context for entropy encoding a first value indicating whether an absolute value of the azimuth residual is greater than 0, a context for entropy encoding a second value indicating a sign of the azimuth residual, a context for entropy encoding a third value indicating whether the absolute value of the azimuth residual is greater than 1, or a context for entropy encoding a fourth value indicating the absolute value of the azimuth residual minus 1.

Clause 16C. The method of any of clauses 13C-15C, wherein the context for entropy encoding the residual value is a context for entropy encoding a second value indicating a sign of the azimuth residual and determining the context comprises: setting a value for a first dimension of a look-up table as equal to 2 if a Boolean variable indicating whether the current point is coded using inter prediction is true and setting the value for the first dimension to a Boolean variable indicating whether the current point is a parent node; setting a value for a second dimension of the look-up table equal to 3 if the Boolean variable indicating whether the current point is coded using inter prediction is true and otherwise to a value that has different values depending whether a previous point is intra coded and an azimuth residual of the previous point is less than 0, whether the previous point is intra coded and the azimuth residual of the previous point is greater than or equal to 0, or whether the previous point is inter coded; and looking up the context in the look-up table based on the value for the first dimension and the value for the second dimension.

Clause 17C. The method of any of clauses 13C-16C, wherein the context for entropy encoding the residual value is a context for entropy encoding a second value indicating a sign of the azimuth residual and determining the context comprises: setting a value for a first dimension of a look-up table as equal to 2 if a Boolean variable indicating whether the current point is coded using inter prediction is true and setting the value for the first dimension to a Boolean variable indicating whether the current point is a parent node; setting a value for a second dimension of the look-up table equal to a value that has different values depending whether a previous point is intra coded and an azimuth residual of the previous point is less than 0, whether the previous point is intra coded and the azimuth residual of the previous point is greater than or equal to 0, or whether the previous point is inter coded; and looking up the context in the look-up table based on the value for the first dimension and the value for the second dimension.

Clause 18C. A method of decoding a point cloud, the method comprising: obtaining an entropy encoded residual value associated with a current point of the point cloud, the residual value associated with the current point being a radius residual or an azimuth residual; determining a context for entropy decoding the residual value based on whether the current point is coded with intra prediction or inter prediction; entropy decoding the residual value using the determined context; and reconstructing a position of position of the current point based on the radius residual or the azimuth residual.

Clause 19C. The method of clause 18C, wherein determining the context comprises: determining the context for entropy decoding the residual value based on whether the current point is encoded with intra prediction or inter prediction and based on whether a previous point was encoded with intra prediction or inter prediction.

Clause 20C. The method of any of clauses 18C-19C, wherein the context for entropy decoding the residual value is one of: a context for entropy decoding a first value indicating whether an absolute value of the azimuth residual is greater than 0, a context for entropy decoding a second value indicating a sign of the azimuth residual, a context for entropy decoding a third value indicating whether the absolute value of the azimuth residual is greater than 1, or a context for entropy decoding a fourth value indicating the absolute value of the azimuth residual minus 1.

Clause 21C. The method of any of clauses 18C-20C, wherein the context for entropy decoding the residual value is a context for entropy decoding a second value indicating a sign of the azimuth residual and determining the context comprises: setting a value for a first dimension of a look-up table as equal to 2 if a Boolean variable indicating whether the current point is coded using inter prediction is true and setting the value for the first dimension to a Boolean variable indicating whether the current point is a parent node; setting a value for a second dimension of the look-up table equal to 3 if the Boolean variable indicating whether the current point is coded using inter prediction is true and otherwise to a value that has different values depending whether a previous point is intra coded and an azimuth residual of the previous point is less than 0, whether the previous point is intra coded and the azimuth residual of the previous point is greater than or equal to 0, or whether the previous point is inter coded; and looking up the context in the look-up table based on the value for the first dimension and the value for the second dimension.

Clause 22C. The method of any of clauses 18C-21C, wherein the context for entropy decoding the residual value is a context for entropy decoding a second value indicating a sign of the azimuth residual and determining the context comprises: setting a value for a first dimension of a look-up table as equal to 2 if a Boolean variable indicating whether the current point is coded using inter prediction is true and setting the value for the first dimension to a Boolean variable indicating whether the current point is a parent node; setting a value for a second dimension of the look-up table equal to a value that has different values depending whether a previous point is intra coded and an azimuth residual of the previous point is less than 0, whether the previous point is intra coded and the azimuth residual of the previous point is greater than or equal to 0, or whether the previous point is inter coded; and looking up the context in the look-up table based on the value for the first dimension and the value for the second dimension.

Clause 23C. A device for decoding a point cloud, the device comprising: means for determining a residual value associated with a current point of the point cloud, the residual value associated with the current point being a radius residual or an azimuth residual; means for determining a context for entropy encoding the residual value based on whether the current point is coded with intra prediction or inter prediction; and means for entropy encoding the residual value using the determined context.

Clause 24C. A device for encoding a point cloud, the device comprising: means for determining a residual value associated with a current point of the point cloud, the residual value associated with the current point being a radius residual or an azimuth residual; means for determining a context for entropy encoding the residual value based on whether the current point is coded with intra prediction or inter prediction; and means for entropy encoding the residual value using the determined context.

Clause 1D. A device for encoding a point cloud, the device comprising: a memory configured to store point cloud data for the point cloud; and one or more processors implemented in circuitry and coupled to the memory, the one or more processors configured to: after encoding a first point of the point cloud, update a prediction buffer that contains one or more coordinate pairs, each respective coordinate pair of the one or more coordinate pairs indicating a respective radius and a respective azimuth angle, wherein the one or more processors are configured to, as part of updating the prediction buffer: based on the first point being inter predicted, set a variable to an estimated radius residual value that is equal to a difference between a reconstructed radius of the first point and a radius value currently in the prediction buffer; based on an absolute value of the variable being greater than a threshold, insert a new coordinate pair into the prediction buffer with a radius of the new coordinate pair being a reconstructed radius of the first point and an azimuth angle of the new predictor equal to a reconstructed azimuth angle of the first point; and based on the absolute value of the variable not being greater than the threshold, move a specific coordinate pair in the prediction buffer to a front of the prediction buffer and update the specific coordinate pair with the reconstructed radius of the first point and the reconstructed azimuth angle of the first point, wherein, based on the first point being inter predicted, the specific coordinate pair is a first coordinate pair in the prediction buffer; derive, based on the coordinate pairs in the prediction buffer, one or more predictors for a second point of the point cloud; determine a predictor for the second point from among the derived predictors; and determine residual values for the second point based on the determined predictor.

Clause 2D. The device of clause 1D, wherein the one or more processors are further configured to entropy encode the residuals value for the second point.

Clause 3D. The device of any of clauses 1D-2D, wherein the one or more processors are further configured to, after encoding a third point of the point cloud: based on the third point being intra predicted, set the variable to a decoded radius residual value of the third point; based on an absolute value of the variable being greater than the threshold, insert a second new coordinate pair into the prediction buffer with a radius of the second new coordinate pair being a reconstructed radius of the third point and an azimuth angle of the new coordinate pair equal to a reconstructed azimuth angle of the third point; and based on the absolute value of the variable not being greater than the threshold, move a second specific coordinate pair in the prediction buffer to a front of the prediction buffer and updating the second specific coordinate pair with the reconstructed radius of the first point and the reconstructed azimuth angle of the first point, wherein the second specific coordinate pair was used for prediction of the first point.

Clause 4D. The device of any of clauses 1D-3D, wherein the one or more processors are further configured to determine the threshold based on whether the first point is inter predicted or intra predicted.

Clause 5D. The device of any of clauses 1D-4D, wherein the one or more processors are further configured to, as part of updating the prediction buffer further: remove a last-occurring coordinate pair in the prediction buffer based on the first point being inter predicted; and insert the new coordinate pair at an end of the prediction buffer.

Clause 6D. The device of any of clauses 1D-5D, further comprising a device to generate the point cloud.

Clause 7D. A device for decoding a point cloud, the device comprising: a memory configured to store point cloud data for the point cloud; and one or more processors implemented in circuitry and coupled to the memory, the one or more processors configured to: after decoding a first point of the point cloud, update a prediction buffer that contains one or more coordinate pairs, each respective coordinate pair of the one or more coordinate pairs indicating a respective radius and a respective azimuth angle, wherein the one or more processors are configured to, as part of updating the prediction buffer: based on the first point being inter predicted, set a variable to an estimated radius residual value that is equal to a difference between a reconstructed radius of the first point and a radius value currently in the prediction buffer; based on an absolute value of the variable being greater than a threshold, insert a new coordinate pair into the prediction buffer with a radius of the new coordinate pair being a reconstructed radius of the first point and an azimuth angle of the new predictor equal to a reconstructed azimuth angle of the first point; and based on the absolute value of the variable not being greater than the threshold, move a specific coordinate pair in the prediction buffer to a front of the prediction buffer and update the specific coordinate pair with the reconstructed radius of the first point and the reconstructed azimuth angle of the first point, wherein, based on the first point being inter predicted, the specific coordinate pair is a first coordinate pair in the prediction buffer; derive, based on the coordinate pairs in the prediction buffer, one or more predictors for a second point of the point cloud; determine a predictor for the second point from among the derived predictors; and reconstruct a position of the second point based on the determined predictor.

Clause 8D. The device of clause 7D, wherein the one or more processors are further configured to: after decoding a third point of the point cloud: based on the third point being intra predicted, setting the variable to a decoded radius residual value of the third point; and one of: based on an absolute value of the variable being greater than the threshold, inserting a second new coordinate pair into the prediction buffer with a radius of the second new coordinate pair being a reconstructed radius of the third point and an azimuth angle of the new coordinate pair equal to a reconstructed azimuth angle of the third point; or based on the absolute value of the variable not being greater than the threshold, moving a second specific coordinate pair in the prediction buffer to a front of the prediction buffer and updating the second specific coordinate pair with the reconstructed radius of the first point and the reconstructed azimuth angle of the first point, wherein the second specific coordinate pair was used for prediction of the first point.

Clause 9D. The device of any of clauses 7D-9D, wherein the one or more processors are further configured to determine the threshold based on whether the first point is inter predicted or intra predicted.

Clause 10D. The device of any of clauses 7D-9D, wherein the one or more processors are configured to, as part of updating the prediction buffer further: remove a last-occurring coordinate pair in the prediction buffer based on the first point being inter predicted; and insert the new coordinate pair at an end of the prediction buffer.

Clause 11D. The device of any of clauses 7D-10D, further comprising a display to present imagery based on the point cloud.

Clause 12D. A method of encoding a point cloud, the method comprising: after encoding a first point of the point cloud, updating a prediction buffer that contains one or more coordinate pairs, each respective coordinate pair of the one or more coordinate pairs indicating a respective radius and a respective azimuth angle, wherein updating the prediction buffer comprises: based on the first point being inter predicted, setting a variable to an estimated radius residual value that is equal to a difference between a reconstructed radius of the first point and a radius value currently in the prediction buffer; and one of: based on an absolute value of the variable being greater than a threshold, inserting a new coordinate pair into the prediction buffer with a radius of the new coordinate pair being a reconstructed radius of the first point and an azimuth angle of the new predictor equal to a reconstructed azimuth angle of the first point; or based on the absolute value of the variable not being greater than the threshold, moving a specific coordinate pair in the prediction buffer to a front of the prediction buffer and updating the specific coordinate pair with the reconstructed radius of the first point and the reconstructed azimuth angle of the first point, wherein, based on the first point being inter predicted, the specific coordinate pair is a first coordinate pair in the prediction buffer; deriving, based on the coordinate pairs in the prediction buffer, one or more predictors for a second point of the point cloud; determining a predictor for the second point from among the derived predictors; and determining residual values for the second point based on the determined predictor.

Clause 13D. The method of clause 12D, further comprising entropy encoding the residuals value for the second point.

Clause 14D. The method of any of clauses 12D-13D, further comprising: after encoding a third point of the point cloud: based on the third point being intra predicted, setting the variable to a decoded radius residual value of the third point; and one of: based on an absolute value of the variable being greater than the threshold, inserting a second new coordinate pair into the prediction buffer with a radius of the second new coordinate pair being a reconstructed radius of the third point and an azimuth angle of the new coordinate pair equal to a reconstructed azimuth angle of the third point; or based on the absolute value of the variable not being greater than the threshold, moving a second specific coordinate pair in the prediction buffer to a front of the prediction buffer and updating the second specific coordinate pair with the reconstructed radius of the first point and the reconstructed azimuth angle of the first point, wherein the second specific coordinate pair was used for prediction of the first point.

Clause 15D. The method of any of clauses 12D-14D, further comprising determining the threshold based on whether the first point is inter predicted or intra predicted.

Clause 16D. The method of any of clauses 12D-15D, wherein updating the prediction buffer further comprises: removing a last-occurring coordinate pair in the prediction buffer based on the first point being inter predicted; and inserting the new coordinate pair at an end of the prediction buffer.

Clause 17D. A method of decoding a point cloud, the method comprising: after decoding a first point of the point cloud, updating a prediction buffer that contains one or more coordinate pairs, each respective coordinate pair of the one or more coordinate pairs indicating a respective radius and a respective azimuth angle, wherein updating the prediction buffer comprises: based on the first point being inter predicted, setting a variable to an estimated radius residual value that is equal to a difference between a reconstructed radius of the first point and a radius value currently in the prediction buffer; and one of: based on an absolute value of the variable being greater than a threshold, inserting a new coordinate pair into the prediction buffer with a radius of the new coordinate pair being a reconstructed radius of the first point and an azimuth angle of the new predictor equal to a reconstructed azimuth angle of the first point; and based on the absolute value of the variable not being greater than the threshold, moving a specific coordinate pair in the prediction buffer to a front of the prediction buffer and updating the specific coordinate pair with the reconstructed radius of the first point and the reconstructed azimuth angle of the first point, wherein, based on the first point being inter predicted, the specific coordinate pair is a first coordinate pair in the prediction buffer; deriving, based on the coordinate pairs in the prediction buffer, one or more predictors for a second point of the point cloud; determining a predictor for the second point from among the derived predictors; and reconstructing a position of the second point based on the determined predictor.

Clause 18D. The method of clause 17D, further comprising: after decoding a third point of the point cloud: based on the third point being intra predicted, setting the variable to a decoded radius residual value of the third point; and one of: based on an absolute value of the variable being greater than the threshold, inserting a second new coordinate pair into the prediction buffer with a radius of the second new coordinate pair being a reconstructed radius of the third point and an azimuth angle of the new coordinate pair equal to a reconstructed azimuth angle of the third point; or based on the absolute value of the variable not being greater than the threshold, moving a second specific coordinate pair in the prediction buffer to a front of the prediction buffer and updating the second specific coordinate pair with the reconstructed radius of the first point and the reconstructed azimuth angle of the first point, wherein the second specific coordinate pair was used for prediction of the first point.

Clause 19D. The method of any of clauses 17D-18D, further comprising determining the threshold based on whether the first point is inter predicted or intra predicted.

Clause 20D. The method of any of clauses 17D-19D, wherein updating the prediction buffer further comprises: removing a last-occurring coordinate pair in the prediction buffer based on the first point being inter predicted; and inserting the new coordinate pair at an end of the prediction buffer.

Clause 21D. A device for encoding a point cloud, the device comprising: means for updating, after encoding a first point of the point cloud, a prediction buffer that contains one or more coordinate pairs, each respective coordinate pair of the one or more coordinate pairs indicating a respective radius and a respective azimuth angle, wherein the means for updating the prediction buffer comprises: means for setting, based on the first point being inter predicted, a variable to an estimated radius residual value that is equal to a difference between a reconstructed radius of the first point and a radius value currently in the prediction buffer; means for inserting, based on an absolute value of the variable being greater than a threshold, a new coordinate pair into the prediction buffer with a radius of the new coordinate pair being a reconstructed radius of the first point and an azimuth angle of the new predictor equal to a reconstructed azimuth angle of the first point; or means for moving, based on the absolute value of the variable not being greater than the threshold, a specific coordinate pair in the prediction buffer to a front of the prediction buffer and updating the specific coordinate pair with the reconstructed radius of the first point and the reconstructed azimuth angle of the first point, wherein, based on the first point being inter predicted, the specific coordinate pair is a first coordinate pair in the prediction buffer; means for deriving, based on the coordinate pairs in the prediction buffer, one or more predictors for a second point of the point cloud; means for determining a predictor for the second point from among the derived predictors; and means for determining residual values for the second point based on the determined predictor.

Clause 22D. A device for decoding a point cloud, the device comprising: means for updating, after decoding a first point of the point cloud, a prediction buffer that contains one or more coordinate pairs, each respective coordinate pair of the one or more coordinate pairs indicating a respective radius and a respective azimuth angle, wherein the means for updating the prediction buffer comprises: means for setting, based on the first point being inter predicted, a variable to an estimated radius residual value that is equal to a difference between a reconstructed radius of the first point and a radius value currently in the prediction buffer; means for inserting, based on an absolute value of the variable being greater than a threshold, a new coordinate pair into the prediction buffer with a radius of the new coordinate pair being a reconstructed radius of the first point and an azimuth angle of the new predictor equal to a reconstructed azimuth angle of the first point; and means for moving, based on the absolute value of the variable not being greater than the threshold, a specific coordinate pair in the prediction buffer to a front of the prediction buffer and updating the specific coordinate pair with the reconstructed radius of the first point and the reconstructed azimuth angle of the first point, wherein, based on the first point being inter predicted, the specific coordinate pair is a first coordinate pair in the prediction buffer; means for deriving, based on the coordinate pairs in the prediction buffer, one or more predictors for a second point of the point cloud; means for determining a predictor for the second point from among the derived predictors; and means for reconstructing a position of the second point based on the determined predictor.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A device for encoding a point cloud, the device comprising:
- a memory configured to store point cloud data for the point cloud; and
- one or more processors implemented in circuitry and coupled to the memory, the one or more processors configured to:
  - determine a sign of a radius residual of a current point of the point cloud;
  - determine, based on whether a previous coded point is inter coded and whether the current point is inter coded, a context for entropy encoding a radius residual sign flag indicating the sign of the radius residual of the current point; and
  - entropy encode the radius residual sign flag using the determined context.

2. The device of claim 1, wherein the one or more processors are configured to, as part of determining the context for entropy encoding the radius residual sign flag, look up the context based on whether the previous coded point is inter coded, whether the current point is inter coded, whether a predictor for the current point is a parent node of the current point, whether a coded number of azimuthal steps for the previous coded point is equal to zero, whether a coded number of azimuthal steps for the current point is equal to zero, and a sign of a last-coded radius residual.

3. The device of claim 1, wherein the one or more processors are configured to, as part of determining the context for entropy encoding the radius residual sign flag:
- determine a context index based on whether a selected predictor for the current point is a parent node of the current point, whether a coded number of azimuthal steps for a preceding point is equal to zero, whether a coded number of azimuthal steps for the current point is equal to zero, and a sign of a last-coded radius residual;
- determine a value of a variable, wherein the one or more processors are configured to, as part of determining the value of the variable:
  - determine the value of the variable is equal to a Boolean value indicating whether the previous coded point is inter coded multiplied by a Boolean value indicating whether the current point is inter coded, or
  - determine the value of the variable is equal to a minimum of 1 and a value equal to the Boolean value indicating whether the previous coded point is inter coded plus the Boolean value indicating whether the current point is inter coded; and
- look up the context in a three-dimensional table, wherein a value for a first dimension of the table indicates whether the previous coded point is inter coded, a value for a second dimension of the table indicates whether the current point is inter coded, and a value for a third dimension of the table is equal to 0 if the value of the variable is true and equal to the context index otherwise.

4. The device of claim 1, wherein the one or more processors are configured to, as part of determining the context for entropy encoding the radius residual sign flag:
- determine an intra context index based on whether a selected predictor for the current point is a parent node of the current point, whether a coded number of azimuthal steps for a preceding point is equal to zero, whether a coded number of azimuthal steps for the current point is equal to zero, and a sign of a last-coded radius residual;
- determine an inter context index based on whether the previous coded point is inter coded and whether the current point is inter coded; and
- look up the context in a two-dimensional table, wherein a value for a first dimension of the table is the inter context index and a value for a second dimension of the table is equal to 0 if the current point is inter coded and equal to the intra context index otherwise.

5. The device of claim 1, wherein the one or more processors are configured to, as part of determining the context for entropy encoding the radius residual sign flag:
- determine an intra context index based on whether a selected predictor for the current point is a parent node of the current point, whether a coded number of azimuthal steps for a preceding point is equal to zero, whether a coded number of azimuthal steps for the current point is equal to zero, and a sign of a last-coded radius residual; and
- look up the context in a two-dimensional table, wherein:
  - a value for a first dimension of the table is equal to 2 if the current point is inter coded and otherwise equal to a Boolean value indicating whether the previous coded point is inter predicted, and
  - a value for a second dimension of the table is equal to 0 if the current point is inter coded and otherwise equal to the intra context index.

6. The device of claim 1, further comprising a device to generate the point cloud.

7. The device of claim 1, wherein the one or more processors are further configured to:
- determine, based on whether the previous coded point is inter coded and/or whether the current point is inter coded, a second context for entropy encoding one or more syntax elements associated with an azimuth residual indicating a magnitude of the azimuth residual of the current point; and entropy encode the azimuth residual using the determined second context.

8. A device for decoding a point cloud, the device comprising:

a memory configured to store point cloud data for the point cloud; and one or more processors implemented in circuitry and coupled to the memory, the one or more processors configured to:

obtain an entropy encoded radius residual sign flag indicating a sign of a radius residual of a current point of the point cloud;

determine, based on whether a previous coded point is inter coded and whether the current point is inter coded, a context for entropy decoding the radius residual sign flag;

entropy decode the radius residual sign flag using the determined context; and reconstruct a position of the current point based on the radius residual sign flag.

9. The device of claim 8, wherein the one or more processors are configured to, as part of determining the context for entropy decoding the radius residual sign flag, look up the context based on whether the previous coded point is inter coded, whether the current point is inter coded, whether a predictor for the current point is a parent node of the current point, whether a coded number of azimuthal steps for the previous coded point is equal to zero, whether a coded number of azimuthal steps for the current point is equal to zero, and a sign of a last-coded radius residual.

10. The device of claim 8, wherein the one or more processors are configured to, as part of determining the context for entropy decoding the radius residual sign flag:

determine a context index based on whether a selected predictor for the current point is a parent node of the current point, whether a coded number of azimuthal steps for a preceding point is equal to zero, whether a coded number of azimuthal steps for the current point is equal to zero, and a sign of a last-coded radius residual;

determine a value of a variable, wherein the one or more processors are configured to, as part of determining the value of the variable:

determine the value of the variable is equal to a Boolean value indicating whether the previous coded point is inter coded multiplied by a Boolean value indicating whether the current point is inter coded, or determine the value of the variable is equal to a minimum of 1 and a value equal to the Boolean value indicating whether the previous coded point is inter coded plus the Boolean value indicating whether the current point is inter coded; and look up the context in a three-dimensional table, wherein a value for a first dimension of the table indicates whether the previous coded point is inter coded, a value for a second dimension of the table indicates whether the current point is inter coded, and a value for a third dimension of the table is equal to 0 if the value of the variable is true and equal to the context index otherwise.

11. The device of claim 8, wherein the one or more processors are configured to, as part of determining the context for entropy decoding the radius residual sign flag:

determine an intra context index based on whether a selected predictor for the current point is a parent node of the current point, whether a coded number of azimuthal steps for a preceding point is equal to zero, whether a coded number of azimuthal steps for the current point is equal to zero, and a sign of a last-coded radius residual;

determine an inter context index based on whether the previous coded point is inter coded and whether the current point is inter coded; and look up the context in a two-dimensional table, wherein a value for a first dimension of the table is the inter context index and a value for a second dimension of the table is equal to 0 if the current point is inter coded and equal to the intra context index otherwise.

12. The device of claim 8, wherein the one or more processors are configured to, as part of determining the context for entropy decoding the radius residual sign flag:

determine an intra context index based on whether a selected predictor for the current point is a parent node of the current point, whether a coded number of azimuthal steps for a preceding point is equal to zero, whether a coded number of azimuthal steps for the current point is equal to zero, and a sign of a last-coded radius residual; and look up the context in a two-dimensional table, wherein:

a value for a first dimension of the table is equal to 2 if the current point is inter coded and otherwise equal to a Boolean value indicating whether the previous coded point is inter predicted, and a value for a second dimension of the table is equal to 0 if the current point is inter coded and otherwise equal to the intra context index.

13. The device of claim 8, further comprising a display to present imagery based on the point cloud.

14. The device of claim 8, wherein the one or more processors are further configured to:

determine, based on whether the previous coded point is inter coded and/or whether the current point is inter coded, a second context for entropy encoding one or more syntax elements associated with an azimuth residual indicating a magnitude of the azimuth residual of the current point; and entropy decode the azimuth residual using the determined second context.

15. A method of encoding a point cloud, the method comprising:

determining a sign of a radius residual of a current point of the point cloud;

determining a context for entropy encoding a radius residual sign flag indicating the sign of the radius residual of the current point, wherein determining the context for entropy encoding the radius residual sign flag comprises determining the context for entropy encoding the radius residual sign flag based on whether a previous coded point is inter coded and whether the current point is inter coded; and entropy encoding the radius residual sign flag using the determined context.

16. The method of claim 15, wherein determining the context for entropy encoding the radius residual sign flag comprises looking up the context based on whether the previous coded point is inter coded, whether the current point is inter coded, whether a predictor for the current point is a parent node of the current point, whether a coded number of azimuthal steps for the previous coded point is equal to zero, whether a coded number of azimuthal steps for the current point is equal to zero, and a sign of a last-coded radius residual.

17. The method of claim 15, wherein determining the context for entropy encoding the radius residual sign flag comprises:

determining a context index based on whether a selected predictor for the current point is a parent node of the current point, whether a coded number of azimuthal steps for a preceding point is equal to zero, whether a coded number of azimuthal steps for the current point is equal to zero, and a sign of a last-coded radius residual;

determining a value of a variable, wherein determining the value of the variable comprises one of:

determining the value of the variable is equal to a Boolean value indicating whether the previous coded point is inter coded multiplied by a Boolean value indicating whether the current point is inter coded, or determining the value of the variable is equal to a minimum of 1 and a value equal to the Boolean value indicating whether the previous coded point is inter coded plus the Boolean value indicating whether the current point is inter coded; and looking up the context in a three-dimensional table, wherein a value for a first dimension of the table indicates whether the previous coded point is inter coded, a value for a second dimension of the table indicates whether the current point is inter coded, and a value for a third dimension of the table is equal to 0 if the value of the variable is true and equal to the context index otherwise.

18. The method of claim 15, wherein determining the context for entropy encoding the radius residual sign flag comprises:

determining an intra context index based on whether a selected predictor for the current point is a parent node of the current point, whether a coded number of azimuthal steps for a preceding point is equal to zero, whether a coded number of azimuthal steps for the current point is equal to zero, and a sign of a last-coded radius residual;

determining an inter context index based on whether the previous coded point is inter coded and whether the current point is inter coded; and looking up the context in a two-dimensional table, wherein a value for a first dimension of the table is the inter context index and a value for a second dimension of the table is equal to 0 if the current point is inter coded and equal to the intra context index otherwise.

19. The method of claim 15, wherein determining the context for entropy encoding the radius residual sign flag comprises:

determining an intra context index based on whether a selected predictor for the current point is a parent node of the current point, whether a coded number of azimuthal steps for a preceding point is equal to zero, whether a coded number of azimuthal steps for the current point is equal to zero, and a sign of a last-coded radius residual; and looking up the context in a two-dimensional table, wherein:

a value for a first dimension of the table is equal to 2 if the current point is inter coded and otherwise equal to a Boolean value indicating whether the previous coded point is inter predicted, and a value for a second dimension of the table is equal to 0 if the current point is inter coded and otherwise equal to the intra context index.

20. The method of claim 15, further comprising:

determining, based on whether the previous coded point is inter coded and/or whether the current point is inter coded, a second context for entropy encoding one or more syntax elements associated with an azimuth residual indicating a magnitude of the azimuth residual of the current point; and entropy encoding the azimuth residual using the determined second context.

21. A method of decoding a point cloud, the method comprising:

obtaining an entropy encoded radius residual sign flag indicating a sign of a radius residual of a current point of the point cloud;

determining a context for entropy decoding the radius residual sign flag, wherein determining the context for entropy decoding the radius residual sign flag comprises determining the context for entropy decoding the radius residual sign flag based on whether a previous coded point is inter coded and whether the current point is inter coded;

entropy decoding the radius residual sign flag using the determined context; and reconstructing a position of the current point based on the radius residual sign flag.

22. The method of claim 21, wherein determining the context for entropy decoding the radius residual sign flag comprises looking up the context based on whether the previous coded point is inter coded, whether the current point is inter coded, whether a predictor for the current point is a parent node of the current point, whether a coded number of azimuthal steps for the previous coded point is equal to zero, whether a coded number of azimuthal steps for the current point is equal to zero, and a sign of a last-coded radius residual.

23. The method of claim 21, wherein determining the context for entropy decoding the radius residual sign flag comprises:

determining a context index based on whether a selected predictor for the current point is a parent node of the current point, whether a coded number of azimuthal steps for a preceding point is equal to zero, whether a coded number of azimuthal steps for the current point is equal to zero, and a sign of a last-coded radius residual;

determining a value of a variable, wherein determining the value of the variable comprises one of:

determining the value of the variable is equal to a Boolean value indicating whether the previous coded point is inter coded multiplied by a Boolean value indicating whether the current point is inter coded, or determining the value of the variable is equal to a minimum of 1 and a value equal to the Boolean value indicating whether the previous coded point is inter coded plus the Boolean value indicating whether the current point is inter coded; and looking up the context in a three-dimensional table, wherein a value for a first dimension of the table indicates whether the previous coded point is inter coded, a value for a second dimension of the table indicates whether the current point is inter coded, and a value for a third dimension of the table is equal to 0 if the value of the variable is true and equal to the context index otherwise.

24. The method of claim 21, wherein determining the context for entropy decoding the radius residual sign flag comprises:

determining an intra context index based on whether a selected predictor for the current point is a parent node of the current point, whether a coded number of azimuthal steps for a preceding point is equal to zero, whether a coded number of azimuthal steps for the current point is equal to zero, and a sign of a last-coded radius residual;

determining an inter context index based on whether the previous coded point is inter coded and whether the current point is inter coded; and looking up the context in a two-dimensional table, wherein a value for a first dimension of the table is the inter context index and a value for a second dimension of the table is equal to 0 if the current point is inter coded and equal to the intra context index otherwise.

25. The method of claim 21, wherein determining the context for entropy decoding the radius residual sign flag comprises:

determining an intra context index based on whether a selected predictor for the current point is a parent node of the current point, whether a coded number of azimuthal steps for a preceding point is equal to zero, whether a coded number of azimuthal steps for the current point is equal to zero, and a sign of a last-coded radius residual; and looking up the context in a two-dimensional table, wherein:

a value for a first dimension of the table is equal to 2 if the current point is inter coded and otherwise equal to a Boolean value indicating whether the previous coded point is inter predicted, and a value for a second dimension of the table is equal to 0 if the current point is inter coded and otherwise equal to the intra context index.

26. The method of claim 21, further comprising:

determining, based on whether the previous coded point is inter coded and/or whether the current point is inter coded, a second context for entropy encoding one or more syntax elements associated with an azimuth residual indicating a magnitude of the azimuth residual of the current point; and entropy decoding the azimuth residual using the determined second context.

* * * * *